United States Patent
Sitrick et al.

(10) Patent No.: US 9,372,833 B2
(45) Date of Patent: *Jun. 21, 2016

(54) SYSTEMS AND METHODOLOGIES FOR DOCUMENT PROCESSING AND INTERACTING WITH A USER, PROVIDING STORING OF EVENTS REPRESENTATIVE OF DOCUMENT EDITS RELATIVE TO A DOCUMENT; SELECTION OF A SELECTED SET OF DOCUMENT EDITS; GENERATING PRESENTATION DATA RESPONSIVE TO SAID SELECTED SET OF DOCUMENTS EDITS AND THE STORED EVENTS; AND PROVIDING A DISPLAY PRESENTATION RESPONSIVE TO THE PRESENTATION DATA

(75) Inventors: David H Sitrick, Pacific Palisades, CA (US); Russell T Fling, Naperville, IL (US)

(73) Assignee: David H. Sitrick, Los Angeles, CA (US)

(*) Notice: Subject to any disclaimer, the term of this patent is extended or adjusted under 35 U.S.C. 154(b) by 541 days.

This patent is subject to a terminal disclaimer.

(21) Appl. No.: 13/617,823

(22) Filed: Sep. 14, 2012

(65) Prior Publication Data

US 2014/0082469 A1 Mar. 20, 2014

(51) Int. Cl.
*G09G 5/00* (2006.01)
*G06F 17/21* (2006.01)
(Continued)

(52) U.S. Cl.
CPC .......... *G06F 17/212* (2013.01); *G06F 17/2211* (2013.01); *G06F 17/2229* (2013.01); *G06F 17/2288* (2013.01); *G06Q 10/10* (2013.01)

(58) Field of Classification Search
CPC . G06F 17/2235; G06F 17/241; G06F 17/212; G06F 17/2247; G06F 17/2211; G06F 17/2229; G06F 17/2288
USPC .......... 715/205, 209, 229, 230, 243, 273, 733
See application file for complete search history.

(56) References Cited

U.S. PATENT DOCUMENTS 5,806,078 A 9/1998 Hug et al.
5,870,552 A * 2/1999 Dozier et al. .................. 709/219
(Continued)

OTHER PUBLICATIONS

Sony Vegas Pro 11 User Manual last revised Dec. 14, 2011, pp. 31, 42, 111, 112.
(Continued)

*Primary Examiner* — Scott Baderman
*Assistant Examiner* — Hassan Mrabi
(74) *Attorney, Agent, or Firm* — Sitrick & Sitrick

(57) ABSTRACT

A system an method provide for user interaction document processing via event generation and processing. An underlying document is displayed and worked with (ranging from a blank document, or a presentation display of a non-blank document or an image of anything relative to which a user can make annotations that can result in a respective combined display presentation of the underlying image combined with the selected ones of the annotations). The annotations to be displayed are selected by criteria such as user, time, location, etc. A combined display presentation is generated responsive to respective display presentation data, and is associated with and representative of a specific combination view of edit events. A second version of a display presentation can be provided by selecting the events associated with a respective one or more users' annotations to form a selected set that is used to generate said display presentation data.

36 Claims, 27 Drawing Sheets

(51) Int. Cl.
  *G06Q 10/10* (2012.01)
  *G06F 17/22* (2006.01)

(56) References Cited

U.S. PATENT DOCUMENTS

| | | | |
|---|---|---|---|
| 6,185,591 B1 | 2/2001 | Baker et al. | |
| 6,546,188 B1* | 4/2003 | Ishii | G11B 27/031 386/280 |
| 6,590,584 B1* | 7/2003 | Yamaura | G06F 3/0481 715/704 |
| 6,687,878 B1 | 2/2004 | Eintracht et al. | |
| 6,993,710 B1 | 1/2006 | Goad et al. | |
| 7,111,009 B1 | 9/2006 | Gupta | |
| 7,137,072 B2* | 11/2006 | Bauer et al. | 715/809 |
| 7,194,469 B1* | 3/2007 | Dowd et al. | |
| 7,249,314 B2* | 7/2007 | Walker et al. | 715/205 |
| 7,418,656 B1 | 8/2008 | Petersen | |
| 7,492,364 B2 | 2/2009 | Devarajan et al. | |
| 7,536,637 B1 | 5/2009 | Nauerz et al. | |
| 7,603,393 B1 | 10/2009 | Cote et al. | |
| 7,814,089 B1* | 10/2010 | Skrenta et al. | 707/709 |
| 7,818,663 B2* | 10/2010 | Khaba | 715/229 |
| 7,844,891 B2* | 11/2010 | Chandra | 715/208 |
| 7,844,898 B2 | 11/2010 | Ross et al. | |
| 7,966,565 B2* | 6/2011 | Dawson et al. | 715/751 |
| 7,975,215 B2 | 7/2011 | Duncan et al. | |
| 8,131,866 B2 | 3/2012 | Samra et al. | |
| 8,132,094 B1 | 3/2012 | Bryar et al. | |
| 8,239,764 B2* | 8/2012 | Pong et al. | 715/273 |
| 8,261,182 B1 | 9/2012 | Petersen | |
| 8,296,647 B1* | 10/2012 | Bourdev | 715/230 |
| 8,347,207 B2 | 1/2013 | Borgsmidt et al. | |
| 8,418,051 B1* | 4/2013 | Bourdev | 715/230 |
| 8,418,055 B2 | 4/2013 | King et al. | |
| 8,434,002 B1* | 4/2013 | Shah et al. | 715/255 |
| 8,484,561 B1 | 7/2013 | Lemonik | |
| 8,656,290 B1 | 2/2014 | Greenspan et al. | |
| 8,839,087 B1 | 9/2014 | Hayden | |
| 8,850,320 B2* | 9/2014 | Taylor | 715/730 |
| 8,881,013 B2* | 11/2014 | Lyons et al. | 715/723 |
| 2001/0049704 A1 | 12/2001 | Hamburg et al. | |
| 2002/0107894 A1 | 8/2002 | Kent et al. | |
| 2003/0079180 A1* | 4/2003 | Cope | 715/511 |
| 2003/0115223 A1 | 6/2003 | Scott et al. | |
| 2003/0135520 A1 | 7/2003 | Mitchell et al. | |
| 2003/0196176 A1* | 10/2003 | Abu-Ghazalah et al. | 715/530 |
| 2004/0010755 A1* | 1/2004 | Hamada | 715/513 |
| 2004/0199867 A1* | 10/2004 | Brandenborg | 715/500.1 |
| 2005/0041872 A1 | 2/2005 | Yim et al. | |
| 2005/0071755 A1 | 3/2005 | Harrington et al. | |
| 2005/0149920 A1 | 7/2005 | Patrizi et al. | |
| 2005/0262107 A1 | 11/2005 | Bergstraesser et al. | |
| 2006/0059253 A1 | 3/2006 | Goodman et al. | |
| 2006/0136513 A1 | 6/2006 | Ngo et al. | |
| 2006/0242197 A1 | 10/2006 | Tsyganskiy et al. | |
| 2006/0253771 A1* | 11/2006 | Baschy | 715/500 |
| 2007/0050360 A1 | 3/2007 | Hull et al. | |
| 2007/0112841 A1* | 5/2007 | Iwayama | G06F 3/03545 |
| 2007/0136394 A1 | 6/2007 | Cowan et al. | |
| 2007/0162441 A1 | 7/2007 | Idicula et al. | |
| 2007/0260996 A1 | 11/2007 | Jakobson | |
| 2008/0022107 A1* | 1/2008 | Pickles et al. | 713/176 |
| 2008/0071806 A1 | 3/2008 | Gaurav et al. | |
| 2008/0195705 A1 | 8/2008 | Lee | |
| 2009/0048927 A1 | 2/2009 | Gross | |
| 2009/0157811 A1 | 6/2009 | Bailor et al. | |
| 2009/0193327 A1 | 7/2009 | Roychoudhuri et al. | |
| 2009/0259932 A1* | 10/2009 | Bank et al. | 715/229 |
| 2009/0271696 A1* | 10/2009 | Bailor et al. | 715/229 |
| 2009/0271806 A1* | 10/2009 | McDonald et al. | 719/329 |
| 2009/0276698 A1 | 11/2009 | Clarke et al. | |
| 2009/0307762 A1 | 12/2009 | Cudd, Jr. | |
| 2010/0185933 A1* | 7/2010 | Coffman et al. | 715/230 |
| 2010/0241718 A1 | 9/2010 | Rasmussen et al. | |
| 2010/0278453 A1* | 11/2010 | King | 382/321 |
| 2011/0026898 A1 | 2/2011 | Lussier et al. | |
| 2011/0035662 A1* | 2/2011 | King et al. | 715/273 |
| 2011/0055329 A1 | 3/2011 | Abt et al. | |
| 2011/0055702 A1 | 3/2011 | Jakobson | |
| 2011/0078246 A1 | 3/2011 | Dittmer-Roche | |
| 2011/0107230 A1 | 5/2011 | Gutz | |
| 2011/0173214 A1* | 7/2011 | Karim | G06F 17/3002 707/754 |
| 2011/0246869 A1 | 10/2011 | Vion-Dury | |
| 2011/0252301 A1* | 10/2011 | Vollmer et al. | 715/229 |
| 2011/0252303 A1* | 10/2011 | Lemonik et al. | 715/234 |
| 2011/0252312 A1 | 10/2011 | Lemonik | |
| 2011/0252339 A1* | 10/2011 | Lemonik et al. | 715/753 |
| 2011/0258538 A1* | 10/2011 | Liu et al. | 715/256 |
| 2011/0296317 A1 | 12/2011 | Ishihara et al. | |
| 2011/0320407 A1 | 12/2011 | Augustine | |
| 2012/0005156 A1 | 1/2012 | Grant et al. | |
| 2012/0016867 A1 | 1/2012 | Clemm et al. | |
| 2012/0030563 A1 | 2/2012 | Lemonik | |
| 2012/0036981 A1 | 2/2012 | Hyman | |
| 2012/0042251 A1 | 2/2012 | Rodriguez | |
| 2012/0089542 A1 | 4/2012 | Hettel | |
| 2012/0110445 A1 | 5/2012 | Greenspan et al. | |
| 2012/0117457 A1 | 5/2012 | Yuniardi | |
| 2012/0151312 A1* | 6/2012 | Clee et al. | 715/205 |
| 2012/0233137 A1 | 9/2012 | Jakobson et al. | |
| 2012/0271867 A1 | 10/2012 | Grossman et al. | |
| 2012/0272153 A1 | 10/2012 | Grossman et al. | |
| 2012/0272192 A1 | 10/2012 | Grossman et al. | |
| 2012/0284605 A1* | 11/2012 | Sitrick et al. | 715/230 |
| 2012/0284645 A1* | 11/2012 | Sitrick et al. | 715/753 |
| 2012/0331061 A1 | 12/2012 | Lininger | |
| 2013/0007148 A1 | 1/2013 | Olsen | |
| 2013/0031457 A1* | 1/2013 | Griffiths et al. | 715/231 |
| 2013/0036348 A1* | 2/2013 | Hazard | 715/230 |
| 2013/0047066 A1* | 2/2013 | Lee | 715/229 |
| 2013/0060612 A1 | 3/2013 | Hurd | |
| 2013/0124649 A1 | 5/2013 | Triantos et al. | |
| 2013/0124978 A1* | 5/2013 | Horns et al. | 715/243 |
| 2013/0145257 A1* | 6/2013 | Shalabi et al. | 715/243 |
| 2013/0218845 A1 | 8/2013 | Kleppner et al. | |
| 2013/0326323 A1 | 12/2013 | Siwoff et al. | |
| 2014/0013209 A1 | 1/2014 | Good | |
| 2014/0074807 A1 | 3/2014 | Kane-Esrig | |
| 2015/0199270 A1 | 7/2015 | Day-Richter et al. | |
| 2015/0199307 A1 | 7/2015 | Zhang et al. | |
| 2015/0199318 A1 | 7/2015 | Lemonik et al. | |

OTHER PUBLICATIONS

Adobe Photoshop CS5 last revised Dec. 5, 2011, pp. 147.

Mark Derthick; Steven F. Roth, Enhancing Data with a Branching History of User Operations, 2001, http://repository.cmu.edu/cgi/viewcontent.cgi?article=1027&context=hcii.

* cited by examiner

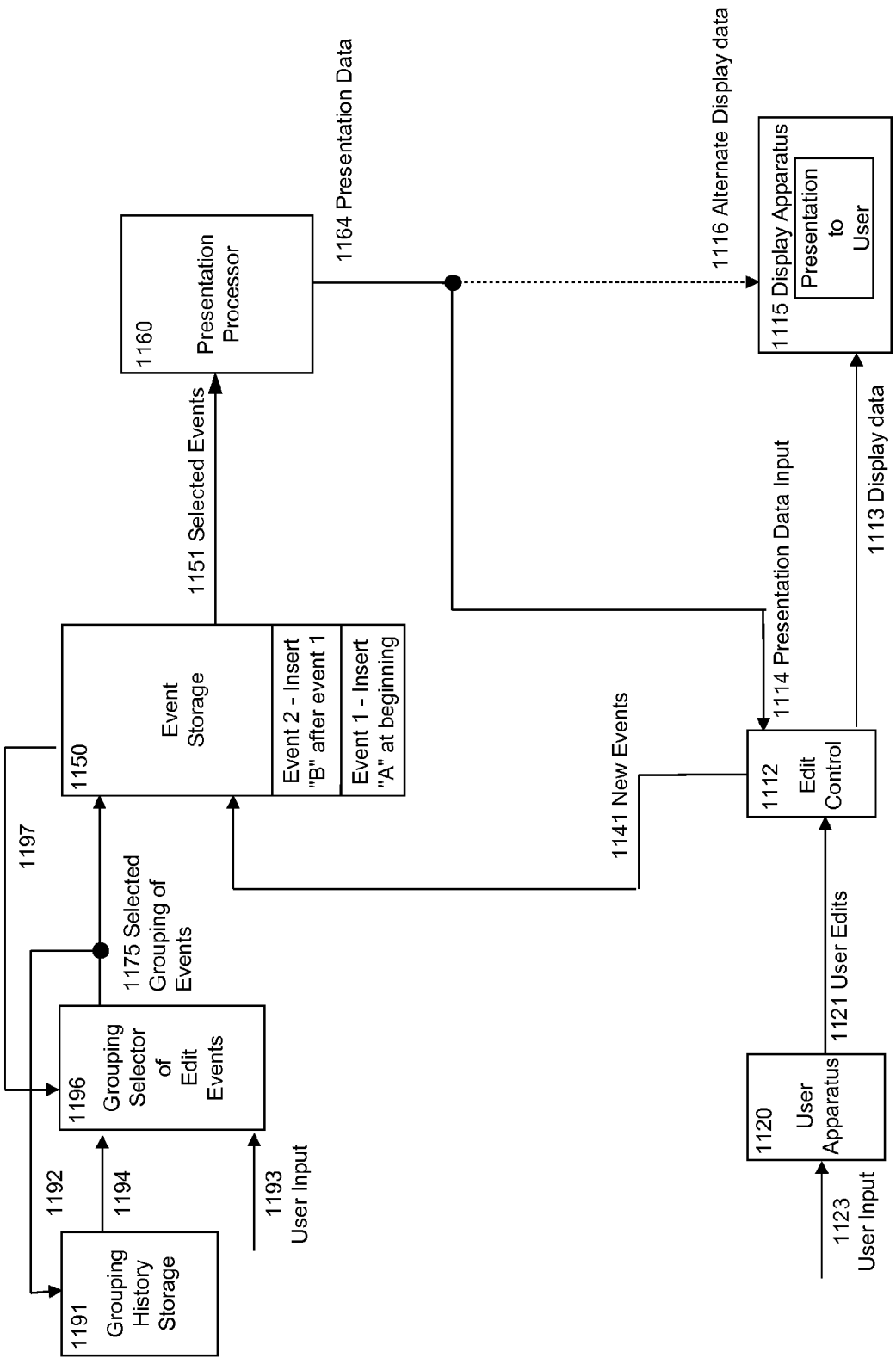

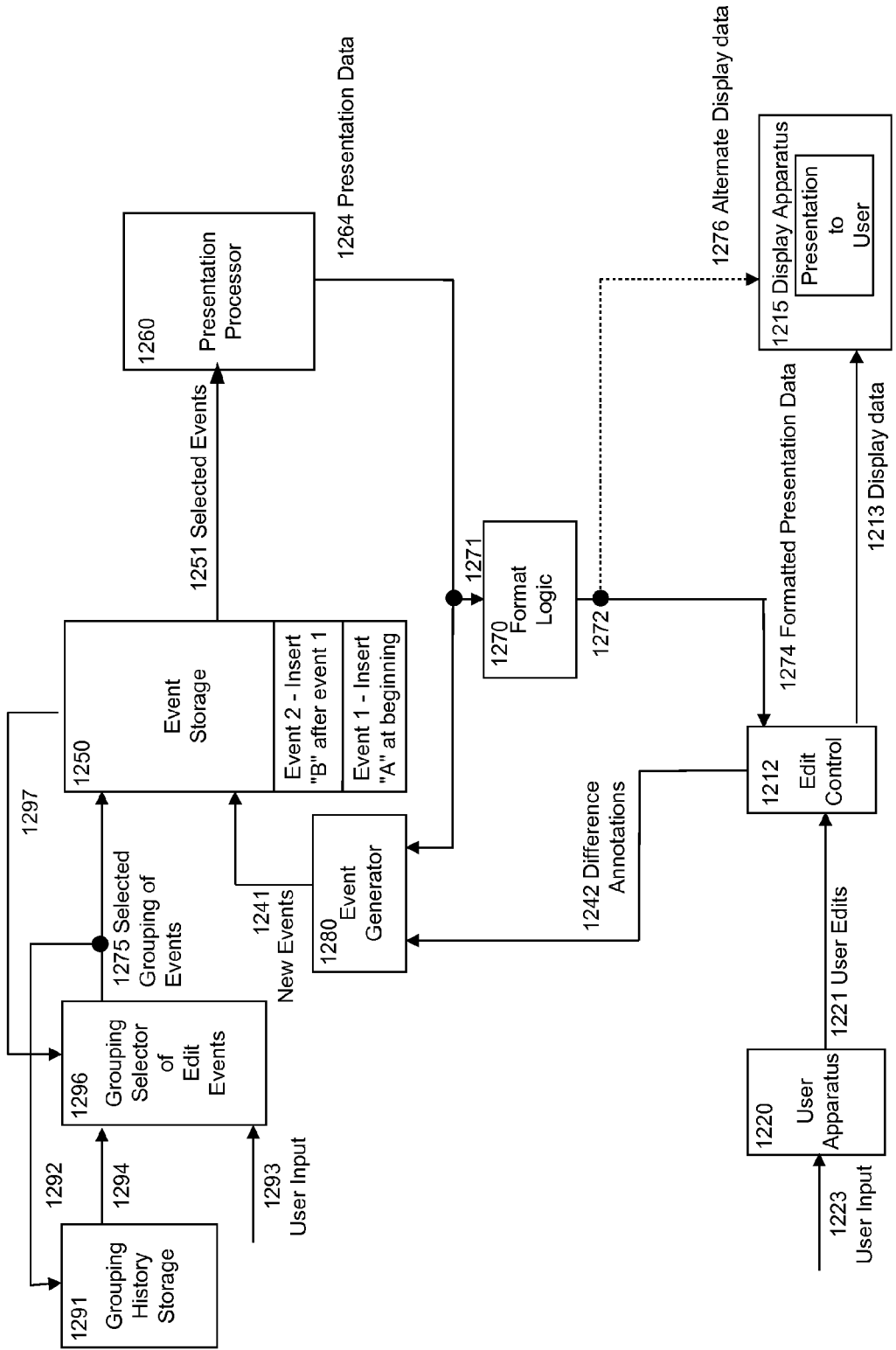
FIG. 1C  1200 Event Processing System using difference annotations

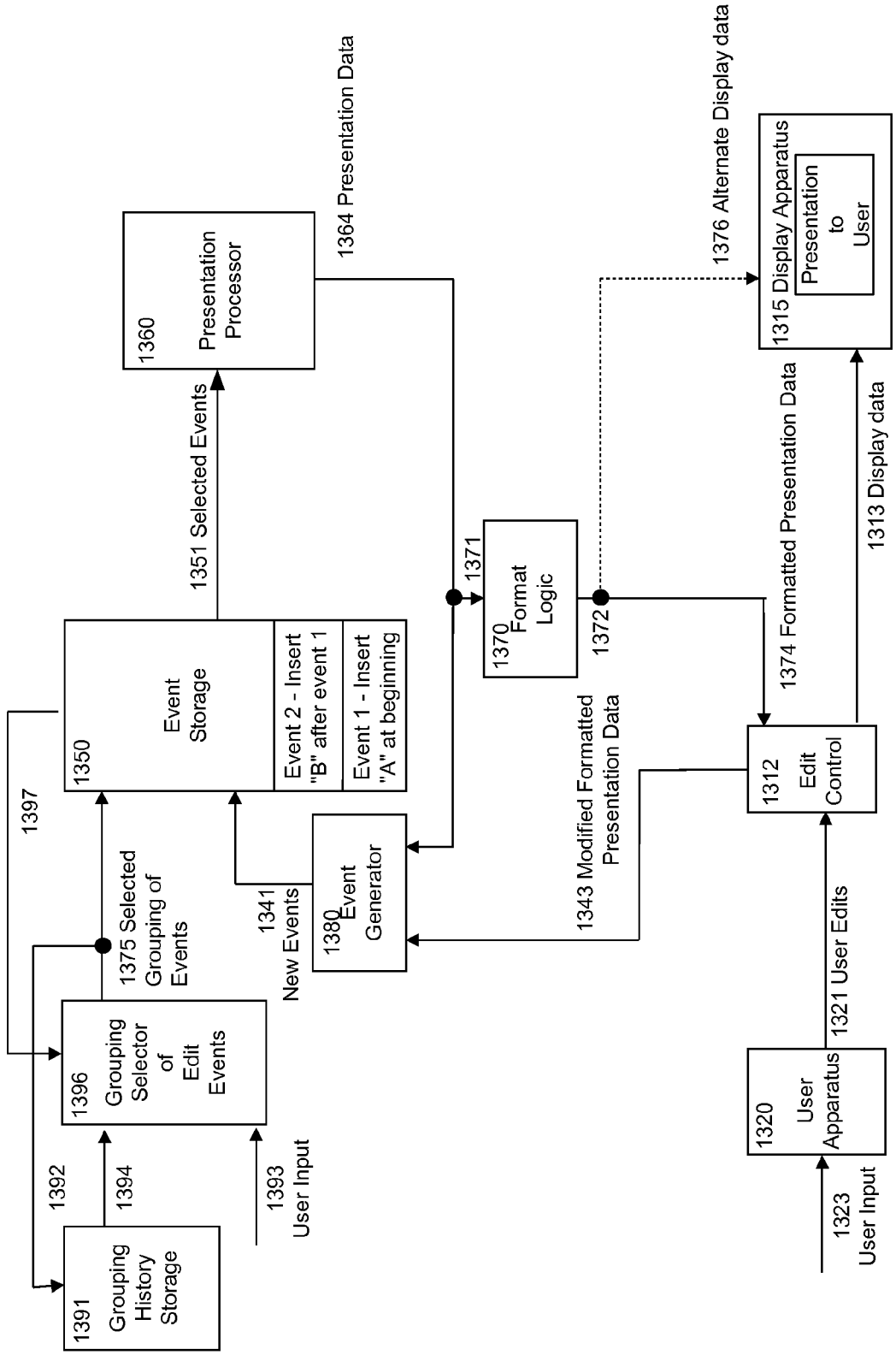

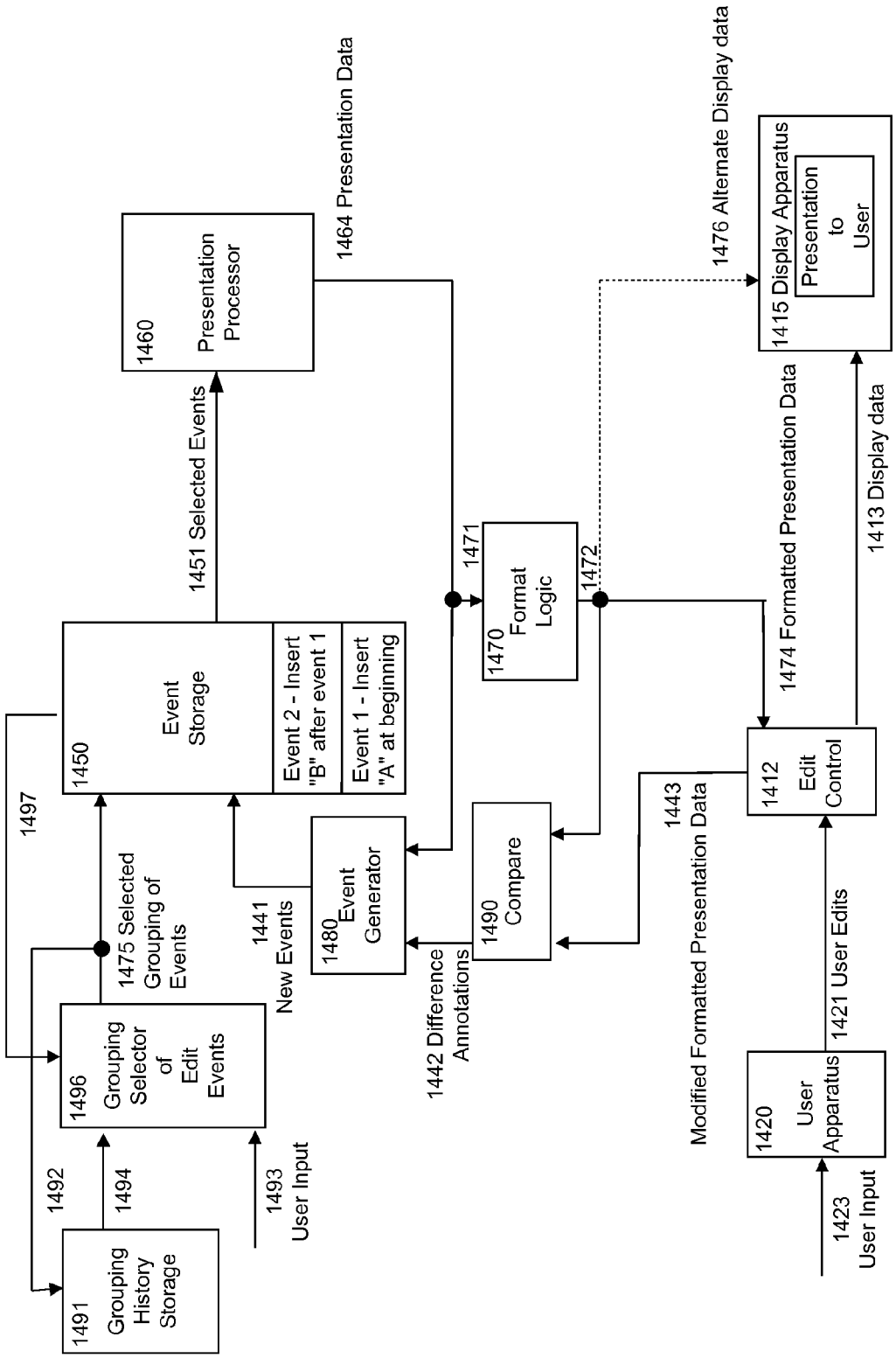
FIG. 1E 1400 Event Processing System using modified formatted presentation data and a compare

FIG.4C

| Granularity | Token types created |
|---|---|
| paragraph | • HTML tags (formatting)<br>• line breaks (HTML <br> tags)<br>• text (includes characters, punctuation, special characters and whitespace) |
| word | • HTML tags<br>• line breaks (HTML <br> tags)<br>• whitespace (spaces, tabs, ...)<br>• punctuation (including special characters)<br>• text (characters) |
| char | • HTML tags<br>• line breaks (HTML <br> tags)<br>• whitespace (spaces, tabs, line breaks, ...)<br>• punctuation (including special characters)<br>• characters |

Fig 4D

```
difference_annotations=compare(presentation data, modified presentation data, 'paragraph')

function compare (original, modified, granularity) {
    original_tokens = tokenize(original, granularity)
    modified_tokens = tokenize(modified, granularity)

if granularity == paragraph then new_granularity = 'word'
    else if granularity == word then new_granularity = 'char'
    else                              new_granularity = 'none' set all_differences to empty
    differences = find_difference(original_tokens, modified_tokens)
    foreach difference in differences {
        // difference.type is type of difference: 'change' or 'no change'
        // difference.original are the tokens from the original tokens in this difference
        // difference.modified are the tokens from the modified_tokens in this difference if difference.type is 'no change' {
            add difference to all_differences
        }
        else if new_granularity == 'none' {
            add difference to all_differences
        }
        else {
            set sub_differences to empty
            diff_original = untokenize(difference.original)
            diff_modified = untokenize(difference.modified)
            sub_differences = compare(diff_original, diff_modified, new_granularity)
            add sub_differences to all_differences
        }
    }
    return all_differences
}
```

Movie/Audio Event System

FIG.4G

| Granularity | Token types created |
|---|---|
| slot | • Slot |
| segment | • Slot boundaries<br>• Common segment classes (SourceClip, Sequence, Effect, Filler)<br>• other segment classes (Locator, TaggedValue, KLVData, Transition, Parameter, ControlPoint, ....) |
| components | • Slot boundaries<br>• Segment boundaries (common and other)<br>• components (parameters of segment classes, components in a sequence, ...) |

| ID | Edit Reference | Operation |
|---|---|---|
| 1 | beginning | insert "A" after |
| 2 | 1 | insert "B" after |
| 3 | 2 | insert "D" after |
| 4 | 2 | insert "c" after |
| 5 | 4 | insert "C" after |
| 6 | 4 | delete |
| 7 | 3 | insert "E" after |

2911

| Assembled at time | |
|---|---|
| t1 | |
| t2 | |
| t3 | |
| t4 | |
| | t6 |
| | t5 |
| | t7 |

Event Storage

FIG. 5B

2920 $t_1$
| ID | Data |
|---|---|
| 1 | "A" |

2921 $t_2$
| ID | Data |
|---|---|
| 1 | "A" |
| 2 | "B" |

2922 $t_3$
| ID | Data |
|---|---|
| 1 | "A" |
| 2 | "B" |
| 3 | "D" |

2923 $t_4$
| ID | Data |
|---|---|
| 1 | "A" |
| 2 | "B" |
| 3 | "D" |
| 4 | "c" |

2924 $t_5$
| ID | Data |
|---|---|
| 1 | "A" |
| 2 | "B" |
| 3 | "D" |

2925 $t_6$
| ID | Data |
|---|---|
| 1 | "A" |
| 2 | "B" |
| 5 | "C" |
| 3 | "D" |

2926 $t_7$
| ID | Data |
|---|---|
| 1 | "A" |
| 2 | "B" |
| 5 | "C" |
| 3 | "D" |
| 7 | "E" |

Assembly of Presentation Data

FIG. 5C

| 2930 $t_1$ | 2931 $t_2$ | 2932 $t_3$ | 2933 $t_4$ | 2934 $t_5$ | 2935 $t_6$ | 2936 $t_7$ |
|---|---|---|---|---|---|---|
| A | AB | ABD | ABDc | ABD | ABCD | ABCDE |

Formatted Presentation Data

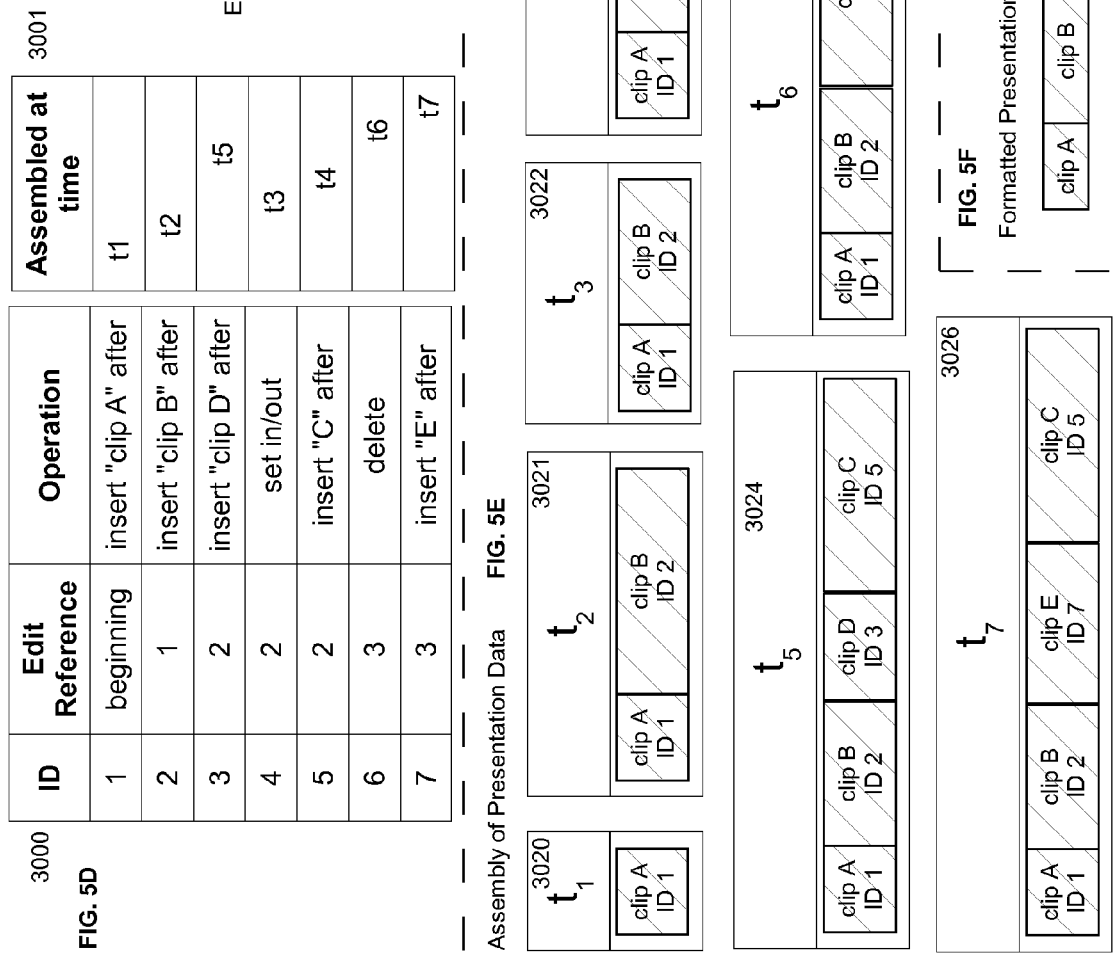

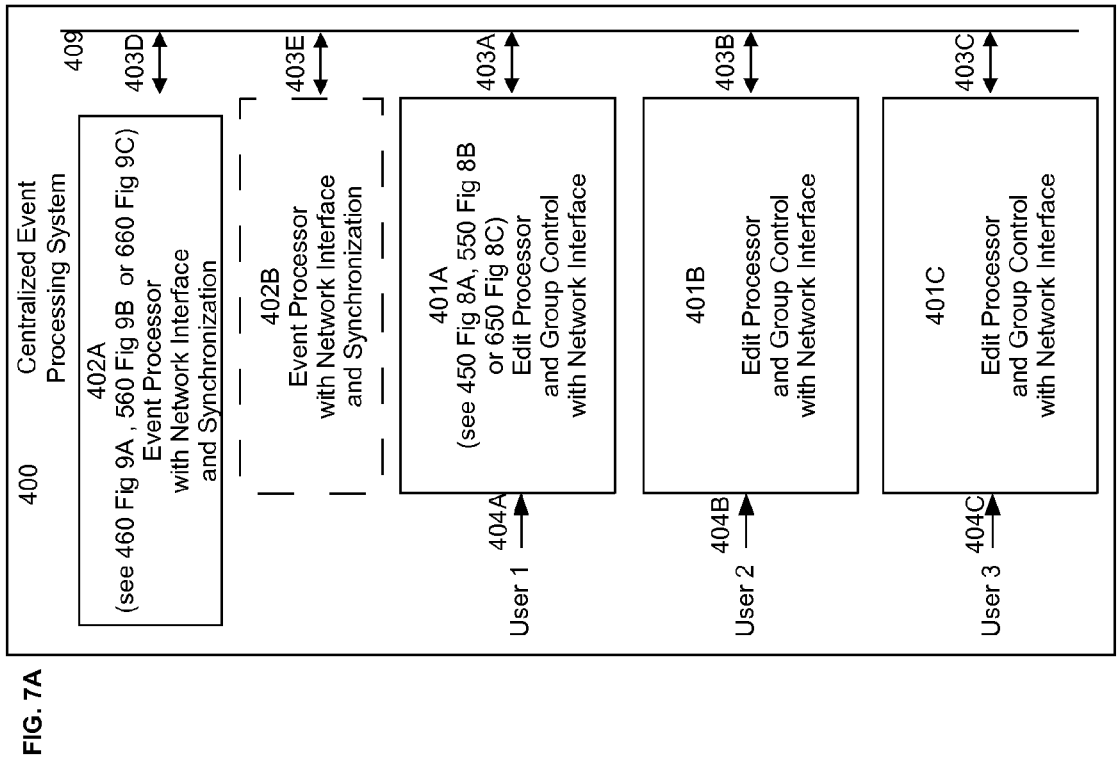

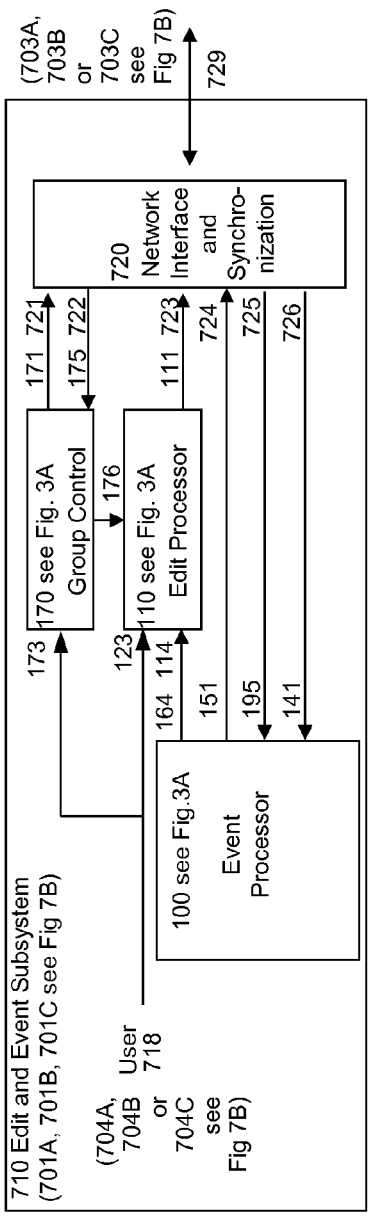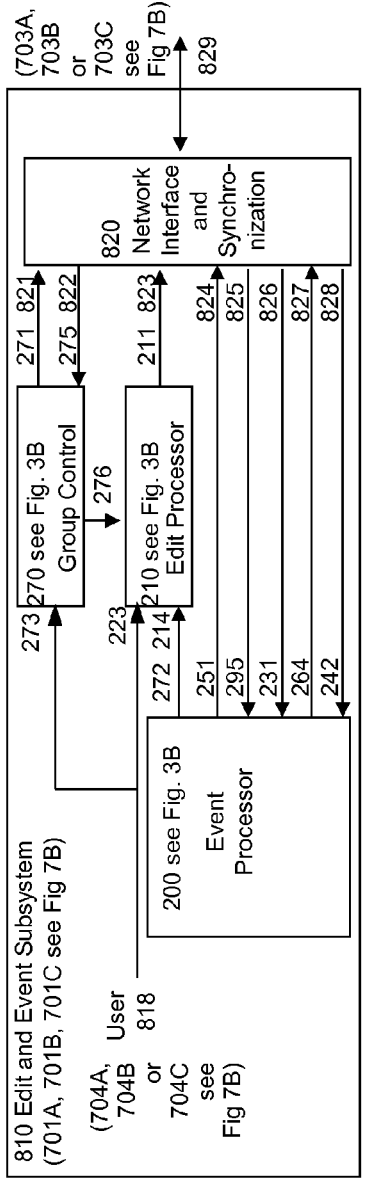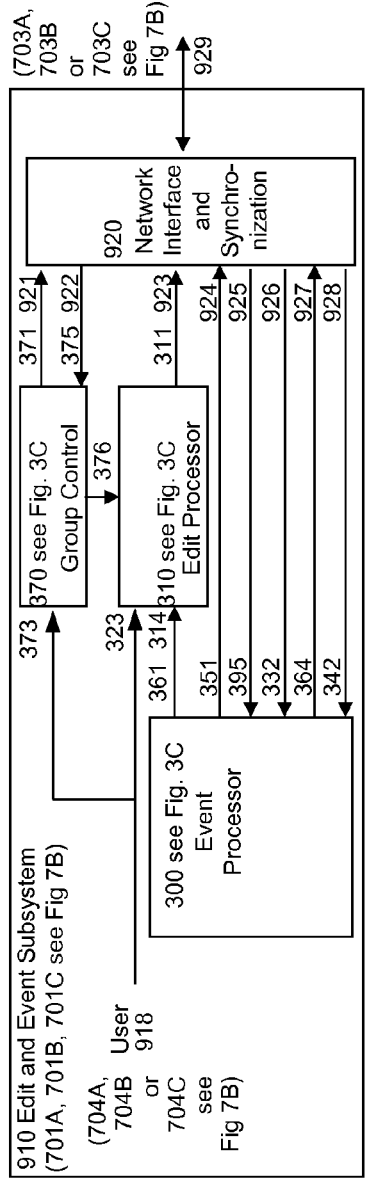
FIG. 10A
FIG. 10B
FIG. 10C

FIG. 11C

Document with recorded changes accepted and rejected 2420
- edit 1
- edit 3

Document with recorded changes hidden 2410

Document with recorded changes visible 2400
- edit 1
- edit 2
- edit 3
- edit 4

FIG. 11B

1500 Open Editor → 1501 Edit the document → 1502 Save the first version of the document to a file → 1503 Open first version of the document from the file → 1504 Edit the document → 1505 Save the second version of the document to a file → •••

SYSTEMS AND METHODOLOGIES FOR DOCUMENT PROCESSING AND INTERACTING WITH A USER, PROVIDING STORING OF EVENTS REPRESENTATIVE OF DOCUMENT EDITS RELATIVE TO A DOCUMENT; SELECTION OF A SELECTED SET OF DOCUMENT EDITS; GENERATING PRESENTATION DATA RESPONSIVE TO SAID SELECTED SET OF DOCUMENTS EDITS AND THE STORED EVENTS; AND PROVIDING A DISPLAY PRESENTATION RESPONSIVE TO THE PRESENTATION DATA

FIELD OF THE INVENTION

This invention relates to document and media file creation, editing, and presentation, and more particularly, to an event generation processing technology, systems and methodologies providing for processing user inputs, made relative to a presentation, of event content for annotations, to permit creation, modification, change, update and presentation of event content selected by and presented to one or many users, and supporting collaboration of multiple users for creation of, and/or changes to, a presentation.

BACKGROUND OF THE INVENTION

With prior art document editing systems, a first author's inputs must first be saved as a first version of a non-event document, and then the system allows for input by a second author (to make edits relative to the first version of the document). Then, this second author's inputs/changes must be saved as a second version of the document, before allowing (again) for the first author to make edits relative to the second version of the document.

With eStand Performer computer systems and technology from e-Stand, Inc., a user can make a selection of which user/author edits to view, with selection made by author to select to view all the edits made relative to a displayed image, such as sheet music.

There is no way, however, to select less than all the events in an order of entry made by a user, or by multiple users, and to exclude one or more of the edit entries somewhere in the middle of the order of entry.

There is also no way to specifically select presentation views, or the individual underlying edits, via criteria.

It is therefore an object of this present invention to provide systems and methodologies that provide an ability to store events generated for all edits and construct sets of edits selected by any one or more of criteria, and with selection of the edit events not limited by order of entry.

SUMMARY OF THE INVENTION

"Documents" are created during creative "sessions" of user input. In event processing, events (comprising event content) are created responsive to user input. An event document is defined as a logical grouping of event content for a specified selected set of events. Event storage stores all event content data representative of all changes and all events. The event content data is logically processed and its storage is structured and mapped so as to permit selection of a selected grouping(s) of selected events, and "Assembly" of a respective "View" of a presentation that is generated responsive to the selected events that are processed in a defined order in accordance with the event content data. The event processing is exceptional in permitting the user to customize views of display presentations of any one or more of groupings of events, and can do so on-the-fly.

In a preferred embodiment, event content storage is maintained for all the event content for all stored events. It can also be backed up for extra security. In the preferred embodiment, the event content is not deleted (such as from being a "delete" part of an edit process). This event storage of all event content for all stored events can be utilized to enable custom specified documents to be assembled for viewing from the stored events. A presentation is generated responsive to the selected events that are processed in a defined order in accordance with the event content data.

An event document is defined as a logical grouping of event content for a specified selected set of events. In the preferred embodiment, an event document retains a full history of all changes made to that said event document.

Non-event documents can contain some history of changes made [such as by various authors (record/accept changes in office documents)] but a full history of changes is not stored. The criteria for viewing these changes in non-event documents is—all or nothing. In non-event documents you cannot just select to view up to a certain date or select to view just one author (without modifying the document). The non-event document is stored in versions, each at a respective specific time, so that multiple versions of a document are kept in order to preserve historical information. It is difficult to merge edits from multiple authors working on a copy of a normal document into a single document.

Event processing and event documents change and improve upon fundamental components/elements and process steps utilized to create and edit a document.

In the case of a textual document, a non-event document editing system uses an alphanumeric character as its main fundamental element or atom. In the case of a movie or audio editor for a non-event document, the media clip or a frame is used as its main fundamental element.

An event document editing system uses an event (described in more detail later herein) as its fundamental element in its event document. This difference in the fundamental element and its utilization provide many benefits in using an event document editing system.

The benefits of event document architecture, systems and methods, enable an ability to collaborate between authors and also enable an ability to selectively view some, any, or all of the history of the creation of the document.

Since, grouping for viewing of events provides that events can be excluded (and/or selected) by author, time and other criteria. Thus, each user/author can select and have their own custom presentation of the document, or multiple presentation views of the document, wherein the presentation views can be selected by event, or by user, or by date, etc., or by multiple criteria. These selected viewing options enable each user (one, some, all) to individually select (for themselves and/or others), as to what presentation view is displayed. For example, in one viewing, a user can choose to exclude some or all other users' annotations, and for another viewing can choose to include some or all other authors' annotations, and/or choose selective viewing of a presentation at different stages of development from the start to a particular time [and/or based on selection of events]. Note that selection of events can be non-linear, and is not restricted to require including of all events within a continuous time interval. And, the start doesn't have to be limited to when the document was first created. The user of an event document can even view a version of presentation that no one has ever seen before (such as by selecting a certain combination of the events)! This provides great flexibility and functionality of collaboration, not otherwise available. In this regard, event processing and event documents can alternatively or additionally be utilized on the Cloud, with cloud-based services.

The following discussion illustrates a preferred embodiment of event processing and event document storage, and mapping utilization.

An event document has sub-component parts ("events") that are structured as an ordered-linear series of events. The ordering is based on when (e.g., relative to other events, and/or time-based, etc.) the respective events are added to the series. A selected event document is viewed by assembling the event contents for a selected set of events into presentation data that is utilized to display a presentation for viewing by a user. This presentation data can also be exported (e.g., as a saved file) to a non-event document. Thus, the document can be viewed at any point in it's development by assembling event content for events for a selected set of events, such as for a series of events over time, starting at any time (starting from event content for a respective annotation input for any selected event), or for a selected plurality of the events irrespective of their order of entry.

Just as important, a version of the document can be created/selected and viewed as if certain events had never occurred, by selecting which events to include and which events to exclude, based on information stored in the events.

Events are normally never deleted from event storage, nor are they changed. The exception is when it is desired to eliminate all history of the events in creating a document. In this case, when an event is deleted or modified, a new event document is created. A new event document can be created from a particular set of events in an existing event document However, when desired to eliminate history, then, once a new set events is selected, then some or all the structured data storage logic and history stored in the series of events is purposely lost. This may at times be useful and desirable, such as when the history of the document should not be shared with someone (such as for security reasons), or when exporting the event document to other non-event document formats (e.g., flattened (such as to a WORD document, POWERPOINT, EXCEL, PHOTOSHOP, audio (MP3, WAV, AIF), video (FINAL CUT PRO, PREMIERE), or other formats)).

In a preferred embodiment, an event is comprised of three items (event context, event reference, event change data). The event context is comprised at least of an event ID which allows other events to refer to this specific event. This event ID can be implemented in many different forms. It may also provide information regarding the order that the events are added to the construction of a document. In an alternate preferred embodiment, where the event ID does not provide this information, then another component of the event context provides this information.

Most documents require an index of the events such as with an order of entry, to properly assemble a presentation of the document. Time is an example of a component for the event context that can provide information to determine the order that events were added to the document. The author who created the event is also an important piece of event information that can optionally be included. This allows an event to be included/excluded based on its author. Other, components that can be part of the event context are: physical location, system identification, company, mailing address, login ID, phone number, user rights, user contact information, etc. There is no limit to the types of and amount of information that can be included in the event context.

The event reference refers to a particular event (e.g., via event ID). Alternatively, it can also refer to a location in the assembled presentation of the document. In one embodiment, the location in the assembled presentation is limited to "beginning" and "end". Alternatively, the location can refer to an offset in the assembled document. The offset and it use depends on the type of document. At least one of the location references must be allowed, e.g., one of "beginning", "end", "offset". This is required in order to add the first event to the document, which cannot refer to another event.

The event change data is the last part of the event. The change data can be an "add" type or "modify" type. The modify change data provides information on how to modify the part of the presentation created by the event that is referred to by the event reference. At minimum, the modify change data must include a "hide" operation. This allows previously added information in the presentation to be eliminated from the presentation for a new selected set of events (approximately equivalent to a traditional "delete"). However, many other operations are possible. For example, for textual documents, these operations comprise font changes, font colors, other formatting, etc. For movie, video, still image, and audio documents, these operations comprise applying various filters, applying transitions, changing brightness, adjusting contrast, controlling audio features, such as loudness, clip in time mark and clip out time mark, length, etc.

The add change data provides information on how to add information to the assembled presentation. For a textual document, the change data can specify to add a series of characters, or can provide a formatting command. A formatting command changes the way that characters following it are rendered in the presentation. A formatting command can be stand-alone or linked. One example of a linked command is where a command comes in pairs, with a start command applied subsequent to its position, and end command, where the effect of the start command is the assembly of the presentation and continues until it is removed when the end command occurs in the process/flow of the assembly of the presentation. Another example of such formatting commands are HTML tags.

These formatting tags are an alternative way of modifying events rather than using a modify change data command structure as discussed above. And, both can be used together or alternatively. A formatting command affects everything after it (after it—within the assembly process conversion into presentation data) in a presentation, whereas the modify change data command only affects a single event. A formatting command for a movie or audio document can define a beginning and end of a scene or track, provide header information describing the track, and many other functions. Movie and audio "add change data" can add media files such as video clips, audio clips, images, animations, etc., to a presentation.

However, all of these relationship commands can be used which can be beneficial. For example, consider where only one event has been selected for the presentation but there are other events in the currently viewed event document. If the user wants to add something after the displayed event, then it is beneficial to "insert after" the event rather than "end" (because . . . ). Likewise, if the user adds something before the event, then it is beneficial to "insert before" the event rather than "beginning" Then, when other events are selected for the presentation the added events above will be included near the originally displayed event and not toward the beginning and end of the document.

This is in addition to the formatting of items in the display presentation that are generated responsive to the events. The format of characters in the displayed presentation can also be modified responsive to the Event Context which can be stored within the event content in the Event Storage in the events. For example, events created by different authors can be displayed in different colors so their respective contributions can be easily seen by any viewer of the document. As another example, it can be selected that hidden characters will not be displayed in a respective presentation, or will be displayed but shown with a line stricken through them.

In some situations, event processing can result in creation of orphan events and dangling events when selecting only some of the entire series of events in a specified respective document. A dangling event occurs when an event has been selected but it references an unselected event. Additionally, if a selected event references a dangling event (directly or through other unselected events) then it is a dangling event. An orphan event occurs when a selected event has no reference to any other selected event, direct or indirect. These events can be selected to be shown, or not shown, in the presentation depending on how the presentation is assembled.

The add change data for a respective event must also define a relationship, defining where to add the information to, in the presentation, relative to the part of the presentation created by the event that is referred to by the event reference. A least one relationship must be defined, but multiple relationships can also be utilized. For example, an "edit reference location of" "beginning" (see above) and a relationship of "insert after" will allow an event to be placed anywhere in the assembly of a document. Likewise, the relationships of "end" and "insert before" also allow an event to be placed anywhere in the assembly of the document. However, all of these relationship commands can be used which can be beneficial. For example, consider where only one event has been selected for the presentation but there are other events in the currently viewed event document. If the user wants to add something after the displayed event, then it is beneficial to "insert after" the event rather than "end" (because . . . ). Likewise, if the user adds something before the event, then it is beneficial to "insert before" the event rather than "beginning" (because . . . ). Then, when other events are selected for the presentation the added events above will be included near the originally displayed event and not toward the beginning and end of the document. There are different add and change data commands, different depending on the document type, etc.

Event Content for Events are stored in Event Storage. An Event Selector provides Selection of a set of Events (a defined grouping) from the Event Storage. A Presentation Processor assembles the Selected Events into Presentation data. The Presentation Data generates a presentation that is displayed to the user that has been selected to see the respective document for the defined grouping. When a user inputs annotations to make changes that are made relative to a then current display presentation of a then selected document, these changes are converted to new Events (by one of many alternative ways), which are stored in the Event Storage for the respective document.

A key benefit of event processing is in versatility in specifying and assembling a presentation. To define a "document", events are selected based on a criteria (or multiple criteria) that defines a respective presentation. Virtually any criteria can be used, and some of which have been discussed elsewhere herein. A set of events defines a document. If all events as entered are in a document, then a selected grouping of events in a document represents a selected set document for viewing presentation. The event context provides criteria to permit selection of events for inclusion in a set such as based on who entered them, when entered, time, etc. It is critical to the selection of the events to create various views of respective ones of various documents, with selection based upon use of components to the event context that provide information that can be utilized for selecting events based on system and user criteria.

The presentation processor starts with a selected event (relative to other selected events) that was added first to the event storage. The event presentation processor applies change data for each selected event to generate respective presentation data and then searches for other events that reference each said selected event with modify change data. Those modifying referencing events that are also selected are applied in the relative order that they were added to event storage. Then the event presentation processor searches for events that reference said event with "add change data". Those events are again processed, recursively.

This is in addition to the formatting of items in the display presentation that are generated responsive to the events. The format of characters in the displayed presentation can also be modified responsive to the Event Context (which can be stored within the event content in the Event Storage in the events. For example, events created by different authors can be displayed in different colors so their respective contributions can be easily seen by any viewer of the document. As another example, it can be selected that hidden characters will not be displayed in a respective presentation, or will be displayed but shown with a line stricken through them.

In some situations, event processing can result in creation of orphan events and dangling events when selecting only some of the entire series of events in a specified respective document. A dangling event occurs when an event has been selected but it references an unselected event. Additionally, if a selected event references a dangling event (directly or through other unselected events) then it is a dangling event. An orphan event occurs when a selected event has no reference to any other selected event, direct or indirect. These events can be selected to be shown, or not shown, in the presentation depending on how the presentation is assembled. Various means can be used to indicate the beginning and end of a dangling phrase, a series of connected dangling events, or orphan phrase, a series of connected orphan events. In a text document, an ellipsis, " . . . ", can precede and follow the dangling phase or orphan phrase. In a video, a short clip can be inserted before and after indicating the beginning and end of the dangling phase or orphan phrase. In audio, a tone or voice message can be inserted before and after.

The display of the presentation can take many forms. As described, it provides many options for the user display, such as to distinguish between the authors of the events, obtain the information about the event at a position in the display, show or hide orphaned and dangling events, etc. However, in all cases, the generation of the display presentation provides the ability to change the view (the presentation display of selected events), by changing the criteria used to select the events.

Referring to the table (11) "Examples" 1 to 5 as contained hereinafter, there are illustrated five examples of paired tables, which illustrate event entry, event storage, event processing, and display presentation, corresponding to five example situations. The tables on the left show the events in the entry of order, starting from the top of each table, going down to the bottom, for events 1 to 5 (1, 2, 3, 4, 5) in each of the tables on the left, showing the five entered events as entered in event storage. Tables 3, 4, and 5 also include the control logic data table for presentation data assembly, including selection logic selections for a set for a document for events 1 to 5.

Thus, in Example 3, events 1, 3, 4, and 5 are selected as the set of events in the grouping for the document version of Example 3, for events 1 to 5. In Example 4, only events 1, 3, and 4 are selected as the select grouping in the defined document.

And, in Example 5, only events 3 and 4 are in the selected set of selected events in the grouping for presentation.

In Example 1, the letter "A" is entered, then the letter "B" is entered, then the letter "C" is entered (each entered in order), followed by the letter "D", followed by a command at Event 5, fifth in the sequence ordering of the events, specifying the operation to hide the fourth event of the letter "D". Since each event is entered sequentially, inserting after the previous event, the display presentation processing proceeds accordingly (sequentially), and the processing steps and presentation view are shown in the table on the right of the table of Example 1 (and similarly for each of the examples).

For example, in Example 1, the table on the right shows the events applied in the order (from the first column according to the operation in the second column. the table on the right, the second table, shows the "event applied" in the left column, and the resulting display presentation view as shown in the right column. Thus, in the table on the right in Example 1, event 1 is applied (as shown in the left column) and a display presentation is generated of the view of the letter "A" (in the right column). At the next processing state event 2 is applied and the view is "AB". Next, event 3 is applied generating an insert "C" after event-ID 2 generating a display of "ABC". Next, event-ID 4 is applied to insert "D" after event-ID 3, generating a display presentation of "ABCD". Finally, event-ID 5 is applied in the presentation processing, to generate a :hide the event-ID 4" operation (event-ID 4 was for inserting "D"), and generates a display presentation view as shown in the right column of the table on the right of Example 1?? of either "ABC" "D" with a strikethrough "D" or shown as "ABC", depending on whether it is desired to show a redlined version indicating what has been hidden, or to instead show the final clean version.

Referring to Example 2, in the table on the left, the events are shown as entered in the order 1, 2, 3, 4, 5, with first inserting "A", then inserting "D" after event-ID 1, then event-ID 3 insert "C" after event-ID 1, event-ID 4 inserts "B" after event-ID 1, and event 5 hides event-ID 2 which inserts the "D" after event-ID 1. In the table at the right of Example 2, the events are applied in the order indicated 1, 2, 5, 3, 4, which is determined by the event content as stored in event storage.

As shown in the right hand table of Example 2, event 1 is first applied to display the "A". Next, event-ID 2 is applied to show insert "D" after event-ID 1, which creates a display of view of "AD" in the second column of the table on the right. The next row of the table in Example 2 shows that event-ID 5 is processed by the presentation processor which causes to hide event-ID 2 which causes the display generation of "A" with a "D" with a strikethrough the "D", or solely shows the letter "A". At the next row in the table, it shows the next event-ID that is applied is event-ID 3, which provides an operation that inserts "C" after event-ID 1, which generates presentation data for a display of a view of "AC" plus "D" with a strikethrough it, or of only "AC". Finally, the next row of the table shows that event-ID 4 is applied next, which results in an operation of inserting "B" after event-ID 1, and thereby generating a presentation view of "ABC" plus "D" (with a strikethrough) or of only "ABC".

Examples 3 and 4 illustrate two ways of dealing with dangling events. As described above, a dangling event occurs when an event has been selected but refers to an unselected event. Alternatively, if an unselected event references a selected event, it may or may not result in creating a dangling event, depending on what else references it. Example 3 illustrates a case where it has been selected to ignore the dangling events in the display presentation. As illustrated in Example 3, in the table on the left, the events occur in order of event-ID 1, event-ID 2, event-ID 3, event-ID 4, event-ID 5. Event-ID 1 is to insert "A" after beginning, and it is selected. Event-ID 2 is not selected, and is to insert a "B" after event-ID 1. Event-IDs 3, 4, and 5 are selected. Event-ID 3 is to insert "C" after event-ID 2. However, event-ID 2 is not selected, and therefore, it is a dangling event. Similarly, event-ID 4 is to insert "D" after event-ID 3, but since event-ID 3 is a dangling event, then any event referencing a dangling event becomes a dangling event as well. Thus, event-IDs 3, 4, and 5 are dangling events. In the table on the right of Example 3, only event-ID 1 is applied, to generate a display of "A". The dangling events 3, 4, and 5 are not illustrated and not shown in the presentation view of the table on the right.

Example 4 shows another way to treat dangling events, this time by including the dangling events in the generated presentation for display to the user. Thus, the table on the left of Example 4 has the same events as the table on the left for Example 3. However, in Example 4, events 1, 3, and 4 are selected as events (as compared to events 1, 3, 4, and 5, as selected events for Example 3. In this case, event-ID 3, and event-ID 4 are dangling events. Event-ID 5 is not a dangling event because it is not selected. The right table of example 4 in the first row shows event-ID 1 applied to generate a display view of "A". Next, event-ID 3 is selected and is applied that is a dangling event to insert "C" after event-ID 2. As illustrated in Example 4, the table on the right, the display shows a "A . . . C", the " . . . " illustrating that the presentation view shows the user that there is one or more dangling event or events that are not shown to the user in this presentation display. Similarly, in the next row of the table of Example 4, event-ID 4 is applied to the presentation processing, to insert "D" after event-ID 3. Since event-IDs 3 and 4 are dangling, the display again shows that "A . . . CD" as the view for the presentation, with the " . . . " used in the presentation display to illustrate to the user that there is a dangling event occurring after event-ID 1 (after the letter "A").

Example 5 illustrates a treatment of including orphan events in a display presentation. As described above, orphan events occur when a selected event has no reference to any other selected event, directly or indirectly. Directly referencing an event is when the event references another event that is selected. Indirectly referencing an event is when the selected event references another event that is not selected but the unselected event references a selected event directly or indirectly, i.e., there may be a chain of referenced unselected events before the last referenced unselected event references a selected event.

As illustrated Example 5, the table at the left shows the order of entry of events 1, 2, 3, 4, and 5, in that order. The event content, including the event-ID and operation information data is stored in event storage. The selection logic provides which events are selected in the defined group for the selected set to be provided in the presentation view. The event 1 is to insert "A" after the beginning, event-ID 2 is to insert "D" after event-ID 1. However, neither event-ID 1 or event 2 is selected. Event 3 is to insert "C" after event-ID 1, and event-ID 4 is to insert "B" after event-ID 1, and both event-IDs 3 and 4 are selected. Event-ID 5 is to hide event-ID 2, but neither event-ID 2 nor event-ID 5 are selected. The result of this is that the selected events 3 and 4 generate an orphan event condition. The processing of event 3 and event 4 to insert characters after event 1 (which is not selected), results in generating an orphan event.

Furthermore, event-ID 4 to insert "B" after event-ID 1 also creates an orphan event. The display presentation on the table at the right of Example 5, shows the processing of event 3 and event 4 resulting in generating a presentation wherein event-ID 3 is applied first to generate a presentation, " . . . C", the ellipsis added at the beginning to let the user know it follows unspecified text. Then event-ID 4 is then processed by the presentation processor to generate a presentation, " . . . BC". There is not a need to have an ellipsis between B and C since they follow the same event and would be shown together if event-ID 1 was selected.

Example 1

Entering ABC in Order

| Event | Operation | Events Applied | View |
|---|---|---|---|
| 1 | Insert A after beginning | 1 | A |
| 2 | Insert B after 1 | 2 | AB |
| 3 | Insert C after 2 | 3 | ABC |
| 4 | Insert D after 3 | 4 | ABCD |
| 5 | Hide 4 | 5 | A̶B̶C̶D̶ or ABC |

Example 2

Entering ABC Randomly

| Event | Operation | Events Applied | View |
|---|---|---|---|
| 1 | Insert A after beginning | 1 | A |
| 2 | Insert D after 1 | 2 | AD |
| 3 | Insert C after 1 | 5 | A̶D̶ or A |
| 4 | Insert B after 1 | 3 | ACD̶ or AC |
| 5 | Hide 2 | 4 | ABCD̶ or ABC |

Example 3

Ignoring Dangling Events

| Event | Selected | Operation | Events Applied | View |
|---|---|---|---|---|
| 1 | X | Insert A after beginning | 1 | A |
| 2 | | Insert B after 1 | | |
| 3 | X | Insert C after 2 | | |
| 4 | X | Insert D after 3 | | |
| 5 | X | Hide 4 | | |

Example 4

Including Dangling Events

| Event | Selected | Operation | Events Applied | View |
|---|---|---|---|---|
| 1 | X | Insert A after beginning | 1 3 (dangling) | A A . . . C |
| 2 | | Insert B after 1 | 4 | A . . . CD |
| 3 | X | Insert C after 2 | | |
| 4 | X | Insert D after 3 | | |
| 5 | | Hide 4 | | |

Example 5

Including Orphan Events

| Event | Selected | Operation | Events Applied | View |
|---|---|---|---|---|
| 1 | | Insert A after beginning | 3 4 (orphan) | . . . C . . . BC |
| 2 | | Insert D after 1 | | |
| 3 | X | Insert C after 1 | | |
| 4 | X | Insert B after 1 | | |
| 5 | | Hide 2 | | |

A system and method are provided for user interaction and document processing via event generation and processing. At any point in time, an underlying document (ranging from, at the start of editing with a presentation display of a blank document, or working with a presentation display of a non-blank document (such as a prior draft, and/or in-process annotated version(s), and/or an image of anything relative to which a user can make annotations that can result in a respective combined display presentation of the underlying image combined with the selected ones of the annotations, selected by criteria such as user, time, location, etc., wherein the respective combined display presentation is generated responsive to respective display presentation data, and is associated with and representative of a specific combination view of edit events the grouping of which define the elements of a display presentation. A second version of a display presentation can be provided by selecting the events associated with a respective one or more users' annotations to have the respective events therefor be utilized to form a selected set that is used to generate said display presentation data.

User input is processed to generate additional events (sometimes also called edit events) representative of and responsive to a user input made relative to the first display presentation. Each event is comprised of event content comprising a document change and an edit reference. The event content is generated in a defined entry order of input, and in a preferred embodiment, is stored with metadata or other criteria that can be used to facilitate selection for inclusion in a respective said selected set of events. Each respective edit reference identifies a position for utilization of a respective said document change, wherein a respective said document change defines operations to be performed at the respective said position defined by the respective said edit reference associated with said respective said document change. Each said edit event is stored in event storage.

A selected edit list is generated for a set of selected edit events representative of a respective said specific combination view, wherein the selected edit list defines which of the edit events stored in the event storage are selected events that are utilized to generate a revised display presentation responsive to the event storage. The events in the selected edit list can comprise less than all the events between a first event and a last event within an ordering of the entry order of input. [Thus, for example, less than all the events entered in a sequence can be chosen to be used excluding one of more from the sequence that is selected as the selected set that generates the respective presentation.] Revised display presentation data is generated responsive to said selected edit list. A respective revised display presentation is generated responsive to said respective revised display presentation data. This can be repeated over and over again, iteratively.

The method as in Claim 1, further comprising: For example, a second selected edit list for a second set of selected events can be selected by a user on one or more computing subsystems. Second display presentation data, representative of a respective second display presentation, is generated responsive to said second selected edit list and to the event storage, and a respective second display presentation is generated responsive to the second display presentation data.

The method as in Claim 1, each said edit reference provides at least one of: a respective link to a respective specific position; a link to a specific position in the display presentation data; a link to a relative position in the display presentation data; a link to a position of one of the edit events; a position relative to another one of the edit events; and a respective link to a respective relative location in the revised display presentation data.

The method as in Claim 1, the display presentation data has a beginning and an end. The position is comprised of one of: a specific respective said edit event; the location within the display presentation data containing change data provided an edit event referred to by said position; a relative location within the display presentation data containing change data provided an edit event referred to by said position; the beginning of the display presentation data; and the end of the display presentation data.

The method as in Claim 1, there can be a plurality of users, each at an independent computing subsystem, wherein each of the plurality of users provides separate and independent entry of edit events.

The method as in Claim 1, the document change defines operations to be performed on the display presentation data by modifying the display presentation data at the respective said position defined by the respective said edit reference associated with said respective said document change.

The method as in Claim 1, each respective said document change defines operations to be performed relative to another said edit event at the respective said position defined by the respective said edit reference associated with said respective said document change.

The method as in Claim 1, selection of the selected events within said selected edit list is independent of the order that the edit events are added to the event storage.

In accordance with another embodiment of the present invention, a system and method for document creation and editing by at least one user is provided, comprising:

providing a display presentation of a respective document responsive to respective display presentation data; storing event data representative of respective events in document storage, said event data comprised of a respective document change and a respective edit reference for a respective event, and representative of a respective document edit relative to the display presentation of the respective document; wherein the respective edit reference defines a location for applying the respective document change; wherein the respective document change provides information on how to modify the display presentation; the method further comprising: selecting a set of the events as a selected set of events; generating revised display presentation data responsive to the selected set of events and the document storage; and providing a revised display presentation of a respective revised document responsive to the respective revised display presentation data.

The method as in Claim 9, each said edit reference provides information to locate one of: another said edit event; another said document change; a specific location at which to apply the respective change data relative to the respective display presentation. A respective location in the respective display presentation data; information on where to utilize the respective said document change relative to a beginning of the document; information on where to utilize the respective said document change relative to an end of the document; information on where to utilize the respective said document change relative to a beginning of the display presentation data; and information on where to utilize the respective said document change relative to an end of the display presentation data.

A new selected edit list can be generated responsive to selection of a new selected set of events, said selected edit list defining a respective selected combined view of up to a plurality of document edits that define a respective said revised display presentation. Respective revised display presentation data is generated responsive to the respective said selected edit list and the document storage.

The method as in Claim 9, each said respective document change provides information on at least one of: how to modify another said document change as located by the respective said edit reference, and where to insert the respective document change relative to one of before and after another said document change as located by said respective edit reference.

Edited display presentation data is generated responsive to the respective document changes in the events in the selected set of events. Difference edits are generated responsive to comparing said edited display presentation data and said display presentation data. The event data is generated responsive to said difference edits and said presentation data.

Edit data is stored for a plurality of respective edits, corresponding to respective said events, comprising a respective said selected set of events, for each of a plurality of selected sets of events. Each respective said selected set of events is comprised of a respective separate edit reference for each respective document edit in said respective selected set of events. The revised display presentation data is generated responsive to selection of one of the plurality of said respective selected set of events.

Each respective said document edit further comprises metadata defining conditions associated with creation of each respective said document edit; and wherein the revised display presentation is generated responsive to said metadata.

A respective said selected edit list is generated responsive to said metadata.

The metadata comprises at least one of: user identification, time of entry of a respective said event, duration of a respective said event, properties of a respective said document change, location of the user, identification of a respective associated said set of events, audio, video, image, comments, graphics data, and so forth.

In one embodiment, each said document change comprises: document data comprising at least one of: text, formatting, audio, video, graphics, and image data.

In another embodiment, each said document change comprises: a document operation comprising at least one of: insert-after causing the associated document data to be inserted after the said associated document edit located by said associated edit reference in said display presentation; insert-before causing the associated document data to be inserted before said associated document edit located by said associated edit reference in said display presentation; hide-reference causing the associated document data to hide said associated document edit located by said associated edit reference in said display presentation; and replace-reference causing the associated document data to replace said associated document edit located by said associated edit reference in said display presentation.

In accordance with another embodiment, a system for document processing and interacting with a user, is comprised a document processing system comprising: document storage for storing events representative of document edits relative to a document having a beginning and an end; wherein each said document edit is comprised of a respective document change and a respective edit reference; wherein the document edits are generated in a defined entry order of input; wherein each respective said document change provides information on how to modify the document with the respective said document edit at a location as located by each respective said edit reference; selection logic responsive to said user selection of a selected set of document edits, comprised of one of: no said document edits, one said document edit, and a plurality of said document edits; wherein the document edits in the selected set can comprise less than all the document edits between a first document edit and a last document edit within an ordering of the entry order of input; display generation logic for generating presentation data responsive to said selected set of document edits; and a display apparatus providing a display presentation responsive to the presentation data.

The respective said document change provides information for display of a respective document edit at a respective location as defined by the respective said edit reference at one of: a location relative to the location referenced by said edit reference, before the location referenced by said edit reference, and after the location referenced by said edit reference.

The edit reference provides one of: information to locate another document edit contained in the document storage, information to locate the beginning of the document, and information to locate the end of the document.

In another embodiment, there are a plurality of users, each said user providing input of document edits and having a display apparatus for said user; the system further comprising: a plurality of said selection logic and a plurality of said display generation logic, one of each for each said user, to provide control for each said user of selection of a respective said selected set of document edits, and to provide generation of a separate respective said display presentation for each said user.

In this multi-user embodiment, there are a plurality of document processing systems; a network coupling said plurality of document processing systems; wherein said selected set of document edits, is communicated, from one of the of document processing systems to at least one of a plurality of other ones of the document processing systems, as a communicated selected edit list via said network; and wherein each corresponding said display generation logic of a corresponding one of the plurality of document processing systems, locally generates respective said display presentation data responsive to said communicated selected edit list.

In accordance with the present invention, event processing systems and methodologies are provided, comprising: event storage, selection means for selecting a plurality of the events as a selected set of events, a presentation processor for assembling the events in the selected set of events in a defined order within the selected set of events, to in combination generate a presentation output comprising corresponding presentation data; and a display apparatus providing a presentation responsive to the presentation data. The event storage, stores event content for a plurality of events. The event content is comprised of: an edit event reference identifying a position relative to another event, and respective change data. The events are entered in an entry order of input, that is, there is a sequence of which event occurred when and by whom.

By selection of events, or of "documents" defining a specific set of events, there is an ability to (1) re-create any combination of events to obtain presentations that had previously existed (such as through the use of history detail log), and to (2) create new presentations that did not exist in the combinational form of presentation that it is now being combined to create.

A plurality of the events are selected as a selected set of events. This can be done by a number of means, such as by the actual user of the computing subsystem selecting a view or document that defines a respective selected set of events, or by another user at another of the computing subsystems, which other user determines what is seen by the actual user of the computing subsystem.

This can be done by a user of a computing subsystem selecting viewing and making edits to the presentation.

Events are created and stored at finite times (technically, occurring during finite intervals marked with a finite single time point), in event groupings comprised of from one to many events within each grouping, and starting with a first event at a first time, and then a second event at a second time, and then continuing to a last event at a last time, thus occurring within an defined ordering of entry order of input of the events.

In accordance with one aspect of the present invention, the selection of events for inclusion in the selected set is not restricted as are word processors (such as WORD) or photo editors (such as PHOTOSHOP), etc. That is, in accordance with the present invention, the events that can be selected to make up the selected set can comprise less than all the events between the first event and the last event within an ordering of the entry order of input.

A presentation processor assembles the events as defined by the selected set of events and in an order defined by and within the selected set of events. The assembly utilizes respective change data for each respective said event responsive to a respective event reference for each respective said event, to generate a presentation output comprising corresponding presentation data of the combination of the events as processed. A display apparatus provides a presentation responsive to the presentation data.

In accordance with another aspect of the present invention, the presentation data is structured in a format for all the events in the selected set of events, responsive to the respective change data and the respective edit event references.

The change data is comprised of operations comprising at least one of: an add change data and a modify change data; and the modify change data provides information on how to modify a respective part of the presentation created by the respective said event that is referred to by the respective event reference.

The add change data for a respective said event defines a relationship defining where to add the information to within the presentation, relative to a respective part of the presentation created by the respective said event that is referred to by the respective said event reference. The modified change data is comprised of a hide operation that allows previously added information, provided within a previous view of the presentation, to be excluded in assembling of a new said presentation for a new selected set of events that includes the respective event that comprises the hide operation.

For textual documents, the operations comprise at least one of: font changes, font colors, font style, and document formatting. For movie documents, the operations comprise at least one of: application of and parameters for at least one filter, application of and parameters for transitions, changing brightness, adjusting contrast, controlling audio features, clip in time mark and clip out time mark, and length of clip. For video documents, the operations comprise at least one of: application of and parameters for at least one filter, application of and parameters for transitions, changing brightness, adjusting contrast, controlling audio features, clip in time mark and clip out time mark, and length of clip. For still image documents, the operations comprise at least one of: application of and parameters for at least one filter, application of and parameters for transitions, changing brightness, adjusting contrast, and sizing. For audio documents, the operations comprise at least one of: application of and parameters for at least one filter, application of and parameters for transitions, controlling audio features, clip in time mark and clip out time mark, and length of clip.

The add change data specifies at least one of: adding a series of characters, and providing a formatting command; and, changing the way the characters following the formatting command are rendered in providing the presentation. The formatting command is one of: a stand-alone command and a linked command linked to another said formatting command. The linked command is associated with one other linked command, comprising at least one of a start command, and an end command. The start command initiates the assembly of the presentation which continues until the end command occurs in assembly of the presentation.

The formatting command changes the way that the characters following the formatting command are rendered in generating the respective said presentation. The modify change data command only affects a single respective said event within the assembly process conversion into respective said presentation data. The formatting command for a movie document defines a beginning of a scene, and an end of a scene. The formatting command for an audio document defines a beginning of a track and an end of a track.

Add change data adds media files comprised of at least one of: video clips, audio clips, still video images, animations, and text to a respective said presentation.

In accordance with another embodiment of the present invention, selection of the events for inclusion within the respective said selected set of events is based upon use of criteria.

The criteria can be comprised of many things, files, data, actions, etc. The criteria can be comprised of event content metadata, stored within the event content for each said event. The event content metadata, comprises variables that can be used to search and decide, such as one or more of: author name or other author information, time of creation of the event, employer information, client information, team-ID, team name, party-ID, location, GPS, and user-defined criteria.

In accordance with another aspect of the present invention, there is more than one set of events defining one and only one presentation display. There can be multiple sets of events, with each respective different one said set of events of the multiple sets of events, providing for generation of its own unique and different respective presentation, that can be mapped as a corresponding respective presentation view of a corresponding respective view document. Thereafter, a user can select a set of events by selecting the respective associated presentation view for that document, or by selecting the respective associated presentation document. Once a set of events is selected, thereafter, a respective presentation is provided on a respective display apparatus.

In accordance with a preferred embodiment of the present invention, selection of the presentation views is selected based upon one or more selection criteria. The criteria can be one or more of: a respective said event; a respective said user associated as owner of said event; a respective said data of said event; and, time of creation.

In accordance with another embodiment of the present invention, a plurality of the sets of events are created at various defined points in time, each of the sets of events having an associated respective presentation view, which provide a plurality for selection of presentations, by selective viewing of the presentation display at different stages of event entry over a time interval.

A document is defined responsive to selecting a set of events, wherein each respective selected set of events defines a respective document having an associated presentation display. Where there are a plurality of different selected sets of events, each defines a respective different document having a respective different associated presentation display. Selection of which of the presentations to view can be made by selecting based upon criteria that defines a respective presentation.

In accordance with another embodiment of the present invention, event processing and display responsive thereto are provided responsive to one or more user inputs by one or more users generating events representative of annotations made relative to a display presentation.

The event processing system and method, are responsive to the event generation, to provide storing of event content for a plurality of events, the event content comprising an edit event reference identifying a position relative to another event, and change data comprised of operations comprising at least one of: an add change data and a modify change data. The events are entered in an entry order of input, with unique increasing indexes. The modify change data provides information on how to modify a respective part of the presentation created by the respective said event that is referred to by the respective event reference.

The event processing system and method further provide for selecting a plurality of the events as a selected set of events. The events in the selected set can comprise all the events in the entry order, or it can comprise less than all the events between a first event and a last event within an ordering of the entry order of input (e.g., including the first, second and fourth events in the ordered entry, but not including the third event in the ordered entry).

The events are assembled for generation of display data, by processing the events within the selected set in a defined order as specified within the selected set of events, utilizing respective change data for each respective said event responsive to a respective edit event reference for each respective said event, to generate a presentation output comprising corresponding presentation data.

The presentation data is structured in a format for all the events in the selected set of events, responsive to the respective change data and the respective edit event references. A presentation is provided responsive to the presentation data.

Add change data for a respective said event defines a relationship defines where to add the information to within the presentation, relative to a respective part of the presentation created by the respective said event that is referred to by the respective said event reference.

The modified change data is comprised of a hide operation that allows previously added information, provided within a previous view of the presentation, to be excluded in assembling of a new said presentation for a new selected set of events that includes the respective event that comprises the hide operation.

There are different operations utilized for different types of documents.

For example, for textual documents, the operations comprise at least one of: font changes, font colors, font style, and document formatting.

For movie documents, the operations comprise at least one of: application of and parameters for at least one filter, application of and parameters for transitions, changing brightness, adjusting contrast, controlling audio features, clip in time mark and clip out time mark, and length of clip.

For video documents, the operations comprise at least one of: application of and parameters for at least one filter, application of and parameters for transitions, changing brightness, adjusting contrast, controlling audio features, clip in time mark and clip out time mark, and length of clip.

For still image documents, the operations comprise at least one of: application of and parameters for at least one filter, application of and parameters for transitions, changing brightness, adjusting contrast, and sizing.

For audio documents, the operations comprise at least one of: application of and parameters for at least one filter, application of and parameters for transitions, controlling audio features, clip in time mark and clip out time mark, and length of clip.

The formatting command provides at least one of: changing the way that the characters following the formatting command are rendered in the respective said presentation; affecting only a single respective said event within the assembly process conversion into respective said presentation data; for a movie document, defining a beginning of a scene, and an end of a scene; and for an The add change data adds media files comprised of at least one of: video clips, audio clips, still video images, animations, and text to a respective said presentation.

BRIEF DESCRIPTION OF THE FIGURES

The present invention may be better understood by reference to the following drawings along with the detailed description of the following drawings.

FIGS. 1A-11D illustrates various configurations and embodiments of the invention with various features and functionality.

FIGS. 1A-11D illustrates various configurations and embodiments of the invention with various features and functionality.

FIG. 1A illustrates an event processing system providing for user input of new events.

FIG. 1B illustrates an event processing system providing for user input of new events based on presentation data generated from a presentation processor using events in event storage.

FIG. 1C illustrates an event processing system providing for user input of new events using difference annotations based on formatted presentation data generated from a presentation processor using events in event storage.

FIG. 1D illustrates an event processing system providing for user input of new events using modified formatted presentation data based on presentation data generated from a presentation processor using events in event storage.

FIG. 1E illustrates an event processing system providing for user input of new events using modified formatted presentation data based on formatted presentation data generated from a presentation processor using events in event storage.

FIG. 4C provides a table of token types based on the granularity selected in subsystem embodied in FIG. 4B.

FIG. 4D illustrates pseudo-code that could be used in an embodiment of the granularizied comparison subsystem using a processor and memory.

FIG. 4G provides a table of token types based on the granularity selected in subsystem embodied in FIG. 4B for a media stream document.

FIG. 5A illustrates event storage for a text document and the state flow of the presentation processor assembling the events.

FIG. 5B illustrates the presentation data at various states as the presentation data is assembled by the presentation processor with events as shown in FIG. 5A.

FIG. 5C illustrates the formatted presentation data at various states responsive to the presentation data in FIG. 5B.

FIG. 5D illustrates event storage for a media stream document and the state flow of the presentation processor assembling the events.

FIG. 5E illustrates the presentation data at various states as the presentation data is assembled by the presentation processor with events as shown in FIG. 5D.

FIG. 5F illustrates the formatted presentation data at various states responsive to the presentation data in FIG. 5E.

FIG. 7A illustrates a multi-user event processing system utilizing at least one central server.

FIG. 7B illustrates a multi-user event processing system utilizing peer-to-peer distributed processing.

FIG. 10A illustrates an embodiment of the event and edit subsystem (710) as shown in FIG. 7B (701A, 701B, 701C) utilizing subsystems shown in FIG. 3A (100, 110 and 170).

FIG. 10B illustrates an embodiment of the event and edit subsystem (810) as shown in FIG. 7B (701A, 701B, 701C) utilizing subsystems shown in FIG. 3B (200, 210 and 270).

FIG. 10C illustrates an embodiment of the event and edit subsystem (910) as shown in FIG. 7B (701A, 701B, 701C) utilizing subsystems shown in FIG. 3C (300, 310 and 370).

FIG. 11B illustrates prior art documents saving different versions.

FIG. 11C illustrates prior art recorded changes in document editors.

FIG. 11D illustrates prior art undo operations.

DETAILED DESCRIPTION OF FIGURES

This is a detailed description of the figures STD 1941.

Figure 1A:
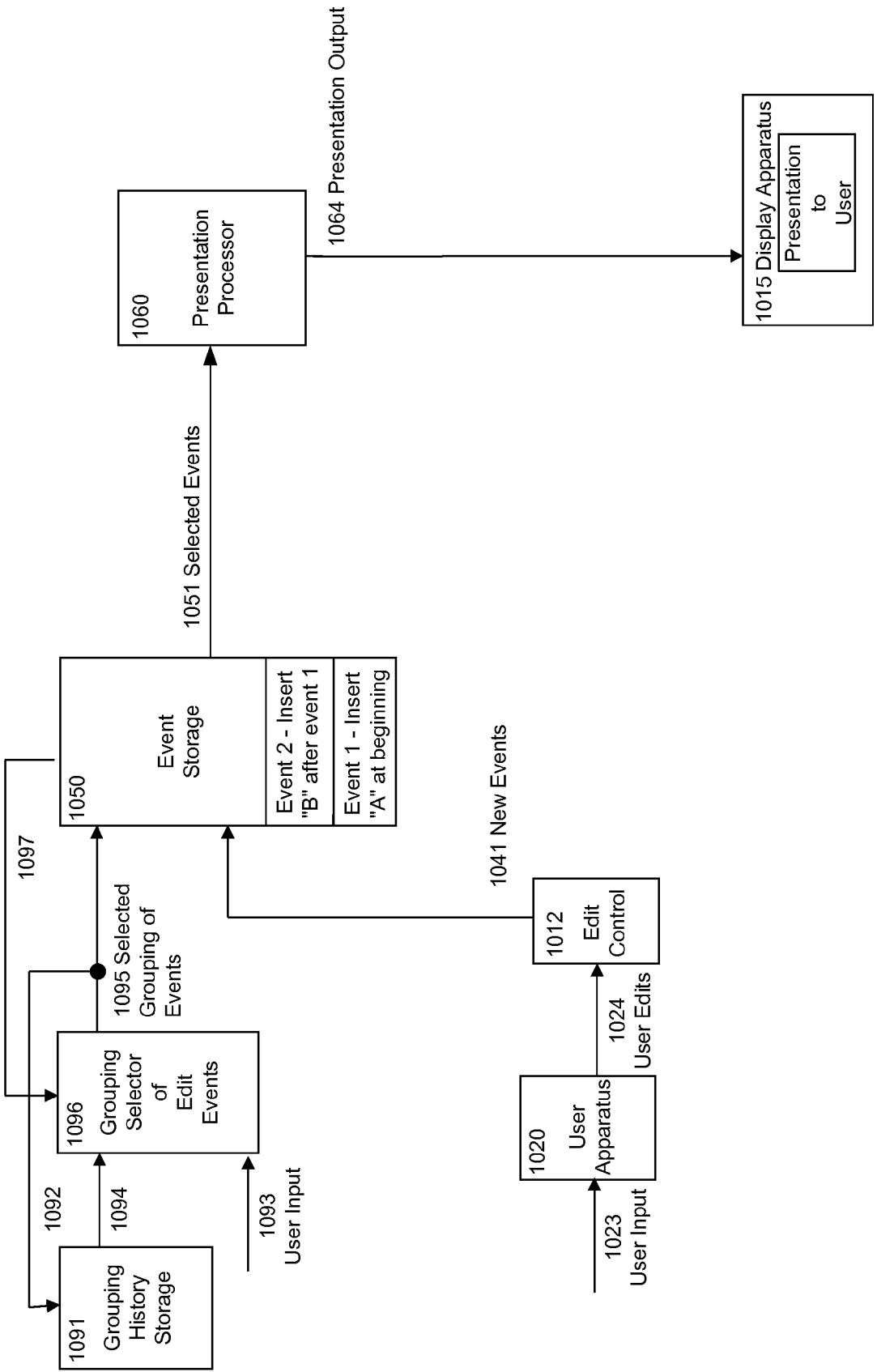

Referring to FIG. 1A, a first embodiment of an event processing subsystem (1000) is illustrated. The event processing system (1000) is comprised of a user input apparatus (1020), which is responsive to a user input (1023), which provides an output (1024) of user input data, which is coupled to an input of control logic (1012). The control logic (1012) provides an edit control subsystem, which processes the user input data (1024) to generate an output of events (1041). Each new edit event (1041) is comprised of event content (also referred to as edit event data) as is illustrated in other figures, and the discussion related thereto, such as FIGS. 1B, 1C, 1D and 1E.

In a preferred embodiment, the event content is comprised of an edit reference, an event-ID, and change data. The events are entered in a defined order of entry by one user, or by a plurality of users. Either way, there is a defined order of entry, both with reference to a single user's order of entry, and globally, with reference to the entry of order of each and every event relative to each and every other event.

The new event output (1041) is coupled to event storage (1050), which provides storage of the event content. As illustrated in FIG. 1A, the event storage 1050 is shown with two stored events therein. As illustrated, the first stored event is event "1", which stores the event-ID "1", the edit reference "insert at beginning" and the change data ("A"). Similarly, the second stored event (as illustrated) is comprised of the event-ID ("event 2"), the edit reference "insert after event "1"", and the change data ("B").

As illustrated in FIG. 1A, these events are stored in event 1 storage which is "event "1""-"insert ("A") at beginning". This illustrates, in context, the meaning of the event-ID, edit reference, and change data for a respective event.

A grouping selector (1096), which is responsive to a user input (1093), event data (1097) and grouping history data (1094), provides logic for selecting from zero to a plurality of the events from the event storage (1050) to define a selected set of events (1095), responsive to either a user input or other logic. The selected set of event (1095) are coupled to grouping history storage (1091) via 1092. The grouping history storage is updated responsive to the selected set of events.

In a preferred embodiment, each event in the grouping is identified by its respective event-ID. Alternative ways of referencing (in addition to "Event-ID") which events are in the selected grouping output (1095) can also be provided for. The events can be alternatively identified by a pointer to the storage of the event, an index into a table that stores the event, a count that identifies the event in a linked list of events, and numerous other ways mechanisms for identifying storage as practiced by databases, and other physical storage structures.

In an alternative embodiment, the event content is comprised of an edit reference (which provides a mechanism for identifying the event relative to another event), and the change data, such that no separate event-ID is required. In this manner, the defined order of entry of the events is retained, without requiring the specific assignment of an event-ID. For example, this can be done by always adding events to the end of a table, linked list or array of events. The edit reference would identify an event by a count of how many events it was previous to the current event. Since events are never deleted before the current event and always added after the current event the count will always reference a specific event.

The event storage (1050) is responsive to an input thereto as received from the grouping selector (1096) output (of a selected grouping of a selected set of events (1095)), to provide an output (1051) of event content for the selected set of events from the event storage (1050), representing the event contents for the respective stored events for the selected set.

A presentation processor (1060) provides a presentation output (1064) responsive to the output of event content for the selected events (1051). The presentation processor (1060) assembles the event content for each of the events in the selected set of events defined by the selected grouping of the set of events (output (1095)), and assembles the event content into an ordered format comprising the change data and the event-ID (in a preferred embodiment), responsive to the event-IDs and the edit references comprising the event content for the selected set of events, so as to generate the presentation output (1064) of the corresponding presentation data.

In an alternate preferred embodiment, the event-ID is not included in the presentation output, and the presentation data is formatted with no event-IDs therein, to generate formatted presentation data. In FIG. 1A, the presentation data is used for display only so the event-ID's are not required to provide a presentation to the user. This would be especially useful when generating an output for a standard viewing application such as ADOBE ACROBAT, VLC MEDIA PLAYER, WINDOWS MEDIA PLAYER, ITUNES . . . . FIGS. 1C, 1D and 1E also generate formatted presentation data in other preferred embodiments where standard applications also provide editing capabilities.

In another embodiment, the presentation data is formatted into an application specific data format with no event-ID therein. Examples of such application-specific formats are a word processing document file, a spreadsheet document file, a video format file, an audio file, or other applications specific data format for a file. A display apparatus (1015) is responsive to the presentation output (1064) to provide a presentation thereupon of the display presentation output to a user.

Referring to FIG. 1B, another alternative preferred embodiment of an event processor system (1100) is illustrated, wherein new events (1141) are generated responsive to both (1) the current presentation data (corresponding to the presentation as then being provided to the user), and (2) to the user input data (1123) as output from the user input apparatus (1120), which are processed to provide an output of the new edit events (1141). As illustrated in FIG. 1B, a user input apparatus (1120) provides an output of user input data (1121) representative of user edits. The output (1121) is coupled to the control logic (1112).

A grouping selector (1196) [analogous to the grouping selector (1096), as discussed above with reference to FIG. 1A], which is responsive to a user input (1193), event data (1197) and grouping history data (1194), provides an output (1175) of a selected set (defining a selected grouping of edit events) [analogous to (1095) of FIG. 1A]. The output (1175) is provided as an input to event storage (1150). The event storage (1150) is analogous to the event storage (1050) of FIG. 1A, and the storage of event content therein of event 1 and event 2 is the same. The selected set of event (1175) are coupled to grouping history storage (1191) via 1192. The grouping history storage is updated responsive to the selected set of events.

The event storage (1150) provides an output (1151) of event content for the selected event or events as per the selected set output. The event content output (1151) is coupled to the presentation processor (1160) which provides a presentation data output (1164), responsive to processing of the event content for each event of the plurality of events in the selected set of events, to provide an output of an ordered format, comprising a grouping of the change data and event-ID (for each event in the defined set, in a defined order, responsive to the event-IDs in the edit references for the event content in the events for the selected set of events.

The presentation processor (1160), event storage (1150), and grouping selector (1196) are analogous to those of FIG. 1A. However, at this point, FIG. 1A and FIG. 1B diverge. In FIG. 1B, the presentation data output (in a preferred embodiment) is coupled to an input of the control logic (1112). The control logic (1112) provides an output of display data (1113), which is coupled to the display apparatus (1115) to provide a presentation to the user on the display apparatus (1115). The display data output (1113) is generated by the control logic (1112) responsive to processing of the presentation data (1113), and can also be responsive to additional input of user edits (1121) to provide a display presentation on the display apparatus (1115). In one case, that presentation is of the presentation data (1113) as output from the presentation processor (1160). In another case, the presentation is of a combination of the presentation data output (1113) from the presentation processor (1160) as combined with the user edits (1121), to generate a presentation showing how the user edits have altered or modified an existing presentation. Additionally, the control logic (1112) provides an output of event content for new events (1141) coupled to the event storage (1150) for storage of the new events therein.

Alternatively, the presentation data output (in a preferred embodiment) can also be coupled directly to the display apparatus (1115) per the alternate display data input (1116). This alternate embodiment can be used to display the presentation on the display apparatus independent of the edit control (1112) or if the edit control can is not able to provide the display data (1113).

FIG. 1C illustrates another embodiment of an event processing system (1200), which utilizes the generation of difference annotations (1242) by the control logic (1212) responsive to the user input of user edits (1221) and the input of the formatted presentation data (1274) to provide an output of the difference annotations (1242). The difference annotations (1242) are coupled as an input to an event generator (1280), which also has a second input coupled to receive the presentation data output (1264) from presentation processor (1260). Event generator (1280) generates event content for new events [a.k.a., new edit events] (1241), which are coupled to the event storage (1250) for storage of the event content therein. Grouping selector (1296), which is responsive to a user input (1293). Grouping and grouping history data (1294), grouping history storage (1291) via 1292 is responsive to selected set of events (1275), event storage (1250), presentation processor (1260), user apparatus (1220), which is responsive to a user input (1223), and display apparatus (1215) are analogous to the corresponding subsystems of FIG. 1B in the (1100) series having corresponding last two digits in the numbers.

However, FIG. 1C differs from FIG. 1B as follows. In FIG. 1C, the presentation processor (1260) provides presentation data output, coupled to format logic (1270) and to the event generator (1280). The presentation data output (1254) is coupled as an input (1271) to format logic (1270). The format logic (1270) processes the presentation data (in a preferred embodiment) to be formatted with no event-IDs therein, to generate formatted presentation data output (1272), which is coupled as an input (1274) of formatted presentation data (in a preferred embodiment) coupled to control logic (1212). Control logic (1212) is responsive to the input of user edits (1221) and to the input of the formatted presentation data (1274) to provide an output of difference annotations (1242) coupled as one input to event generator (1280). The other input to the event generator (1280) is the presentation data (1264) as output from the presentation processor (1260). As illustrated, the event generator (1280) is responsive to the modified presentation data and to the difference annotations (1242) [as output from the control logic (1212)], to generate an output of event content for said new events output (1241), which event content is thereafter stored in the event storage (1250). Additionally, the control logic (1212) is responsive to the formatted presentation data (1274) [as output from the format logic (1270)] and the user edit data (1221), to provide an output of display data (1213), and the display output (1213) is coupled as an input to the display apparatus (1215) [such as an LCD display, a projector, audio speakers, a CRT, etc.], which provides a presentation to the user responsive thereto.

In an alternative embodiment of FIG. 1C, the formatted presentation data output (1272) of the format logic (1270) is also coupled directly (as shown by the . . . (dashed) line) to the input (1276) of the display apparatus (1215) to permit providing of a presentation to the user responsive thereto.

FIG. 1D another alternative embodiment to that as shown in FIG. 1A-FIG. 1C. As shown in FIG. 1D, an event processing system utilizes an output of modified formatted presentation data (1343) [coupled from the control logic (1312)] to provide an input to the event generator (1380), which responsive thereto, and responsive to the presentation data output (1364) [from the presentation processor (1360)], provides an output of new events (1341) which is coupled as an input to the event storage (1350) for storage of respective event content therein.

Many of the numbered component elements of FIG. 1D, which are similarly numbered to the correspondingly numbered components of FIG. 1C, are analogous thereto. Thus, the numbered element components 13XX of FIG. 1D are mostly analogous to the 12XX components of FIG. 1C, e.g., 1251/1351, 1271/1371, 1275/1375, 1291/1391, 1292/1392, 1293/1393, 1294/1394, 1296/1396 and 1296/1397. However, FIG. 1D differs from FIG. 1C, in the following ways, in addition to the event generator differences as discussed above herein). Control logic (1312) [of FIG. 1D] is responsive to the user apparatus (1320), which is responsive to a user input (1323), output of user edits (1321) and to an input (1374) of the formatted presentation data output (1372) of the format logic (1370), to provide for generation of modified formatted presentation data (1374) [as opposed to FIG. 1C, wherein the format logic (1270) provides for output of difference annotations (1242)]. Control logic (1312) provides an output of display data (1313) provide a display [presentation] which output (1313) is coupled to the display apparatus (1315), which, responsive thereto, provides a presentation to the user thereof.

Alternatively, the formatted presentation (1372) output from the format logic (1370) is coupled as alternative display data (1376), directly coupled as an input to the display apparatus (1315) which, responsive thereto, provides a presentation (e.g., audio, video, any display) to the user on the display apparatus (1315). The display data output (1313) can either be the same as the modified formatted presentation data output (1343), or it can be different, as response to, but not limited to, the user providing edits on user input (1323).

In one case, the input of user edits (1321) are coupled through the control logic (1312), and those edits are combined with the formatted presentation data (1374) by the edit control logic to provide a display output (1313) which generates a presentation view showing the formatted presentation data output (1374) with the user's edits shown at the appropriate place therein. However, there can be a different presentation (view) if the user edits (1321) are processed in a delayed manner, such as in a batch mode, or via coupling to a network or a cloud, then the processing of the user edits and the formatted presentation data to generate modified formatted presentation data that is used to generate (and coupled to the event generator used to generate) new edit events. The separate output (1376) can be different from, or the same as, the display data output (1313).

In one embodiment, the display data output (1313) from the control logic (1312) is provided anew for each input of user edits (1321) to the control logic (1312). Thus, the presentation to the user on the display apparatus (1315) is updated with each input of edits. The output (1313) from the control logic (1312), of the modified formatted presentation data (1343), can either be provided each time the user provides edits, in the same manner as the display output (1313), or alternatively, can be provided at periodic intervals as processed by the control logic (1312), either automatically or manually based upon a user input.

In one alternate embodiment, the display output (1313) is the same as the modified formatted presentation data output (1343). In other embodiments, the display output (1313) and the formatted presentation data output (1343), can be separate and different outputs, which can sometimes be the same and sometimes be different, or can always be the same, or can always be different.

As shown in FIG. 1D the edit control (1312) outputs modified formatted presentation data (1343) and inputs formatted presentation data (1374) in a format such as WORD ".doc", POWERPOINT (.ppt), video editor formats, HTML, audio editor formats, etc. These embodiments of the edit control logic (1312) can comprise a computer and a standard document editors such as WORD, POWERPOINT, WORDPERFECT, word processors, presentation tools and others. The user input (1323) is provided to the user apparatus (1320). The user apparatus and display apparatus (1315) are connected to the computer that the standard document editor is running. The formatted presentation data can also be communicated to the standard document editors using OBJECT LINKING AND EMBEDDING (OLE), COMPONENT OBJECT MODEL (COM), DISTRIBUTED COMPONENT OBJECT MODEL (DCOM), DYNAMIC DATA EXCHANGE (DDE), application linking APIs, etc. Likewise the modified formatted presentation data can use the same communication means. The advantage of this embodiment is that it allows current document editors to be integrated into an event document system so the user can use a tool that they are comfortable with but still gain the advantages of an event document system. The disadvantage is that the event processor may have significant computational requirements to determine the new events. Ambiguities exist in exactly how the user modified the document (but the end result looks the same). The events created in this embodiment may not be exactly the same as the events generated by user but the resulting document will be the same. For instance, if two clips are added to a video this system before the modified formatted presentation data is output, the event processor will not be able to determine which was added first by the but will add both clips as predefined by logic (or the user will need to intervene with further input to provide more information). In addition, there can be ambiguity as to what was actually done by the user. The display was initially "A" and the user added an "A" so the display is "AA". Which "A" was added, the first one or the second? The modified formatted presentation data ("AA") doesn't tell you which it was so the event processor will need to pick one of those choices. Usually, this doesn't matter since the result looks identical. Another example shows this more dramatically but the result looks the same. Suppose the original display is "lone" and the modified display is "lone gone". Did the user add "gone" to the end or did they add and an "one g" after "1"? Or did the user add "gunmen" then delete "u", "m" and "n" (last one in "gunmen"), then add an "o" after "g"? It is impossible to tell without more information, but the ability to use standard editors allows the embodiment to be quickly adopted and implemented quickly.

The embodiment of the edit control (1212) in FIG. 1C requires modifications to current document editors or custom document editors to be integrated into an event document system. In this case, the edit controller keeps track of changes to the formatted presentation data as the user inputs them. The difference annotations provide information that indicates where the modified formatted presentation data and the formatted presentation data are identical and where and what the modified formatted presentation data contains different information and where the formatted presentation data that was deleted. This can easily be kept track of by the edit controller as the user deletes information from the display (creating a difference where no new information is added and the formatted presentation data is replaced with nothing or where the different information in an existing difference is removed). If information is added to the display then the a new difference is created that replaces nothing or the information is inserted into difference information of an existing difference. In the examples above, this embodiment would specify exactly which "A" (the first or second) was added to create "AA". There would be no ambiguity as to where the characters in "lone" ended up in "lone gone". However, it would not indicate the order or exactly how the display ended up at "lone gone". Of course if the difference annotations were output after every change to the display by the user this history would be captured but that may not be an efficient way to operate the system. In many cases multiple changes would be submitted to the event processor at once with one difference annotation output. This embodiment does not capture all the history of how the document was modified but does capture the end result exactly between submissions of the difference annotations. This reduces the computational requirements on the event processor because the compare logic is not required in the system 1200 in FIG. 1C. The event generator compares the difference annotations (1242) to the presentation data (1264) and can create the new events (1241) because the presentation data contains the change data and the corresponding event-ID which is used in the edit reference in the new event. The event generator assigns the event-ID of each new event as it is created.

The embodiment of the edit control (1112) in FIG. 1B requires modifications to current document editors or custom document editors to be integrated into an event document system. A disadvantage of this embodiment is that it requires modifications to current document editors to be integrated into an event document system. In this case, the edit controller creates a new event every time a change was made. The presentation data (1114) contains not just the change data from the selected set of events but also the event-IDs corresponding to the change data. Thus, the new event can be created since we know that a change was made in reference to an event-ID, which is used in the edit reference in the new event. The edit controller can save up these new events and submit them to the event processor in a batch mode or as they occur on output new events 1141. An event-ID must be assigned to the new events. This can be done in several ways: the edit controller can assign unique event-IDs as the new events are created, the event processor can provide the edit controller with a unique event-ID as the events are created, and the edit controller can generate temporary event-IDs (needed so new events can refer to older new events before being submitted to the event processor for storage) and the event storage (1150) would assign permanent event-ID's before storing in the events in event storage (the edit references would also need to be modified if they referred to a temporary event-ID). The advantage of this embodiment is that all the history of the user changes are captured and there is no ambiguity as to exactly how the user modified the document. Thus this embodiment will provide the exact information of how the user modified "lone" to get "lone gone" in the example above.

FIG. 1E illustrates another alternative embodiment of an event processing system. The event processing system (1400) is shown, utilizing both modified presentation data [(1443) (output from control logic (1412))] and compare logic (1490) to generate the new events (1441). Many of the components of FIG. 1E are the same functionally to those of FIG. 1D, such that (14XX) is the same as (13XX) (e.g., 1313/1413, 1315/1415, 1351/1451, 1371/1471, 1375/1475, 1376/1476, 1391/1491, 1392/1492, 1393/1493, 1394/1494, 1396/1496 and 1396/1497), except for: 1.) the addition in FIG. 1E of compare logic (1490) in the path between the control logic (1412) and format logic (1470), and 2.) the resultant providing of an output of difference annotations (1442) from the compare logic (1490), which output (1490) is coupled as an input to event generator (1480). Another input of the event generator (1480) is coupled to receive presentation data output (1464) from presentation processor (1460). Responsive to these two sources of input, event generator (1480) provides an output of event content for respective new events (1441) coupled to event storage (1450) for storage of said event content therein. As shown in FIG. 1E, responsive to a user stimulus (1423), the user input apparatus (1420) provides user input data of user edits (1421) coupled to the control logic (1412), which is also responsive to an input of formatted presentation data output (1474) coupled from the format logic (1470), to provide for generation of an output of modified formatted presentation data (1443) which is coupled as one input to compare logic (1490). The formatted presentation data output (1472) from the format logic (1470) is coupled to the other input of the compare logic (1490). The compare logic (1490) provides an output of difference annotations (1442) responsive to a comparison of its inputs. The output of the difference annotations (1442) from the compare logic (1490) is coupled as one input to the event generator (1480). The presentation data output (1464) from the presentation processor (1460) is coupled as an input to another input to the event generator (1480), and is also coupled as an input to the format logic (1470) [The operation of the format logic (1470) is as described with reference to format logic (1370) of FIG. 1D]. The event generator (1480) is responsive to its inputs to provide an output of new events (event content for new events) (1441), which said event content is stored in event storage (1450), as illustrated in FIG. 1E.

This embodiment of the edit control (1412) is identical to the embodiment shown in FIG. 1D of the edit control, 1312.

Figure 2A:
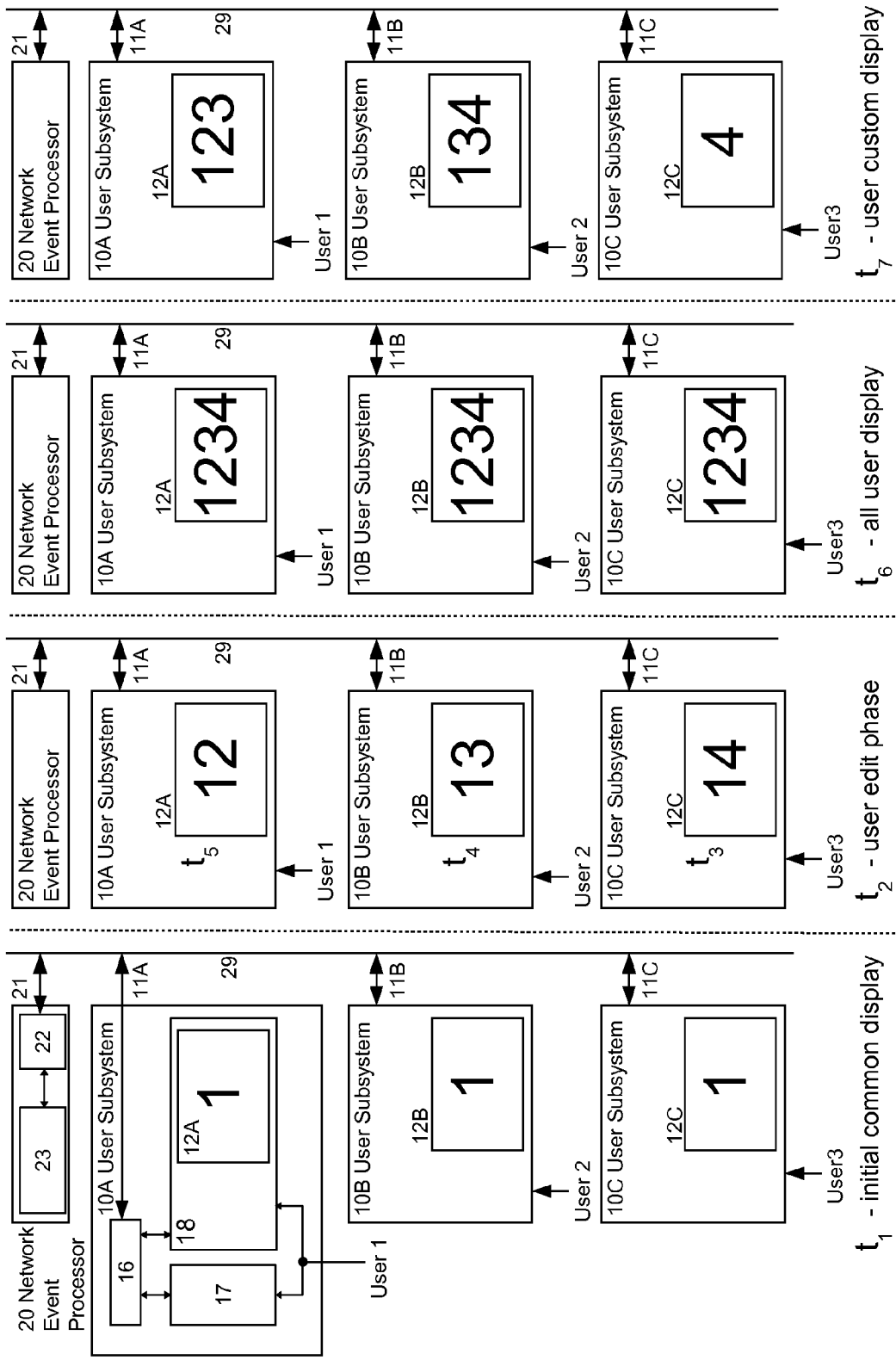
FIG. 2A illustrates a collaborative multi-user system for text-based documents using a central server for event storage. The figure depicts the user displays at different times as the users interact with the system.
Figure 2B:
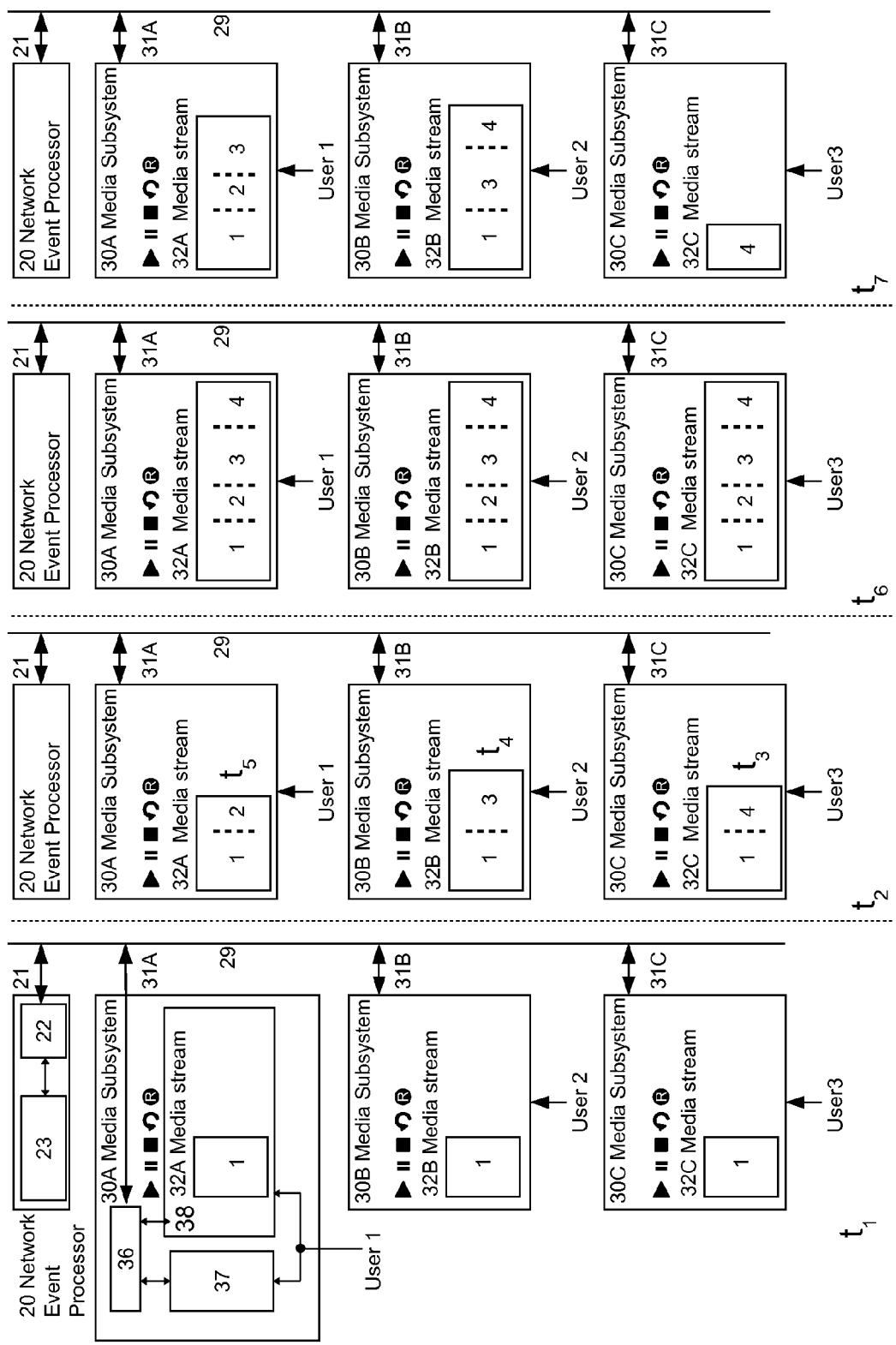
FIG. 2B illustrates a collaborative multi-user system for media-based documents such as video and audio using a central server for event storage. The figure depicts the user displays at different times as the users interact with the system.
Figure 2C:
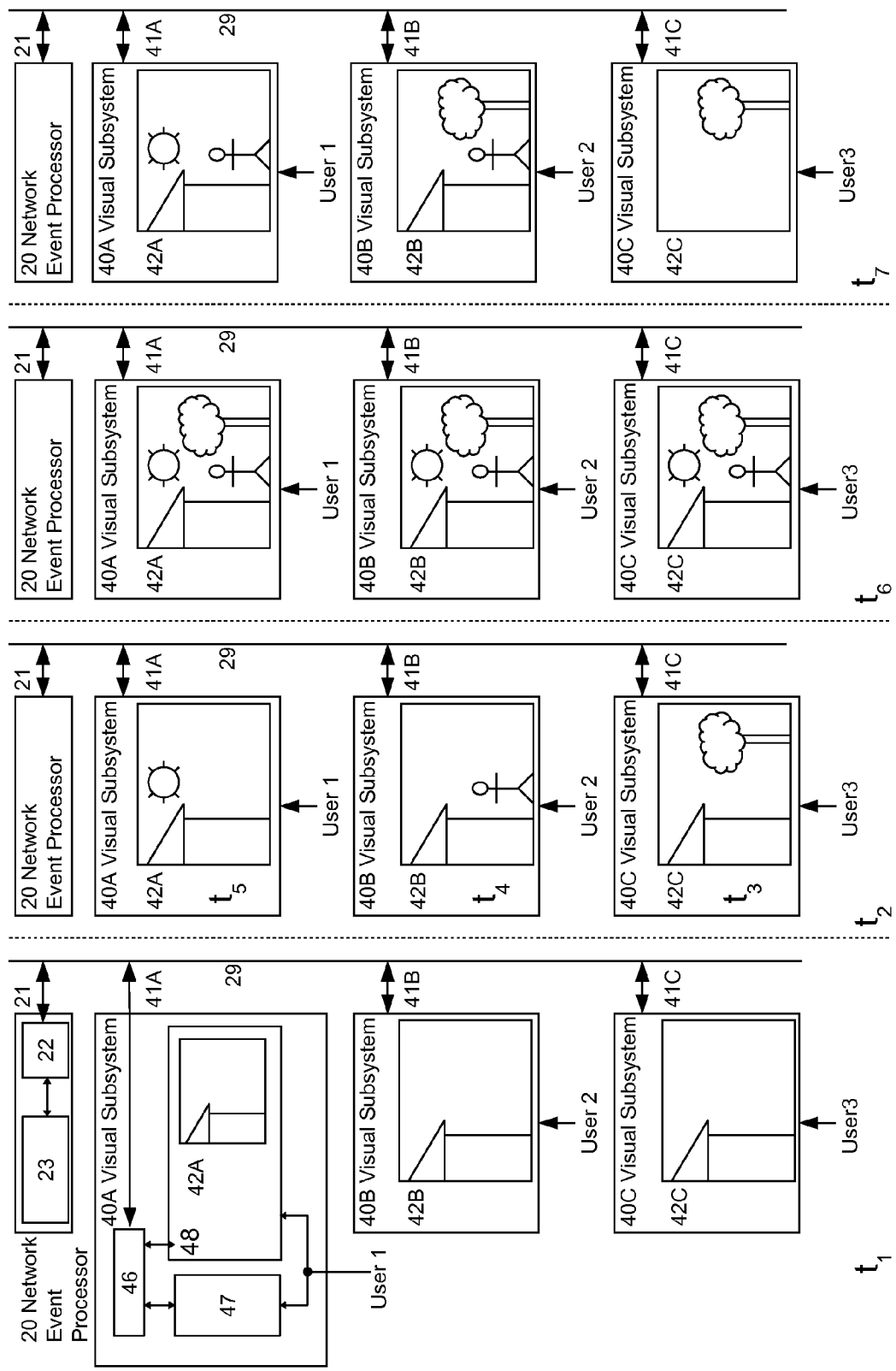
FIG. 2C illustrates a collaborative multi-user system for visual-based documents such as image, 3D models, drawings and POWERPOINT using a central server for event storage. The figure depicts the user displays at different times as the users interact with the system.

FIG. 2A, FIG. 2B, and FIG. 2C illustrate alternative embodiments of multi-user based event processing systems. As illustrated in FIG. 2A, FIG. 2B, and FIG. 2C, a plurality of user subsystems are shown therein, with a network event processor coupled via a communications interface to provide for selective processing and generation of a presentation display of the events. The figures, FIG. 2A, FIG. 2B, and FIG. 2C, provide a state flow diagram and a time sequence illustration of the processing of the input of events and edits by three users, and also illustrates how the inputs of the users are processed over time to generate and provide a presentation output on the display apparatus. FIG. 2A illustrates an event processing system at network level, for a document (such as a word processing document, a spreadsheet document, or other text document). FIG. 2B provides the same type of illustration but for a media-based system (such as where there is an audio file or video file, a media stream, etc.). FIG. 2C illustrates an alternative network-based multi-user system, for an image-based system (such as still, video, 3-D models, 2-D models, etc.).

Figure 9A:
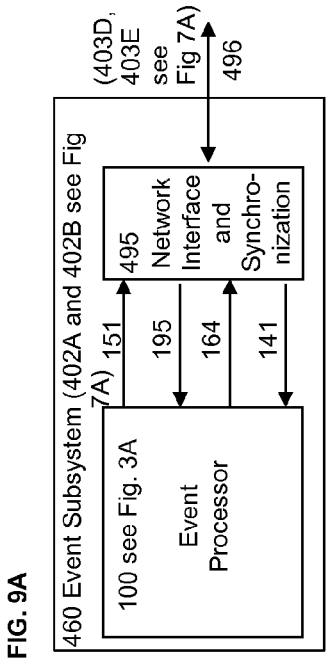
FIG. 9A illustrates an embodiment of the event subsystem (460) as shown in FIG. 7A (402A and 402B) utilizing subsystems shown in FIG. 3A (100).
Figure 9B:
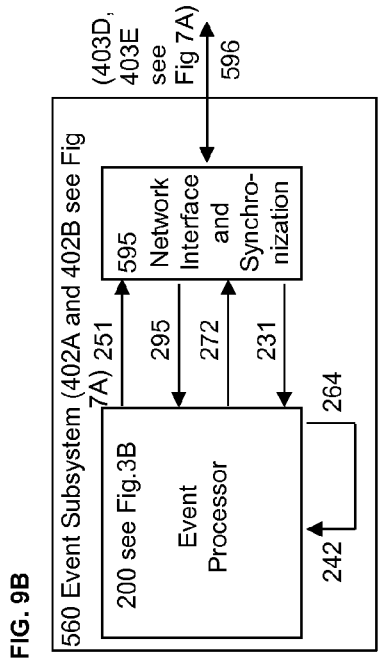
FIG. 9B illustrates an embodiment of the event subsystem (560) as shown in FIG. 7A (402A and 402B) utilizing subsystems shown in FIG. 3B (200).
Figure 9C:
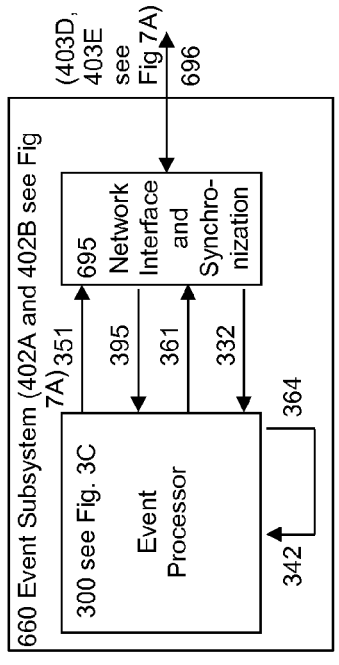
FIG. 9C illustrates an embodiment of the event subsystem (660) as shown in FIG. 7A (402A and 402B) utilizing subsystems shown in FIG. 3C (300).
Figure 8A:
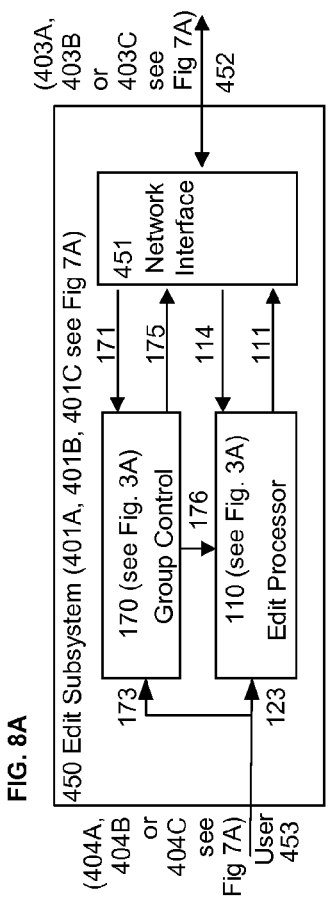
FIG. 8A illustrates an embodiment of the edit subsystem (450) as shown in FIG. 7A (401A, 401B and 401C) utilizing subsystems shown in FIG. 3A (170 and 110).
Figure 8B:
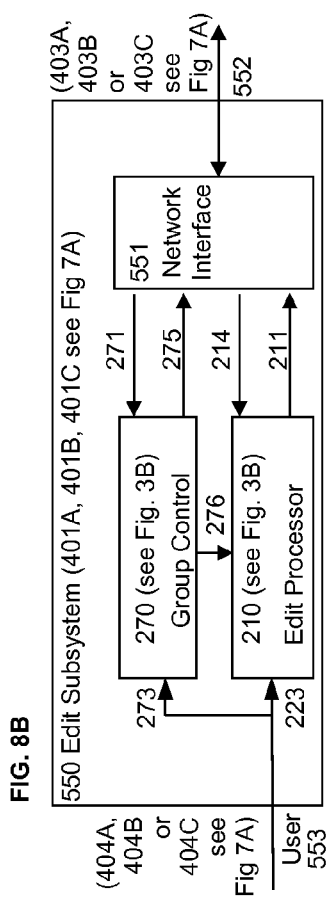
FIG. 8B illustrates an embodiment of the edit subsystem (550) as shown in FIG. 7A (401A, 401B and 401C) utilizing subsystems shown in FIG. 3B (270 and 210).
Figure 8C:
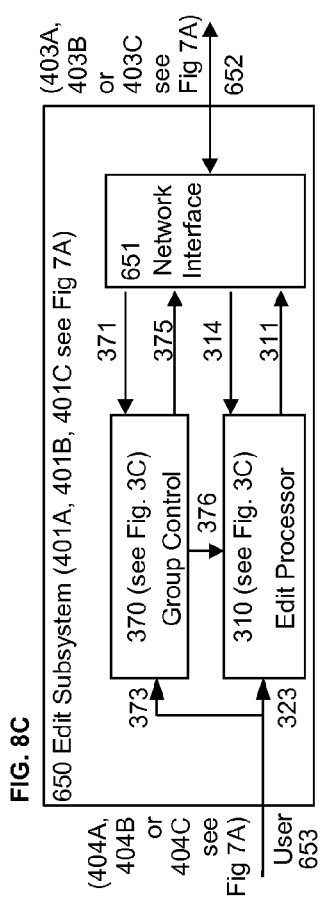
FIG. 8C illustrates an embodiment of the edit subsystem (650) as shown in FIG. 7A (401A, 401B and 401C) utilizing subsystems shown in FIG. 3C (270 and 210).

The system as illustrated in FIG. 2A, along with the time sequencing of output and state flow, are illustrated in further detail in system block diagrams and detailed circuit block diagrams in FIG. 7A, FIG. 8A, and FIG. 9A in combination, FIG. 8B, and FIG. 9B in combination, and FIG. 8C and FIG. 9C in combination. FIG. 2A also corresponds to FIG. 3A, which provides a detailed block diagram and state flow chart illustrating the entry and processing of events to generate a presentation on a display apparatus.

As illustrated in FIG. 2A, there are a plurality of user subsystems, 10A, for user 1, 10B for user 2, and 10C for user 3. The user subsystems are coupled via communications interface 16 to an output 11A, 11B, and 11C [for 10A, 10B, and 10C] to couple output data (21) from each subsystem to a communications bus interface network (or network or cloud), which couples the data (21) to the communications interface (22) of network event processor (20) (in a preferred embodiment), which provides centralized event processing. The communications interface 22 is coupled to the event processor 23. The communications interface 16 couples to the group selector logic 17. The editor logic displays the presentation on display 12A, 12B, and 12C for each user. Elements 16, 17 and 18 are also contained in 10B and 10C although not shown for clarity since the resulting displays is the focus of this figure. Elements 36, 37 and 38 in FIG. 2B function similarly to elements 16, 17 and 18 respectively. Elements 46, 47 and 48 in FIG. 2C function similarly to elements 16, 17 and 18 respectively.

FIG. 2A is divided into four columns indicating (and corresponding to) multiple phases of user edits, at multiple times. The first column on the left of FIG. 2A, illustrates an initial common display presented to all users, at a first time ($t^1$). The second column from the left shows at time ($t^2$), where one or more users are making edits to an initially displayed presentation of selected events. That initially displayed presentation can be based upon already stored data, or something new that a user enters.

As illustrated in FIG. 2A, at time (t1), (the first column) the display apparatus 12A, 12B, and 12C, respectively, for user 1, user 2, and user 3, provide a display presentation of the number ("1") as a presentation on the display apparatus. During the time interval of time ($t^2$) (the second column from the left), user inputs occur at time ($t^3$), time ($t^4$), and time ($t^5$). At time ($t^3$), user 3 provides an input of an edit providing an input of the number 4 after the number 1. At time ($t^4$), user 2 provides an input of the number 3, to be placed after the number 1. Above that, at time (t5), user 1 provides an input of the number 2 after the number 1, in the display. In the third column from the left in FIG. 2A, at time ($t^6$), all the events are processed by the network event processor and the processed data is coupled via the communications bus interface (29) to couple corresponding presentation data output via communications data interface 11A, 11B, and 11C, respectively, for users 1, user 2, and user 3, to provide an updated display presentation of all of the user edits as in the proper order/sequence as inputted at the respective times. The order of the inputs is analogous to a single user input, wherein the latest in time input takes priority in the sequence, so that at time ($t^5$), the user 1 instructed the system to put a 2 after the 1. This takes precedence over an earlier time when, at user 2, said at time ($t^4$), to put a 3 after the 1. Subsequent to that, at time ($t^5$), user 1 said to put a 2 after the 1.

In the third column from the left in FIG. 2A, at time (t6), the display on all of the users' displays provides 1, 2, 3, 4, in the sequence in the manner as described. Other alternative priority methodologies can alternatively or additionally be utilized, such as one (or a plurality) of user(s) are given priority of their work so their events are always processed before the non-priority users. Additionally, the users or the user subsystem can provide different ways of specifying the location in the presentation data where the event content is inserted. This example, only shows that the event content is inserted after another event. The event could be inserted before another event also. It could also be inserted at a fixed place in the presentation. Insert at beginning or insert at end are the most common fixed locations. However, some embodiments may choose to allow inserts at some fixed offset (forward or backward) from an event or the beginning or end of the presentation data. The offset could be counted in events or in document entities (atoms or tokens). The offset could also be a physical location relative to an event for media that is image-based or for textual media placement on a page.

As illustrated in FIG. 2A, one methodology of prioritizing ordering of the user event input is illustrated. Alternatively, for other embodiments, other rules of ordering and sequencing can be followed, to provide for different functionality as desired for that system. The ordering of the user events is determined by selecting the proper edit reference and by the presentation processor. For example, suppose the user is viewing a presentation of a document that shows "fox jumped". The user adds "quick" to the beginning of the display so the result is "quick fox jumped". Should "quick" be inserted after the beginning of the document or before the event that added "fox"? Either makes sense for this display. If there was an unselected event inserting "The" at the beginning and this event is now displayed with the "quick" user input the display will be either "quick The fox" or "The quick fox". Obviously in this case you would prefer the latter. The decision will depend on the system. For this text based system, generally the "at the beginning" reference should only be used if there is no event available to reference a new event to or if the user indicates that is the proper place. Additionally, the user may further add "brown" to "The quick fox" between "quick" and "fox". Should "brown" be added before "fox" or after "quick"? This is a bit more of a nuanced decision and may depend on context information in the events. Generally, inserting after "quick" could be the default decision. However, "brown" is an adjective and adjectives generally go before a noun ("fox") so it may be preferable to insert it before "fox". That would be the rule for English but other languages have other rules for adjectives so the decision may be language dependent. Further, if "fox" was input by another user it may be better to insert "brown" after "quick" because both were entered by the same user. The information as to the user that input an event is one example of context information that can be stored in the events for later use. Similarly, the presentation processor may choose to assemble the presentation differently when some events are not selected. For example, just the opposite could be provided, where the first edit made gets precedence over the last edit made in a multi-user system. Alternatively, a method of edit reference can be provided for the multi-user environment, that is not limited to a single previous event, but can be related to multiple events, or to multiple factors, to facilitate a supporting of a cloud environment to allow a user to choose how the later-made references are treated relative to the earlier references. There are many options that can be optimized for the particular type of document (text, movie, audio, image based) that is being stored and how the users expect to view the document.

In the fourth column from the left in FIG. 2A, at time ($t^7$), each user is provided with a display presentation for that user responsive to a respective set of selected events, either as selected by that user for (or otherwise as selected) as to which users' inputs of edits will be displayed. The selection of events for a user may not be at the user's complete discretion. The network event processor (20) or their user subsystem (10A, 10B, 10C) may impose limits on the events that can be selected for a user. For example, for security concerns or for work flow automation all users may not be able to view events. However, since all users are still working the same event storage their individual work is automatically integrated together and other users that can select all the events have an instant availability to everyone's work in context with each other without time consuming, non-productive integration or delays for user to wait for another user to complete their work. User 1, at time $t^7$, has selected to see a presentation ("1 2 3") corresponding to the initial display plus user 1 and user 2 inputs, provided in the ordering and time sequences as described for FIG. 2A. Whereas, user 2 has selected a presentation ("1 3 4") corresponding to the initial display of 1, plus user 2 and user 3 inputs. User 3 has selected a presentation ("4") to see only the edit event input of the number 4 as provided by user 3. It should also be noted that at time $t^7$ none of the user's are displaying a presentation of the document that has ever been seen before by any of the users, a unique feature of the event based document system.

Referring to FIG. 2B, an analogous system to that of FIG. 2A is shown, except that the events and display relate to a media file display relating to media data. As illustrated, a media stream is provided comprising a video or audio file that has content comprised of multiple segments that sequence and change over time which can be combined to comprise a whole, such as audio, (e.g., an audio song, speech), or video (e.g., a movie, etc.). In an analogous manner to FIG. 2A, at time $t^1$, user 1, user 2, and user 3 have a common local display of an initial presentation showing a first media clip ("Clip 1") within the media file display (38). During time interval ($t^2$), user 1, user 2, and user 3 provide additional media files—clips to be added to or otherwise annotated relative to the initial media file (or media stream of data). As illustrated in FIG. 2B, time ($t^3$), time ($t^3$), time ($t^4$), and time ($t^5$), occur within time interval ($t^2$). At time ($t^3$), user 3 provides media clip 4 to be placed after media clip 1. At time ($t^4$), user 2 provides an input of media clip 3 to be placed after media clip 1. At time ($t^5$), user 1 provides an input of media clip 2 to appear after media clip 1.

At time $t^6$, the network event processor 20 processes the additional clips that were provided at time during time interval ($t^2$), [as occurred at time ($t^3$), time ($t^4$), and time ($t^5$)] and provides an assembled presentation output that is coupled via communications interface (29), to the user media subsystems (30A, 30B, 30C) for the users (1, 2, 3, respectively). The assembled presentation output for each user is then displayed to each of the users as a presentation of media clip 1, followed by media clip 2, followed by media clip 3, followed by media clip 4. This ordering is chosen by the network event processor in this embodiment [alternate preferred embodiments can insert the media stream differently] is determined by the relative time when the media clips were inserted by each user and where the user chose to insert the clip. Each user in this example inserted their respective clip after clip 1. User 1 first inserted clip 4 after clip1 at time $t^3$, $t^4$ . . . . User 2 at time $t^4$ inserted clip 3 after clip 1 which places it after clip 1 and before clip 4. Finally, user 3 inserts clip 2 after clip 1 at time $t^5$. Clip 2 is inserted after clip 1 which places it after clip 1 and before clip 3 which is followed by clip 4. The users could have chosen to insert their clip "at the end" of the presentation data. If user 2 had chosen this placement, then the resulting clip order would be clip 1, clip 3, clip 4, clip 2.

Similarly, as described to FIG. 2A, and FIG. 2B, other rules of ordering and hierarchical processing can alternatively or additionally be followed. While this order is best for many situations for a single user, and for some situations of multiple users, it may or may not be best for a given situation for multiple users, and all such alternatives are consistent with the teachings of this present invention.

At time ($t^7$), each user is provided with a custom selection of which of the clips they will be present. In a preferred embodiment, each user is provided with a selection of which user annotations they would like to see. [Alternatively, other means of selection can be provided, such as by another user for other users, or by computer logic.] Analogous for FIG. 2A, FIG. 2B, and FIG. 2C, the network event processor (20) responds to the user requests of specific clips to be seen, as controlled by the group selector responsive to a user input, and provides the presentation data output as needed for generation of the presentation on the display apparatus. As shown in FIG. 2B, user 1, at time ($t^7$), is illustrated as having requested and being provided with a display presentation of the initial clip 1, combined with the input annotations of user 1 and user 2, showing a resultant display presentation of a sequence of clip 1, clip 2, and clip 3 in that order of sequence. User 2, at time ($t^7$), is illustrated as having chosen and being provided with a display presentation of the initial clip display 1 followed by the input annotations of user 2 and user 3, providing a display presentation of clip 1 followed by clip 3, and followed by clip 4. In FIG. 2B, user 3, at time ($t^7$), has chosen to see only the addition of the event made by user 3, and only clip 4 is illustrated.

Referring to FIG. 2C, another alternative embodiment is shown of the system to FIG. 2A and FIG. 2B, with some equivalent components therein, and with the difference being that the display presentation that is provided is of a visual presentation, such as a still picture, a graphic file, a 2-D model, and a 3-D model, etc. Additionally, this system can provide for other types of visually based presentations, such as a POWERPOINT presentation, or even a video presentation. The system of FIG. 2B also provides for utilizing a video media file.

As illustrated in FIG. 2C, at time ($t^2$), an initial presentation of an image (of a portion of a house) is shown as the initial presentation shown on the display apparatus of each of the user devices. That initial display presentation can be provided by the system from stored content, or can be provided by a user. A group selector can provide for selection of a set of event content from the event storage and via the network event processor (20), to provide the display presentation.

In FIG. 2C, at time ($t^2$), each of the users provide an input of user edits which generates a respective output of a new (edit) event, which is coupled via the system bus interface network communication bus (29) to the network event processor (20). At time ($t^3$), user 3 provides an annotation of an addition of an image of a tree as the added new event, and this addition is illustrated in the combined display presentation for user 3 in user subsystem (40C) at time ($t^3$). At time ($t^4$), user 2 provides an input annotation of a display image of a person, which is displayed as combined with the initial display image of time ($t^1$), as displayed in the combined presentation on the presentation system of user system (40B) at time ($t^4$). At time ($t^5$), user 1 provides an input annotation of an image of a rising sun located and positioned next to the house from ($t^1$), and this combined presentation is displayed in the display presentation of the user subsystem (48) at time ($t^5$). At time ($t^6$), the network event processor (20) processes the new events provided by the user 1, user 2, and user 3, at times ($t^3$), ($t^4$), and ($t^5$), to provide an output of presentation data and input to visual subsystems 40A, 40B, and 40C (in a preferred embodiment) of the assembled event content, responsive to selected set of events assembled into an ordered format responsive thereto. As shown at time ($t^6$), user 1, user 2, and user 3, all see a common display (42A, 42B, 42C) showing the house (from ($t^1$)), with a man next to it (from ($t^4$)), the sun above him (from ($t^5$)), and the tree next to him on the other side (from ($t^3$)). As illustrated in FIG. 2C, the presentation resulting from the user annotations is not affected by the order of entry. However, if the user annotations were instead made so as to affect the presentation of the initial display (from ($t^1$)), or the display for other user annotation input, then, order of entry could affect the combined presentation. For example, if objects would appear in front of each other, then the order of entry would be relevant in terms of what object appears atop or behind (or obscure or not) another in the display.

At time ($t^7$), the network event processor (20), responsive to each users' selection of specific edit events, provides for presentation data be coupled to each respective user subsystem (40A, 40B, 40C) for the selected set of events as selected by (or for) that respective user, to provide a respective presentation on the display apparatus of that respective subsystem. Thus, as illustrated in FIG. 2C, at time ($t^7$), user 1 has selected the initial display of the house from time ($t^1$), combined with the inputs of user 1 (the sun, at time ($t^5$)), and user 2 (the stickman, at time ($t^4$)), as shown on the display (42A). User 2, at time ($t^7$), sees a display (42B) of the selected combination of the initial display of the house from time ($t^1$), combined with the inputs of user 2 (of the stickman at time ($t^5$)), and user 3 (of the tree at time ($t^3$)). At time ($t^7$), user 3 sees the display (42C) of the selected edit event of user 3 of the tree only (from time ($t^3$). The network event processor (20) of FIG. 2A, FIG. 2B, and FIG. 2C, is shown in further detail, alternatively, as subsystem (460) of FIG. 9A, subsystem (560) of FIG. 9B, or subsystem (660) of FIG. 9C. The event processor (23) of FIG. 2A, FIG. 2B, and FIG. 2C, is shown is further detail, alternatively, as subsystem (100) of FIG. 3A, subsystem (200) of FIG. 3B, and subsystem (300) of FIG. 3C. The network interface (22) of FIG. 2A, FIG. 2B, and FIG. 2C, is shown in further detail, alternatively, as subsystem (495) of FIG. 9A, subsystem (595) of FIG. 9B, and subsystem (695) of FIG. 9C. The data interface to the network bus (29), and the network interface (21) as coupled to the common bus/network/cloud (29), is illustrated in further detail, alternatively, as (496) in FIG. 9A, 596 in FIG. 9B, and 696 in FIG. 9C, respectively.

The edit processor subsystem (40) of FIG. 2A, FIG. 2B, and FIG. 2C, is illustrated in further detail, alternatively, as (450) of FIG. 8A, (550) of FIG. 8B, and (650) of FIG. 8C, respectively. The interface data connection to the system bus (29) is local communication interface (41A), (41B), and (41C) of FIG. 2A, of FIG. 2B, and of FIG. 2C, and is shown in further detail as 452 of FIG. 8A, 552, FIG. 8B, and 616 of FIG. 8C, respectively.

The edit processor subsystems 10A, 10B and 10C of FIG. 2B are configured for textual based documents. The edit processor subsystems in FIG. 2B are configured for documents of media streams. The edit processor subsystems 10A, 10B and 10C of FIG. 2A are further described in 450 (FIG. 8A), 550 (FIG. 8B) or 650 (FIG. 8C). The user subsystems are coupled via communications interface 16 [451 (FIG. 8A), 551 (FIG. 8B) or 651 (FIG. 8C)] to an output 11A, 11B, and 11C [for 10A, 10B, and 10C] to couple data from each subsystem to communications bus, network, network/cloud 29. The communications interface 16 couples to the group selector logic 17 [170 (FIG. 3A), 270 (FIG. 3B) or 370 (FIG. 3C)] and editor logic 18 [110 (FIG. 3A), 210 (FIG. 3B) or 310 (FIG. 3C)]. The editor logic displays the textual presentation on display 12A, 12B, and 12C for each user. Elements 16, 17 and 18 are also contained in 10B and 10C although not shown for clarity since the resulting displays is the focus of this figure.

The edit processor subsystems 30A, 30B and 30C of FIG. 2B are configured for documents of media streams and the display 32A, 32B and 32C are capable of presentation of media streams such as audio, video, FLASH, animations to the user. The edit processor subsystems 30A, 30B and 30C of FIG. 2B are identical to 10A, 10B, 10C of FIG. 2A except that 30A, 30B and 30C are coupled to the communications bus, network, network/cloud 29 via 31A, 31B and 31C instead of 11A, 11B, and 11C.

The edit processor subsystems 40A, 40B and 40C of FIG. 2C are configured for documents of images, graphics and 3D models and the display 42A, 42B and 42C are capable of presentation of images, graphics and 3D models to the user. The edit processor subsystems 40A, 40B and 40C of FIG. 2C are identical to 10A, 10B, 10C of FIG. 2A except that 40A, 40B and 40C are coupled to the communications bus, network, network/cloud 29 via 41A, 41B and 41C instead of 11A, 11B, and 11C.

The event processor subsystem 20 [(496) of FIG. 9A, (596) of FIG. 9B or (696) of FIG. 9C] is coupled to the edit processor subsystems of FIGS. 2A, 2B and 2C via communications bus, network, network/cloud 29 and bus 21 to the communications interface 22 [(495 of FIG. 9A, (595) of FIG. 9B or (695) of FIG. 9C] of the network event processor 20 [(460) of FIG. 9A, (560) of FIG. 9B or (660 of FIG. 9C], which provides centralized event processing. The communications interface 22 is coupled to the event processor 23 [(100) of FIG. 3A, (200) of FIG. 3B or (300) of FIG. 3C].

Figure 3A:
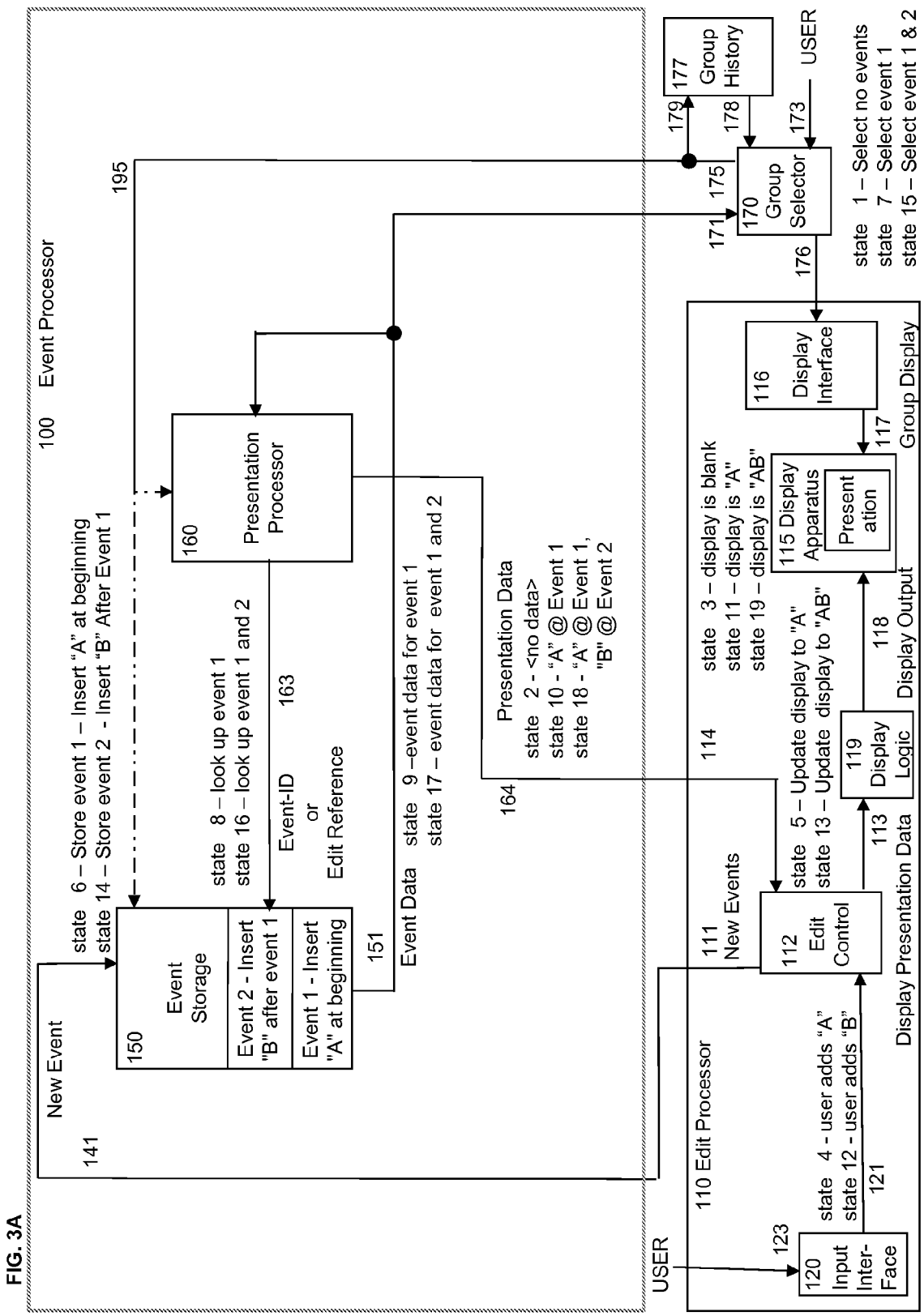
FIG. 3A illustrates the state flow of an event processing system providing for user input of new events based on presentation data generated from a presentation processor using events in event storage.
Figure 3B:
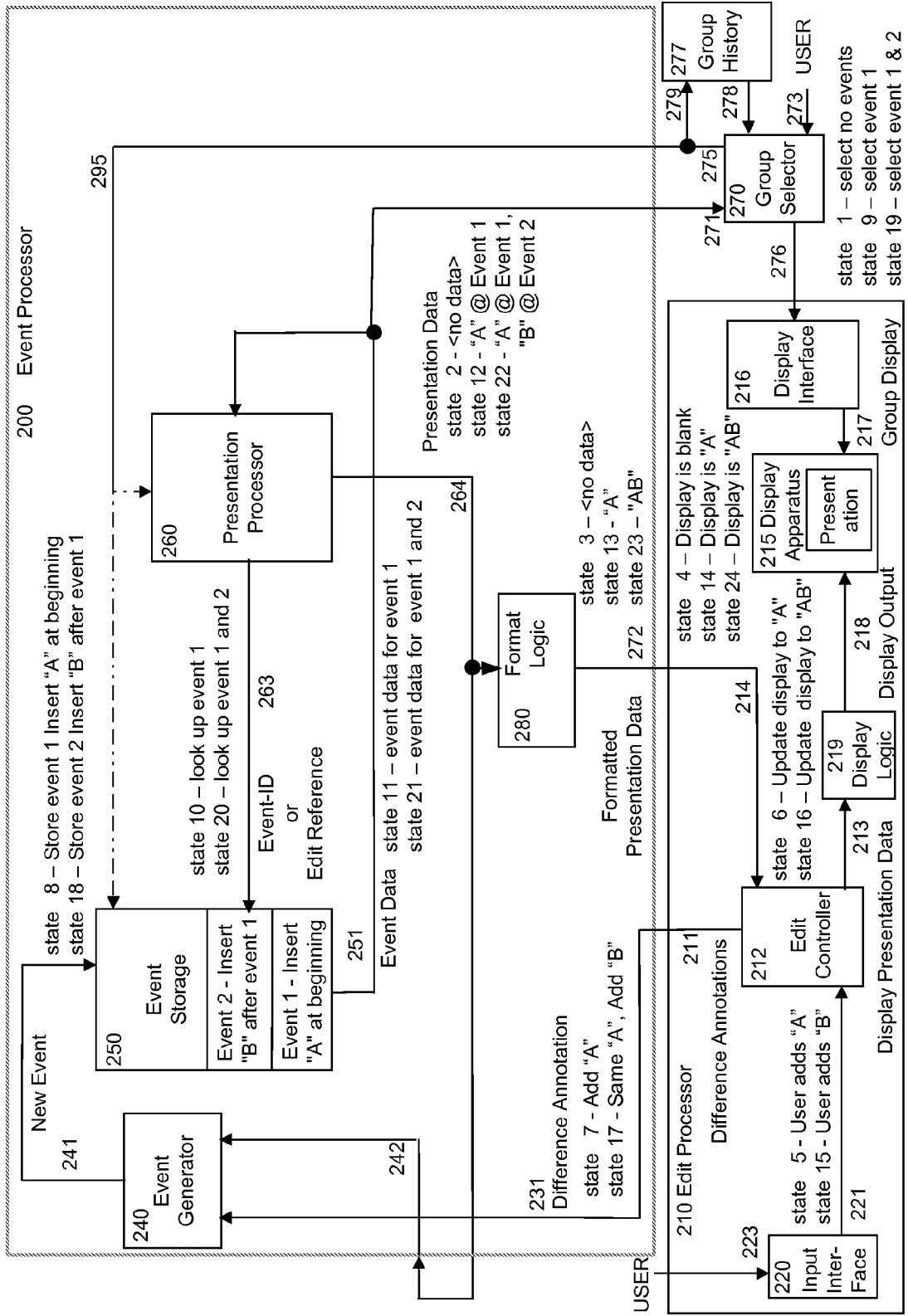
FIG. 3B illustrates the state flow of an event processing system providing for user input of new events using difference annotations based on formatted presentation data generated from a presentation processor using events in event storage.
Figure 3C:
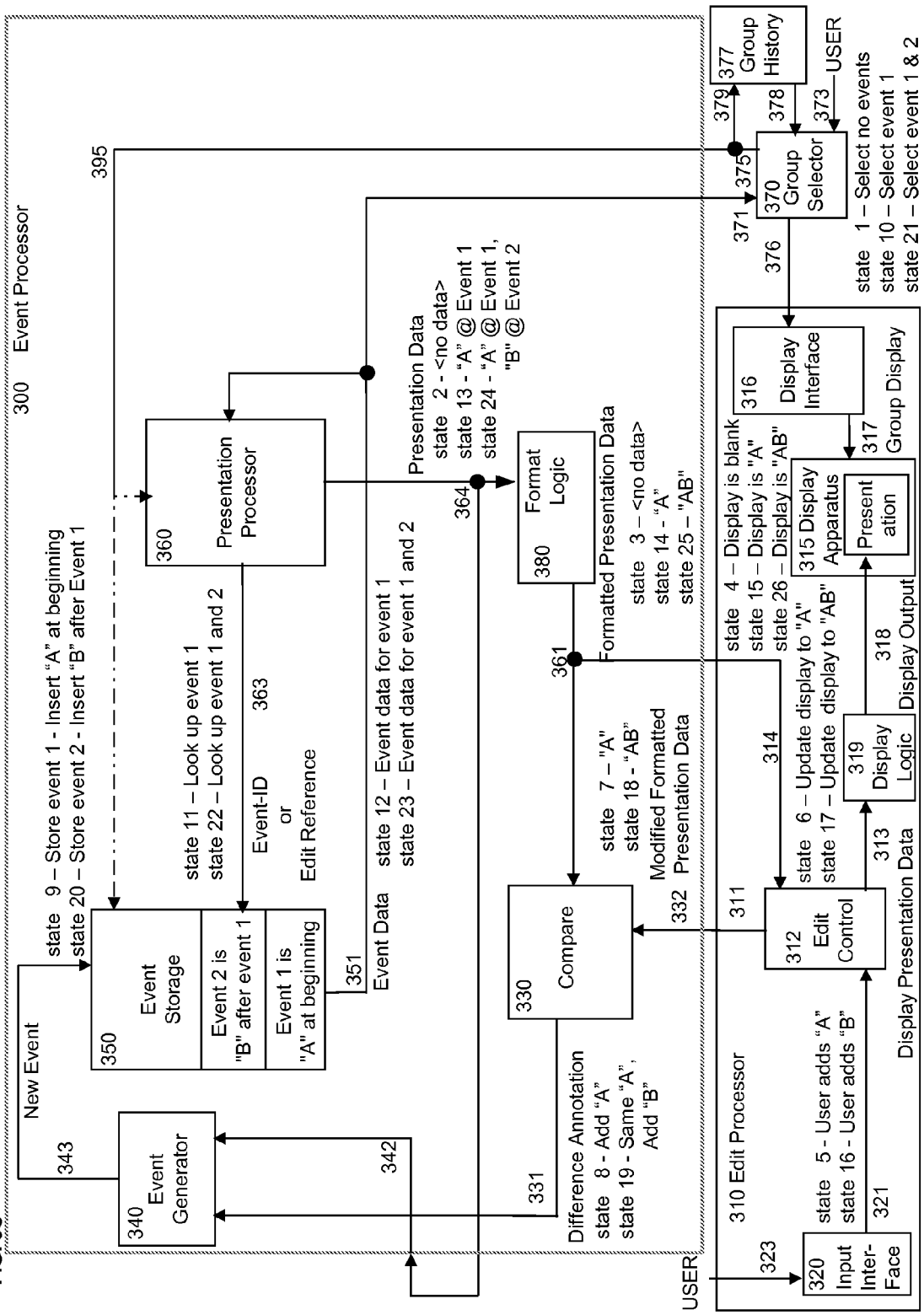
FIG. 3C illustrates the state flow of an event processing system providing for user input of new events using modified formatted presentation data based on formatted presentation data generated from a presentation processor using events in event storage.

The group selector logic (47) of FIG. 2C [as well as (17) of FIG. 2A, and (37) of FIG. 2B] is shown in further detail as (170) in FIG. 3A, (270) in FIG. 3B, and (370) in FIG. 3C.

The edit processing subsystem (48) of FIG. 2C [as well as (18) of FIG. 2A, and (38) of FIG. 2B] is illustrated in further detail as (110) of FIG. 3A, (210) of FIG. 3B, and (310) of FIG. 3C, respectively.

FIG. 3A, illustrates an electronic block diagram is provided, including a state flow diagram therein, of a system providing an event editing system for a single user, with the edit control logic (112) outputting new events directly responsive to the user input (121), which new events are directly stored in the event storage (150) for utilization in generating selected display presentations. An input interface (120) is responsive to an external user stimulus to provide an output of user data (121) that is coupled to the control logic (112). The control logic (112) responds to the user input (121) to provide an output of new events (111), which output is coupled as an input (141) of the new edit event that is coupled to the input (141) of the event storage (150), which stores the respective event content therein. A group selector (170) is also responsive to a user input (173) [which may be the same user or different user, or maybe the same user input provided to the input interface (120)] and stored group history output (178). The user stimulus (173) is input to the group selector (170), which generates an output (175) of a selection of a set of selected group of events. The output (175) is coupled as input (195) to the presentation processor (160) and to the event storage (150). The output (175) is also coupled as input (179) to the group history (177) which adds the output (175) selected group of events to the stored group history. This allows the user input (173) to select at least one of selected group of events in the stored group history and modify one of the selected group of events in the stored group history to provide a new selected set of events. Different implementations of the presentation processor and group selection are possible. The requests for event data may come from various sources to the event storage in one implementation. In this case, the group selection logic can request event data directly from the event storage. In an alternative implementation, requests for event data can only come from the presentation processor. In this alternative implementation logic within the presentation processor would request event data for group selection based on group selection input to the presentation processor.

Additionally, the group selector logic (170) is responsive to the event data output (151) from the event storage (150) and is coupled to provide an input (171) to the group selector (170) which provides an output (176) of display data coupled to the display interface logic (116) which provides a group display output (117) coupled to the display apparatus (115) which provides a user interface for feedback to the user for user control of the group selector logic (170). The control logic (112) is responsive to an input of presentation data (164), as output from the presentation processor (160). The control logic (112) is responsive to the presentation data, and (selectively) also to the user data (121) input, (and responsive thereto) provides an output (113) of an alternative display output (113) that is coupled to display logic (119) that generates a display output (118) that is coupled to the display apparatus (115) which provides a user display presentation thereon, responsive thereto. The presentation processor (160) is responsive to the group selector output (195), such that the presentation processor sends a request for a specific event-ID (or edit reference) as output (163) that is coupled to the event storage (150), which responsive thereto provides an output of the requested event data (151), that is coupled as an input to the presentation processor (160) and also provides an input (171) to the group selector (170). Responsive to the event data (151), the presentation processor (160) outputs presentation data (164), which is coupled as an input to the control logic (112). The control logic (112), responsive to the presentation data (164), and selectively is responsive to an additional user input of data (121) when present to provide an alternate display data output (113) coupled to the display logic (119) to generate display output data (118) coupled to the display apparatus (115) to generate a respective presentation to a respective user thereof.

Referring to state flow diagram portion of FIG. 3A, at state 1, there are no selected events. The group selector (170) provides an output that there are no selected events. At state 2, the presentation processor (160) responding to a selection of no events, provides a presentation data output (164) that contains no display presentation data, and couples that output (164) to the control logic (112). The control logic (112) provides an output of no alternate display data (113), which is coupled to display logic (119) which generates a display output (118) to the display apparatus (115) which provides a blank display at state 3.

At state 4, the user provides a user stimulus (123) to the user input interface (120) of an event defining for that user: add the letter "A" at the beginning. The control logic (112) responsive to this user input (121) provides an alternate display output (113) to the display logic (119) which generates a display output (118) responsive thereto, which is coupled to the display apparatus (115) to generate a user presentation thereof of a blank display.

At state 6, a new event output (111) is provided from the control logic (112) which is coupled to provide input (141) to event storage (150) of a new (edit) event for storage in the event storage (150). The event storage (150) stores an edit reference (to add at the beginning), an event-ID (for event 1), and event data content for the change data (insert "A"). Thus, the event content as stored is [add event 1, insert "A" at beginning].

At state 7, the user [or alternatively, the computing system can generate the signal] provides for selection via the group selector (170) to select event 1 as the selected set of events, which is provided as output (175) from group selector (170) and is coupled as input (195) to the presentation processor (160).

At state 8, the presentation processor (160) provides, to the event storage (150), a look-up request (163) to look up event 1.

At state 9, the event storage (150) responding to the look-up request (163), provides an output (151) of the requested event data, to get event 1, and provides the corresponding data content for event 1 to the group selector (170) and to the presentation processor (160). In this case, the event data is only utilized by the presentation processor (160) which generates the corresponding presentation data output (164) (in a preferred embodiment) at state 10 [of "A" at event 1], which data output is coupled to the control logic (112). The control logic (112) responds to the presentation data to generate display presentation data (113) which is coupled to the display logic (119). The display logic (119) generates a display output (118) (in a preferred embodiment) which is coupled to the display apparatus (115) which responsive thereto provides a presentation to the user [of "A"] as state 11.

At state 12, the user provides an input to the interface (120) to [add "B" after "A" after event 1]. The user data (121) of the add "B" event, is coupled to the control logic (112) which, at state 13, provides an output of display presentation data output (113) that is coupled to display logic (119) which provides a display output (118) coupled to the display apparatus (115) to generate a presentation of a user display of "AB", therein providing a graphical user interface to update the display to show the user thereof what has just been entered by that user.

State 13 updates the display to "AB" to allow the user to immediately see their edit to the document. State 19 updates the display to "AB" again after the user submits the new event in state 14 and the group selector chooses to include the new event (event-ID 2) in the updated display. If the group selector had not changed the selection of events in state 15 and kept the selection to the same as state 7 then the display would be updated in state 19 to "A" from "AB" in state 13.

Note that at state 19, there is also provided an update to provide separately for the display of an "AB", which occurs responsive to the processing of the new event which, as described in more detail below, results in output of presentation data to generate a respective display output coupled to the display apparatus which provides a display presentation thereof, responsive thereto, providing a graphical user interface to update the display to show the user thereof what has just been processed as a selected set of events which includes the new event now looks like after the processing of the new event and the then current selected group of events output. The presentation processor updates control logic (112) to update the display, to cause the display to ultimately be updated to "AB", as described in more detail below.

At state 14, the control logic (112) outputs a new event [event 2, insert "B" after event 1], which is stored in the event storage (150).

At state 15, the user (or computing system, or other selection source) provides a selection output for selection of a selected set of events, illustrated as event 1 and event 2. The selection is in part responsive to user input (173) to group selector (170), which responsive thereto provides an output (175) which is coupled as an input (195) to the presentation processor (160). The group selector also provides an output (176) to display interface (116) which responsive thereto provides a user interface display output (117) which generates a graphical user interface or other means for the user to select via the user display on the display apparatus (115), such as via the user input at (173) to permit the user to select which events are in the selected set to be output by the group selector at (175).

At state 16, the presentation processor (160), responsive to the [select event 1 and event 2] output (175) from group selector (170), sends a look-up request (163) to the event storage (150) to [look up event 1 and event 2]. The event storage (150) responds to this look-up request (163), at state 17, to provide event data output (151) providing event data for event 1 and event 2.

At state 17, the event data output (151) for event 1 and event 2 is coupled as an input to the presentation processor (160) which generates an output (164) of corresponding presentation data (at state 18) of ["A" at event 1, "B" at event 2]. This presentation data output (164) is coupled as an input (114) to the control logic (112), which responsive thereto generates presentation data output (113) coupled to display logic (119) to generate display output (118) coupled to the display apparatus (115), which (at state 19 provides a presentation display of "A B". The event data (151) is coupled as input (171) to the group selector (170) which responsive thereto provides the output (176) defining the events that can be selected as part of the user interface, which selection choices are displayed at the display apparatus (115). Alternatively, the group selector (170) automatically provides for selection of a set of events.

In the state flow presented here the group selector always included the new event when creating the set of selected events for the next assembly of the presentation data. This is not required and in many cases this will not be the case, especially in some multi-user systems where new events from one user may not be included in another user's presentation data. Alternatively, the group selector may include other events added by another user in the event storage between the time that the events were selected previously (state 7) and currently (state 15). This example, seems to redundantly update the display to the same value (e.g., state 13 and state 19). There are several reasons to do this. First, this ensures that the user is actually viewing the correct presentation of the document if the edit control does not accurately represent the presentation processor output after the user has made changes. Obviously, this would not be an expected situation but every system needs to provide redundancy in their operation. Second, the display apparatus may lose its state between state 13 and state 19. A common situation where this would occur is if the edit processor is turned off or logged off somewhere between state 13 and state 19. The update at state 19 brings the edit processor back to the desired state.

FIG. 3B, illustrates a detailed block diagram and state flow diagram combined therein. An edit subsystem for a single user, via control logic (212) provides an output of difference annotations (as opposed to directly outputting new events as in FIG. 3A). This output of difference annotations (231) is directly coupled to an event generator (240) which generates the new events (241) for storage in the event storage (250). The components of FIG. 3B (2XX) are the same as the similarly numbered components of FIG. 3A (1XX), except for a few. First, control logic (212) provides different functionality (than control logic (112)) in that it provides an output of difference annotations (231) instead of directly generating an output of new events as from control logic (112) of FIG. 3A. Thus, the output of difference annotations (211) from control logic (212) is of difference annotations (211), while the output (111) from control logic (112) is of new events (111). A second difference of FIG. 3B from 3A is that the difference annotation output (212) couples to an event generator (240), which said event generator (240) is not present in the FIG. 3A and its functionality is not provided in FIG. 3A.

Finally, a third difference of FIG. 3B from FIG. 3A, is that in FIG. 3B, there is an additional subsystem of format logic (280) that is provided between the presentation data output (264) of the presentation processor (260) and the control logic (212). The presentation data output (264) is coupled to the format logic (280) which outputs formatted presentation data (272) coupled as an input (214) to the control logic (212).

Additionally, the presentation data output (264) also couples as an input (242) into the event generator (240) which responsive to the presentation data (264) (for the then current display) and to the difference annotation output (231) (representative of the new input made by the user since the display), generates a corresponding new event (241) [corresponding to new edit event (141) of FIG. 3A] which is stored in event storage (250). Thereafter, the processing and other components in the system is the same for FIG. 3B as for FIG. 3A.

A state flow description of FIG. 3B begins at state 1, where no events have been selected by the group selector (270), which provides a selected set output (275) of no events. At state 2, the presentation processor (260) is responsive to the no events set output (275) from group selector (270), which is coupled as an input is input (295) to the presentation processor (260) which responsive thereto generates an output (264) of no data output as the presentation data output (264) at state 2. The output (275) is also coupled as input (279) to the group history (277) which adds the output (275) selected group of events to the stored group history. This allows the user input (273) to select at least one of selected group of events in the stored group history and modify one of the selected group of events in the stored group history to provide a new selected set of events. The presentation data output (264) is coupled to the format logic (280) which provides an output (272) of formatted presentation data (272) at state 3 [which is "no display data"] which is coupled to the control logic (212) via input (214). Control logic (212) provides a display presentation data output (213) coupled as an input to the display logic (219) which responsive thereto generates display output (218) that is coupled as an input to display apparatus (215) which generates a display presentation (in this case, which is blank) at state 4.

At state 5, a user provides a user stimulus (223) coupled to the input interface (220) which provides an output of user data (221) of user data showing that the user has added "A" after the beginning. The control logic (212) is responsive to this input data (221) to provide (at state 6) an update to the display of display presentation data (213) that is coupled to display logic (219) which responsive thereto provides a corresponding display output (218) that is coupled to the display apparatus (215) which responsive thereto provides a display presentation of an update to the display to which would now display "A".

At state 7, the control logic (212) provides an output to (211) of difference annotations, responsive to the user input (221), to add "A". The difference annotation (211) is coupled as an input (231) to the event generator (240). Also, coupled as an input (242) to the event generator (240) is the presentation data output (264) (from state 2) of "no data". The event generator (240) is responsive to these two inputs to generate an output of a new (edit event) (241), which (at state 8) is stored in event storage (250) as a stored event with event-ID 1, change data of "A" and operation of "insert at beginning" as the stored event content.

At state 9, the group selector logic (270) provides an output (275) request to "select event 1". Output (275) is coupled as input (295) to the presentation processor (260), which responsive thereto, provides an output (263) (at state 10), of a look-up request coupled as an input to look up event 1 coupled to the event storage (250).

At state 11, event storage (250) responds to the look-up request (263) and provides an output (251) of the "event data for event 1". The output (251) is coupled as an input to the presentation processor (260), which responsive thereto generates presentation data output (264) (at state 12) of "A" at event 1. The presentation data output (264) is also coupled as an input to the format logic (280) which responsive thereto (at state 13) generates an output (272) of formatted presentation data for "A". The formatted presentation data output (272) is coupled as an input (214) to control logic (212), which responsive thereto (at state 14) generates an update to change the presentation at the display apparatus (215) to make it display "A". This is done by control logic (212) providing a display presentation data output (213) coupled as an input to display logic (219) which responsive thereto provides a display output (218) coupled as an input to the display apparatus (215) which responsive thereto generates a display presentation thereupon. Also, the group selector (270) provides an output (276) to the display interface (216) which provides group display output (217) that is coupled to the display apparatus (215) to provide a presentation responsive thereto of a graphical user interface to the user as to what selection has been made and what events can be selected.

At state 15, the user provides an input [to "add "B" after event 1 (A)"] coupled via input interface (220), user input interface (220) provides an output of user data (221) coupled as an input to the control logic (212).

At state 16, control logic (212) provides for update of the display presentation to show the added input and the current display providing an update of the display to show "A B". This is accomplished by the control logic (212) providing a presentation data output (213) coupled as an input to the display logic (219). Display logic (219) responds by providing a display output (218) coupled as an input to the display apparatus (215) which responsive thereto generates a display presentation thereupon.

At state 17, control logic (212) provides an output (211) of difference annotations, responsive to the user data (221) from state 15. The difference annotations (211) are coupled as an input (231) to the event generator (240). The difference annotations (231) are comprised of (at state 17) of [same "A" add "B" thereafter]. The event generator (240) is responsive to the difference annotation data (231) from state 17, and to the presentation data (242) from state 12, to generate an output (241) of a new event which, at state 18, is stored as "event 2, "B", insert after event 1" which is the event content for the event 2, which is stored in event storage event (250).

At state 19, the group selector (270) provides an output (271) of selection of "event 1 and event 2" as the selected set output (271), and responsive thereto provides output (276) to the display interface (216), which provides an output (217) coupled as an input to the display apparatus (215) which responsive thereto shows the update in the selection as a display presentation. Also, the group selector (270) provides an output of the selected set of events (275), which is provided as input (295) into the presentation processor (260) [and an optionally also as an input to the event storage (250). Responsive to the input (295), the presentation processor (260) provides (at state 20) a look-up request "to look up event 1 and event 2", which look-up request (263) is coupled as an input to the event storage (250), which responsive thereto provides an output (251) of the requested event data (251) coupled as an input back to the presentation processor (260), which responsive thereto (at state 22) provides an output (264) of corresponding presentation data of ["A" at event 1, "B" at event 2]. The presentation data output (264) is coupled as an input to the format logic (280), which (at state 23) generates a formatted presentation data output (272) of "A B", which formatted presentation output (272) is coupled as an input (214) to the control logic (212), which responsive thereto provides a presentation data output (213) that is coupled to display logic (219) which responsive thereto provides a corresponding display output (218) coupled to the display apparatus (215) which responsive thereto generates the corresponding presentation display (at state 24) of the display of "A B".

It will be noted that the look-up request can be of many forms, comprising one or more event-IDs, and/or one or more edit references, and/or an alternative look-up mechanism regarding mapping, etc.

Referring to FIG. 3C, an alternative block diagram of an event editing system is shown illustrating both a block diagram and state flow diagram combined in a single interrelated drawing. An edit processor (300) for a single user is illustrated, which via the control logic (312) provides an output of new modified formatted presentation data (332) which output is coupled as an input to stored at comparator subsystem (330) where it is compared to formatted presentation output (361) from the format logic (360) which is representative of the original display presentation output, and which is provided as an input of the formatted presentation data (361) from format logic (380). Responsive to thereto, the compare logic (330) provides an output of difference annotations (331), which is coupled as an input to the event generator (340).

FIG. 3C differs from FIG. 3B, in that the output of the control logic (312) is of modified formatted presentation data [instead of "difference annotations (211) in FIG. 3B], and that in FIG. 3C, the output from the control logic (312) id of modified formatted presentation data (332) that is coupled as one of two inputs to compare logic subsystem (330). The other input to the compare logic (330) is of the [There is no compare logic of this sort in FIG. 3B.] formatted presentation data output (361) from the format logic (380). Responsive to its two inputs, the compare logic generates the difference annotations (331) corresponding to the difference annotations (231) of FIG. 3B. Otherwise, the components of similar numbers, 2XX versus 3XX, are equivalent.

Referring to the state flow of FIG. 3C (at state 1), there are no selected events by the group selector (370) which provides a corresponding no event selection output (375 which is coupled as an input (395) to the presentation processor (360). The output (375) is also coupled as input (379) to the group history (377) which adds the output (375) selected group of events to the stored group history. This allows the user input (373) or alternatively from Group History (377) via 378 to select at least one of selected group of events in the stored group history and modify one of the selected group of events in the stored group history to provide a new selected set of events. At state 2, the presentation processor (360) provides an output of presentation data (364) of "no data" which output (364) is coupled as an input to the format logic (380). At state 3, the format logic generates a formatted presentation data output (361) for a presentation of no display, which output (361) is coupled as an input (314) to the control logic (312), which generates an output of a display presentation data output (313 which is coupled as an input to the display logic (319) which responsive thereto generates a display output (318), which is coupled to display apparatus (315), which provides a blank display of the no selected events, or a display with no events.

At state 5, a user input (323) is coupled to input interface (320) which responsive thereto generates a user data output (321) which as illustrated specifies the user adding "A" [inserting "A" after the beginning as event1]. The user data output (321) is coupled as an input to control logic (312), which responsive thereto (at state 6) generates an update of the presentation display to show "A". This is accomplished by coupling the presentation data output (313) to display logic (319) which responsive thereto generates display output (318), which is coupled to the display apparatus (315) which responsive thereto generates a corresponding display of "A".

At state 7, the control logic (312) provides an output of modified presentation data (332) for "A" coupled as one input to the compare logic (330). The formatted presentation data output (361) from format logic (380) [for state 3 of no data] is coupled to the other input of the compare logic (330), which responsive to the two inputs provides an output (at state 8) of a difference annotations output (331) [of add "A"], which difference annotations (331) is coupled as one input to the event generator (340). The other inputs of the event generator (340) is coupled from the output (364) of presentation processor (360) [output of presentation data (364) for state 2 of no data] which output (364) is coupled as input (342) to the event generator (340). The event generator (340), responsive to the two inputs, generates an output (343) of a new event (at state 9) which new event output (343) specifies to add as event 1, insert "A" at beginning.

At state 10, the group selector (370) provides an output (375, 376) of select event 1. The group selector (370) provides an output (375) coupled as input (395) to the presentation processor (360). Additionally, the group selector (370) provides an output (376) to the display interface (316) which responsive thereto provides an output (317) to the display apparatus (315) which responsive thereto provides, for example, a graphical user interface to the user of the selection made and the events available to select, or any other user interface structure. The presentation processor (360) responds to the selection of event 1 (at state 10), to provide a look-up request output (363) to look up event 1, which output (363) is coupled to the event storage (350), which responsive thereto (at state 12) provides for an output of the event data (351) for the event 1, which output of event data (351) is coupled as an input to the presentation processor (360). The presentation processor (360) responds thereto, to generate an output of presentation data (at state 13) [of "A" at event 1], which is coupled as an input to the format logic (380), which responsive thereto generates an output of formatted presentation data (361) (at state 14) [of "A"], which output (361) is coupled as input (314) coupled to the control logic (312), which responsive thereto generates display presentation data (313) coupled to display logic (319) that generates display output (318), responsive thereto, which display output (318) is coupled to the display apparatus (315) which (at state 15) provides a display presentation [of "A"].

At state 16, the user provides for an input [to add "B"] via input interface (320), which outputs user data (321) [of user adds "B"] as an input to control logic (312), which responsive thereto (at state 17) provides an update of the presentation display to show "A B", by providing display presentation data output (313) coupled to display logic (319) which responsive thereto generates display output (318) which is coupled as an input to the display apparatus (315) which responsive thereto generates the display presentation, of "A B".

At state 18, the control logic (312) provides an output of modified presentation data (332) responsive to the user input at state 16, (for "A B"), which is coupled as an input (332) to the compare logic (330). The compare logic (330) provides a comparison of the modified formatted presentation data (332) from state 18, to the formatted presentation data output (361) [from state 14] from format logic (380), and responsive to these two inputs, provides an output (331) of difference annotations (331) (at state 19) [of "same" "A" add "B"]. The output (331) of difference annotations (342) [from state 19] is coupled as one input to the event generator (340), with the other input (342) to the event generator (340) is coupled to receive the presentation data output (364) [for state 13] the event generator (340) is responsive to the two inputs to provide a new event output (343) (at state 20) which is coupled as an input to the event storage (350) to store the event content (of event 2) in the event storage (350) as insert "B" insert after event 1.

At state 21, the group selector (370) provides an output (375) [of select event 1 and event 2] as a selected group that is coupled as an input (395) to the presentation processor (360), and provides an output 9376) of the selection coupled to the display interface (316) which responsive thereto provides an output (317) of a user display output (317) responsive thereto provides a display presentation on the display apparatus (315) of graphical user interface update to show the group selection interface. The group selector (370) provides an output (375) specifying a selected set of selected events which is coupled as an input (395) to the presentation processor (360), which responsive thereto (at state 22) provides an output (363) of a look-up request of the selected evens (in this case to look up event 1 and event 2).

At state 23, the event storage (350) is responsive to the look-up request (363) [from state 22] to provide an output (351) of event data [for the selected events of event 1 and event 2] which is coupled as an input to the presentation processor (360), which responsive thereto, at state 24, generates a presentation data output (364) [of "A" add event 1, "B" add event 2]. The presentation data output (364) [for state 24] is coupled as an input to the format logic (380), which responsive thereto generates an output of formatted presentation data (361) (at state 25) for the display of "A B". The formatted presentation data output (361) is coupled as an input (314) to the control logic (312), which responsive thereto (at state 26) generates a display of "A B", by coupling presentation data output (313) to display logic (319), which responsive thereto generates a display output (318) which is coupled to the display apparatus (315) which responsive thereto generates a display presentation on the display apparatus (315).

FIG. 4A to FIG. 4D provides a detailed example illustration of a specific example of implementation of corresponding to FIGS. 1E and 3C, specifically illustrating a detailed HTML based centralized server, text editor embodiment.

Figure 4A:
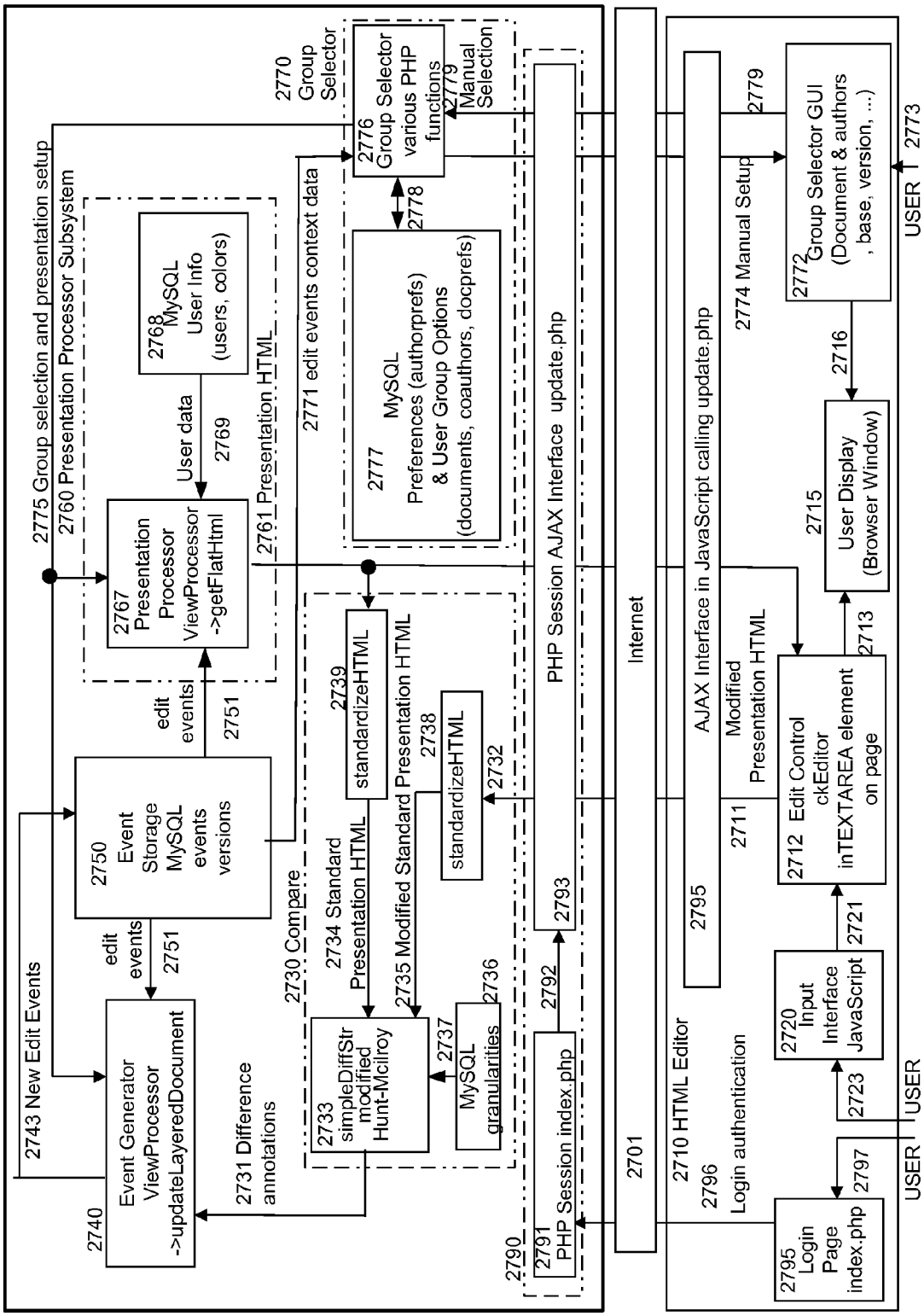
FIG. 4A illustrates an HTML event processing system for HTML documents using a central server on the Internet.
Figure 4B:
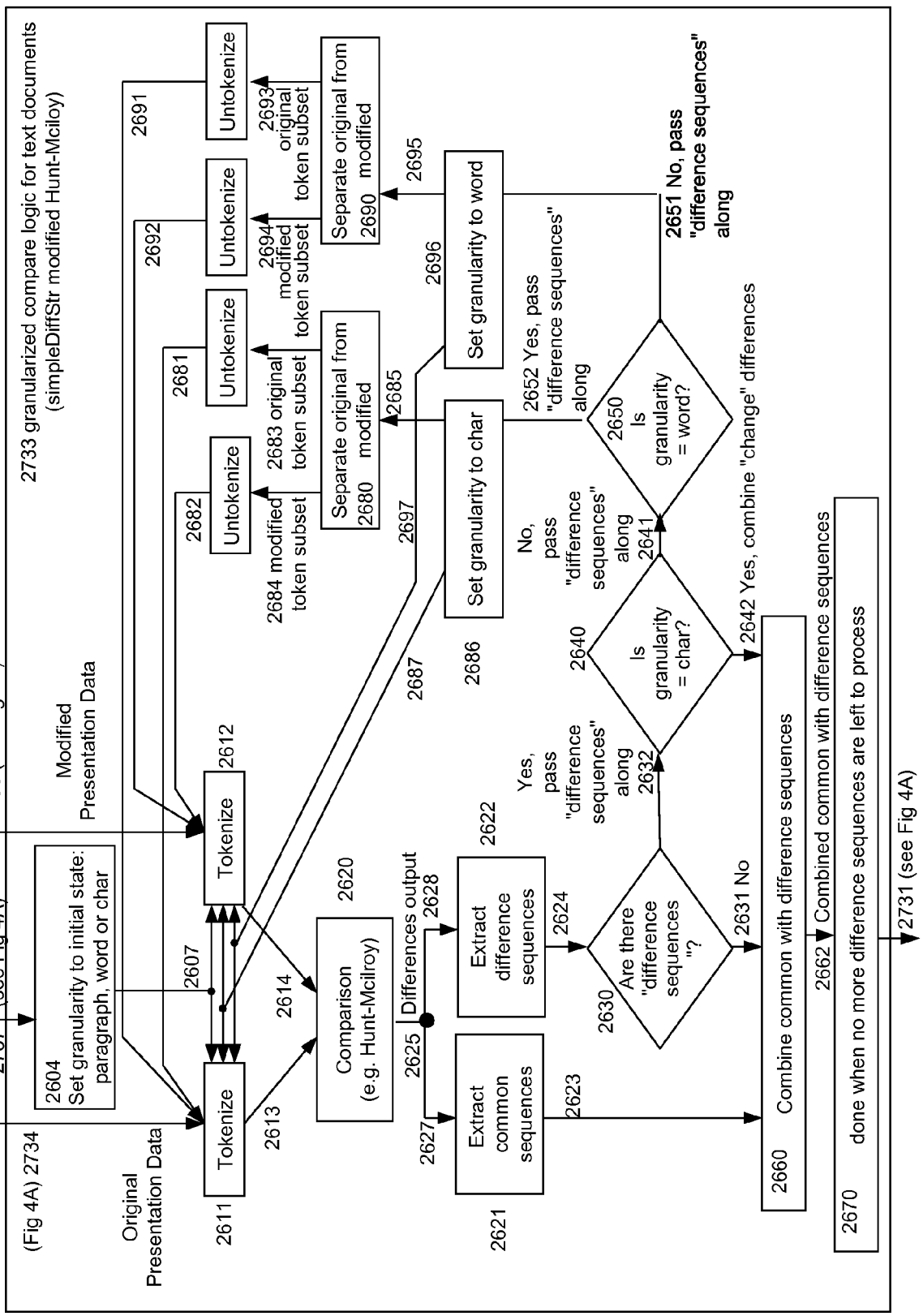
FIG. 4B illustrates the granularized comparison subsystem for the HTML event processing system in 4A.
Figure 4E:
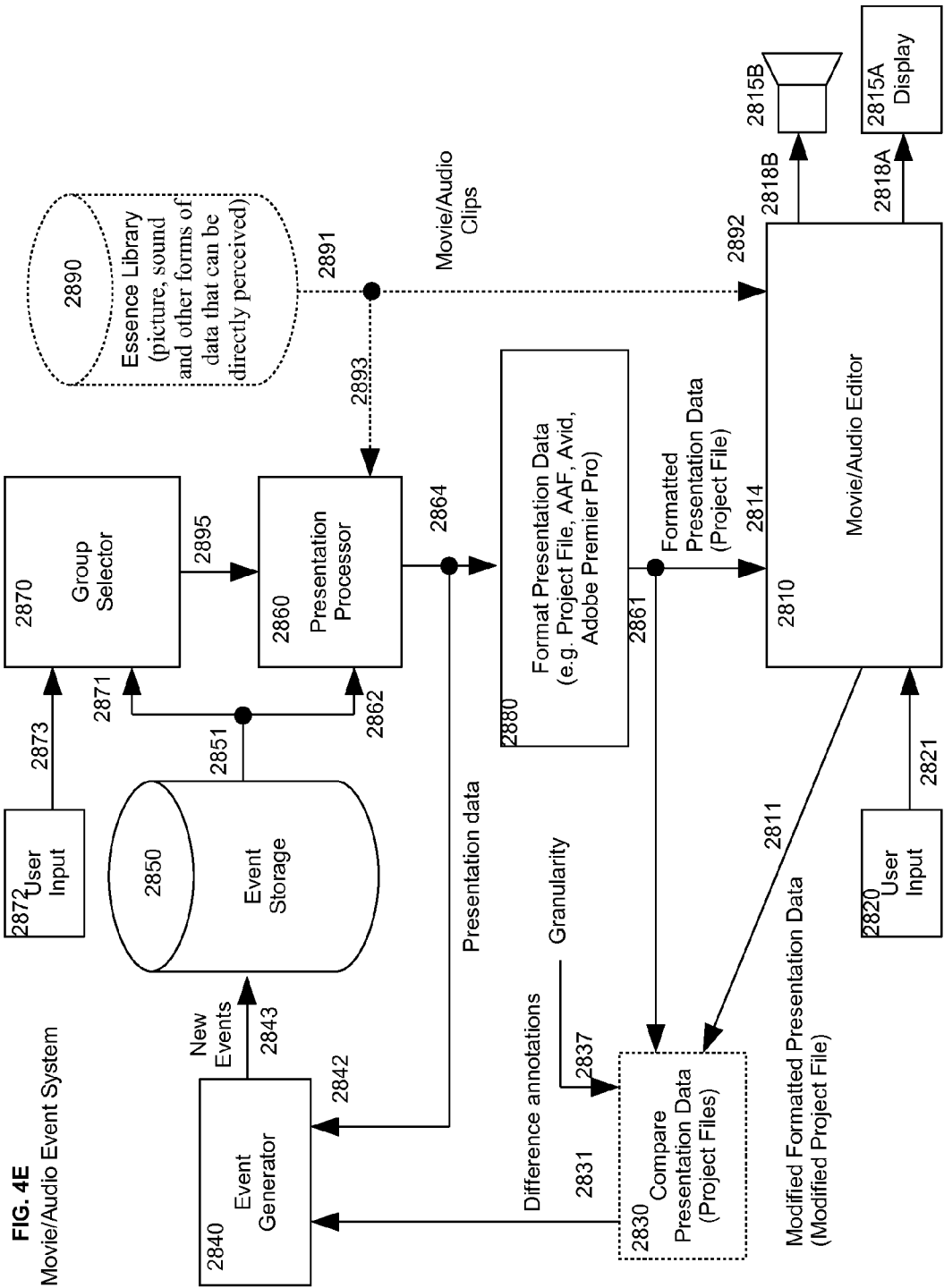
FIG. 4E illustrates an media event processing system for streaming documents such as video and audio.
Figure 4F:
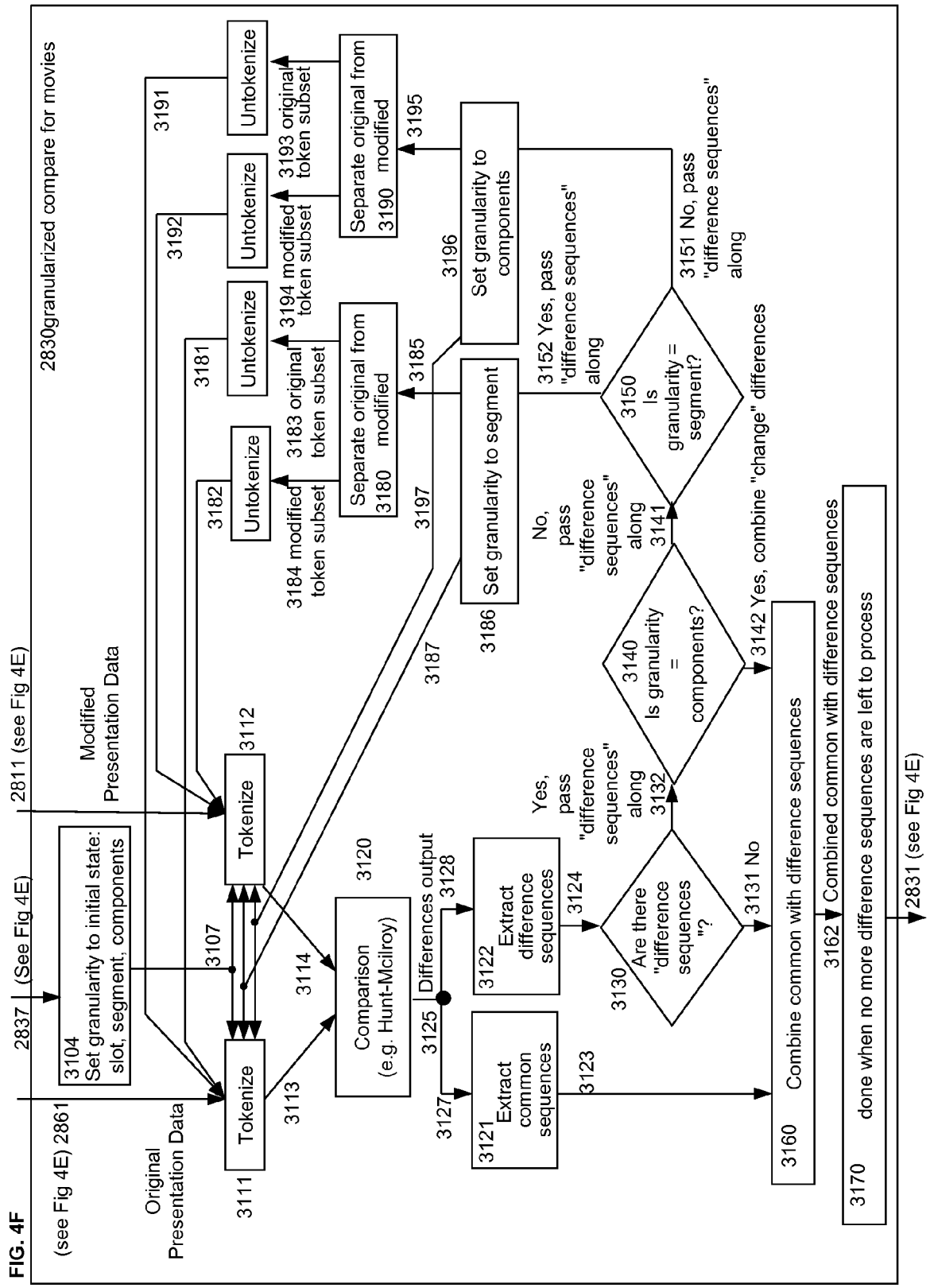
FIG. 4F illustrates the granularized comparison subsystem for the media event processing system in 4E.

FIG. 4E to FIG. 4G illustrates a detailed embodiment for video or audio editor embodiment corresponding to FIGS. 1E and 3C, respectively.

Referring to FIG. 4A, an alternate detailed block diagram of the system event processing as shown in FIG. 1, FIG. 2, and FIG. 3 is shown for a specific type of event generation and processing. The components in FIG. 4A and FIG. 4B are analogous to equivocally named and similarly numbered components of FIG. 1 and FIG. 3. Referring to FIG. 4A, a user input is coupled as input (2723) or input (2797) to the input interface (2720), or login page interface3 (2795), respectively, of the user event editor (2710). This correlates to the edit processor of FIG. 3C. The user input is coupled via the login interface (2795) to generate a login authentication (2796) coupled to the communications interface (2701), illustrated as an Internet connection (although other types of communications interface are also compatible with the teachings herein). This coupling of login authentication is coupled via the communications interface (2701) into the document event server (2700) (which correlates to the event processor (300) of FIG. 3C). The event server (2700) processes the login authentication and if valid, enables and logs in and enables the logging in of the user to the event server. Thereafter, the user input via input interface (2720) provides for processing of user input to generate events and event content data therefore, for user input annotations to be made relative to an in-process working document. The input interface (2720) of FIG. 4A is analogous to the input interface (32) of FIG. 3C. The output of the input interface (2720), output (2721) is coupled as an input to the edit control logic (2712), which as illustrated in FIG. 4A, provides for a check editor in text area element on page processing. As illustrated in FIG. 4A, the input interface is provided in JAVASCRIPT within the browser. Other options are also acceptable. The edit control logic (2712) of FIG. 4A is analogous to the edit control logic (312) of FIG. 3C. The edit control logic (2712) provides a display presentation to the user such as through a browser window on the user display (2715) via 2713. Additionally, the control logic (2712) provides an output of modified presentation data (2711) (analogous to modified presentation data (311) and (332) of FIG. 3C). The modified presentation data (2711) is coupled via an interface (2795) into the communications network Internet (2701) and coupled therefrom into the event server (2700) via the Internet interface (2793) and therefrom to the input (2732) of a standardized HTML processor (2738) that couples modified standard presentation data output (2735) in HTML format into compare logic component (2733) which provides simplified difference string comparison using modified Hunt McIlroy processing (2733). The standardized modified standard presentation HMTL is compared by logic (2733) to a standard presentation HTML output (2734) received from the presentation processor subsystem (2767) as an input (2761) to a standardized HTML processor (2739), and responsive thereto generates an output from the comparator (2730) of difference annotations (2731) coupled as an input to the event generator (2740) which provides for view processor output and provides an update of the layered document. The event generator provides an output for new events (2743) to the event storage (2750) which is illustrated running a MySQL logic software functionality does queries of events and document versions responsive to the new edit event request (2743) to generate an output event content (2751) both to the event generator for further generation of new events (2743) and for coupling the event content (2751) to the presentation processor subsystem (2760) to the presentation processor (2767) therein, which generates a presentation HTML output responsive thereto (2761). The selection control logic (2768) provides for user data (2769) coupled as an input to the presentation processor (2767) provide additional levels of control for selection of specific event content based on criteria such as user information, colors of display, etc., illustrated as a MySQL-type software response base system. The standardized HTML processors (2738 and 2739) perform cleanup of generic HTML which can vary but have the same results. For example, the HTML specifications for tag identifiers are case independent and as well as the ordering of properties is not specified and white space are flexible. The standardized HTML processors reformat the HTML to output a uniform HTML regardless of the input. The event generator (2740) is analogous to the event generator (340) of FIG. 3C. The event storage (2750) is analogous to the event storage (350) of FIG. 3C. The presentation processor subsystem (2760) is analogous to the presentation processor (360) of FIG. 3C. The group selector logic (2770) of FIG. 4A is analogous to the group selector (370) of FIG. 3C. The group selector GUI interface (2772) of FIG. 4A is analogous to the display interface (316) of FIG. 3C in providing for update of the user display (2715) responsive to group selection input provided by the user of selected events to be displayed. The user data output (2769) from the option selection logic (2768) provides for selection of options of how the presentation processor (2767) will assemble the event content and process it to generate the presentation output (2761). The user via 2772 provides input to the Group Selector GUI (2772) for the selection of events to be selected for display. Signal 2716 provides appropriate updates to the User Display (2715) for feedback to the user. The Group Selector (2776) is responsive to the Group Selector GUI (2772) for manual selections (2779) of the events. The Group Selector (2776) may alternatively automatically select events responsive to preferences stored in MYSQL Preferences (2777) and edit events context data (2771). The MYSQL Preferences (2777) can also store the manual selections (2779). These preferences are communicated between 2777 and 2776 via 2778. The group selections are communicated back to the Group Selector GUI (2772) via Manual Setup signal 2774. The Group selection and presentation setup (2775) are also communicated from the Group Selector (2776) to the Presentation Processor (2767) and the Event Generator (2740) and sets in motion the series of actions described above to generate new information for display on the User Display (2715).

Security block 2790 provides security for the system by blocking signals 2732, 2761, 2774 and 2779 until the user has authenticated that they are a valid user of the system. PHP Session index.php (2791) receives login authentication (2796) via 2701 and evaluates it to determine that it is valid. If valid, then PHP Session AJAX Interface (2793) is activated via 2792 allowing the signals 2732, 2761, 2774 and 2779 to pass data. Otherwise, if invalid, the signals 2732, 2761, 2774 and 2779 do not pass any data.

FIG. 4B shows the embodiment of the compare logic subsystem (2733) FIG. 4A, specifically directed to the use of the comparison and granularity settings for purposes of modification and edits to a text document. FIG. 4B provides a detailed block diagram of the compare logic subsystem (2733) of FIG. 4A. As illustrated in FIG. 4B, the comparison logic (2733) is taking and providing an output of difference annotations relative to new input of annotations by a user compared relative to the previously presented display presentation to which that user is making the input annotations relative to. The analysis and comparison of the modified standard presentation output of the edit control logic (2712) provides the modified standard presentation output, ultimately (2735), which represents the added or changed input annotations. The existing display presentation to which these annotations are being made relative is provided via the output of the presentation processor subsystem (2767) (output (2761) coupled via standardization logic (2731) to generate the standard presentation output (2734). The comparison of these data signals is done by the compare logic (2733) in accordance with determine granularities, pursuant to the granularity logic (2736). The output of the granularity selection logic (2736) is an output (2737) of selected granularity which is provided as an input to the compare logic (2733) in FIG. 4A.

Referring to FIG. 4B, this granularity input (2737) is coupled as an input to the system at state (2604) which sets the granularity to an initial state, either a paragraph, a word, or a character. This step precedes at (2607) to provide for tokenizing of each of the original presentation data via input (2734) from FIG. 4A, via tokenize logic (2611) and tokenizes the modified presentation data as input (2735) from FIG. 4A via tokenize logic (2612) and generates outputs (2613) from tokenize logic (2611) and (2614) from tokenize logic (2612) which are provided as inputs to comparison logic (2620) (providing a comparison of the tokenized original presentation data versus the tokenized modified presentation data, and based on a comparison with the required granularity provides a differences output (2625) coupled as inputs (2627) to extraction logic (2621) and as input (2628) to extraction logic (2622). The granularity determines the size and type of tokens as detailed later in FIG. 4C. Extraction logic (2621) extracts common sequences from the comparison and provides an output (2623) of the common sequences. The extraction logic (2622) extracts the difference sequences from the comparison, and provides an output of difference sequences (2624) to logic (2630) which determines whether there are any difference sequences. If so, then these difference sequences are coupled at (2632) to character granularity logic (2640) which determines whether granularity is at the character level. If it is, then the output (2642) is coupled to step (2660) which combines the common sequences with the difference sequences. If there were difference sequences, then processing precedes also at (2631) to step (2650) and therefrom provides an output of the combined common with difference sequences (2622) to step (2670) which completes the processing that is done with no more difference sequences left to process and provides an output (2731) in FIG. 4A, providing an output of difference annotations (2731) as in FIG. 4A.

Continuing in FIG. 4B, if the granularity is not character, then processing precedes at (2641) to step (2650) which determines whether granularity was set at the word level. If not, then the difference sequences are coupled at (2651) the tokens for the difference sequences are coupled to (2690) via 2696 and 2695 which separates the original tokens from the modified tokens and provides respective outputs of modified token subset (2694) to untokenized logic and outputs original token subset (2693) to respective separate untokenized logic. Additionally, the output (2651) activates step (2696) which sets granularity output to word coupled at step (2697) as an input to the tokenized logic (2611) and (2612) to define the set of granularity to the current state word. Similarly, if the output from step (2651) is that granularity is set at word, then in a similar manner, an output that it is at word level is coupled to step (2686) which resets granularity to a character level and provides an output (2687) coupled to tokenized logic (2611) and (2612) which their granularity level set to character level. Additionally, the difference sequences output (2652) from step (2650) are coupled as input (2685) to step (2680) which provides for separation of the tokens for the original presentation data from the tokens from the modified presentation data to provide an output of an original token subset (2683) to untokenized logic and provides an output of modified token subset (2684) to its own untokenized logic. The untokenized logic coupled to the token subsets (2683), (2684), (2693), and (2694) are processed by the untokenized logic to regroup the tokens into a respective combined signal of a partial presentation data representing the modified presentation data and original presentation data and this partially processed data is coupled as an input to the tokenized logic (2611) and (2612), respectively, which according to the then current granularity settings thereof, provide tokenization and couple the granularized tokens to comparison logic (2620) which differences output (2625) and extracts common sequences and differences sequences as discussed herein above, which are processed as described to either provide an output (2731) with the common difference sequences combined when there are no more sequences left to process, the output is final for this processing. Alternatively, if there continued to be difference sequences, then processing until granularity is at the character level, at which point, the processing concludes. The difference annotations (2731) are then coupled to the event generator (2740) of FIG. 4A, which are utilized to generate new events (2743) for storage in the event storage (2750), as discussed herein above and elsewhere herein.

FIG. 4C illustrates in table format the three levels of granularity for the preferred embodiment of text document event processing. The compare logic (2733) finds differences between the modified formatted presentation data (2735) and formatted presentation data (2734) to create the difference annotations (2731). The difference annotations (2670) found are not necessarily the same set of changes as the user input but the resulting modified formatted presentation data is identical. It is impossible to replicate the user input exactly without more information. However, the difference annotations can be made to be more similar to the likely user input. In addition, the compare logic can be quite computationally intensive. Both issues can be addressed by the compare logic.

All documents are composed of "atoms" or "tokens" which are the smallest entity in a document. The granularity is the choice of the tokens used to break a document into its entities. The choice of token types or granularity may vary depending on the needs of the system and the choices will vary with the type of content. For instance, textual documents are made up of characters and formatting. Formatting would include setting the font choice, font size and other font characteristics. If would also include line spacing, margins and other items. A textual document may also include charts, images and graphics. Characters can be characterized as white space (non-printing characters such as space, tab, line feed and carriage return), punctuation, letter and numeral. Characters can be combined to form words, numbers and paragraphs. Thus the tokens for a document could be defined as characters and formatting. Alternatively, it could be defined as white space, punctuation, words, numbers and formatting. The choice of granularity of the tokens will determine what is used in an event.

A video can be broken into tokens (atoms) as well. The choices for video content can be an overall segment of video, clips making up the video, frames within a clip and even pixels within a frame, although the latter would generally be a much smaller token than usually required. Another choice for video is filters affecting the video content tokens. Examples would be: changing the length of a clip (setting the in/out points on the clip), changing the brightness, contrast, hue and other visual effects, adding transitions, adding overlays, adding timecode information and more.

Audio would be similar to video. The choices for audio content can be an overall segment of audio, clips making up the audio, samples within a clip. Another choice for audio is filters affecting the audio content tokens. Examples would be: changing the length of a clip (setting the in/out points on the clip), changing the loudness, compression, combining audio, equalization and other effects, adding transitions, adding timecode information and more.

A user input adding "Apple" could create either 5 events or 1 event to add the characters "A" "p" "p" "l" "e" where a token is a character. If there are 5 events then the most obvious would insert "A", the second would insert "p" after "A", and so on. There are other scenarios such as first insert "e", then insert "l" before "e", then insert "p" before "l" and so on. A 6th event could be added that inserts an "s" after "e" in which case (if all these events are selected) the display would be "Apples".

The change data in a single event could also contain an array of characters ["A", "p", "p", "l", "e"] and the change data could specify that the array of characters will be inserted relative to the edit reference. In this case a token is still a character as in the previous example but the change data can contain multiple tokens. Another event could modify the event by adding an "s" to the end of the array of characters. Note that this additional event doesn't actually modify the original event in event storage but can modify it in the presentation data. The advantage is that fewer events need to be added at the expense of more complicated change data structures.

When an token is a word then "Apple" is added in a single event. This is approximately equivalent to the second example above except that if you wanted to change the word to "Apples" you would first hide the event containing "Apple" and insert another event containing "Apples" since the token as a word can't add a character to a word but only replace the entire word.

The common way to implement the compare logic (FIG. 4A (2733) and in detail FIG. 4B (2733)) determines the longest common subsequence, LCS, between the modified formatted presentation data, MFPD, and the formatted presentation data, FPD. Many version control systems use this comparison (see FIG. 11A (2322), (2332) and (2342)) for a different purpose and was implemented in the popular UNIX program "diff" was published in the 1976 paper "An Algorithm for Differential File Comparison", by Douglas McIlroy and co-written with James W. Hunt and simply known as Hunt-McIlroy. A sequence is an ordered list of tokens. A subsequence is a partial list of tokens from a full list of tokens. The partial list of tokens is in the same order as the full list but may not contain all of the tokens in the full list. A common subsequence is a subsequence that is a subsequence of two or more sequences. The compare logic (FIG. 4B (2733)) first breaks up the MFPD (2735) into modified token sequence (MTS) (2614) and the FPD (2734) into original token sequence (OTS) (2614). Typically, in a textual document each token would be a character or a formatting tag. A formatting tag must be handled separately as a token because it affects the visual characteristics of the character tokens that follow it. Determining the LCS is both time consuming involving numerous comparisons between the MTS and OTS which grows exponentially with the length of the MTS and OTS as well as the number of common tokens in MTS and OTS. Since the letters "a" "e" and space " " (as well as many others) occur rather often in most textual documents the compare logic can not efficiently find the LCS. In addition, an "e" at the beginning of the MTS is unlikely to be in the desired difference annotations if the "e" is being compared to an "e" at the end of the OTS.

Therefore, we teach in this preferred embodiment of the invention in FIGS. 4A, 4B, 4C, 4D, 4E, 4F and 4G a compare logic that finds the difference annotations by finding the LCS at progressively finer levels of granularity. Granularity determines the token types that are in the MTS (2614) and OTS (2613) when the compare logic breaks up the MFPD ((2735) for "paragraph" granularity, (2692) for "word" granularity and (2682) for "char" granularity) and FPD ((2734) for "paragraph" granularity, (2691) for "word" granularity and (2681) for "char" granularity). A finer granularity produces a token that are a subset of a token produce with a coarser granularity. As illustrated in FIG. 4C, in a textual document the document can have a granularity of "paragraph" (see FIG. 4A, 4B, 4C, 4D). In this case, formatting tags and line breaks are tokens and all characters between those tokens are combined into a token. Note the latter is similar to the common definition of a paragraph but may not be exactly the same. An alternate embodiment would have all line breaks as a token and all formatting tags and characters between the line breaks is another token type. Regardless, of either embodiment there are far fewer common tokens between the MTS and OTS except line breaks and there are almost always far fewer tokens in each of the MTS and OTS. This minimizes the computational requirements for determining the LCS at this level of granularity. The compare logic then takes the tokens between the gaps in the LCS from both the MTS and OTS and untokenizes them to create a subsets of the MFPD and FPD. Each subset pair is again tokenized at a finer granularity. This process repeats recursively until the compare logic has used the finest granularity for all subsets.

Also illustrated in FIG. 4C, a finer granularity than "paragraph" is "word". This granularity creates a token for all formatting tags, line breaks, whitespace (non-printing characters such as spaces, tabs, . . . ) and punctuation. All other characters between the proceeding tokens are combined to form a token. This granularity works well on a subset of the MFPD and FPD that were found with a granularity of "paragraph".

As further illustrated in FIG. 4C, a finer granularity than "word" is "char". This granularity creates a token for all formatting tags, line breaks, whitespace (non-printing characters such as spaces, tabs, . . . ) and punctuation. All other characters between the proceeding tokens create a separate token. This granularity works well on a subset of the MFPD and FPD that were found with a granularity of "word".

After all the paragraphs that have changed are found, then the words in those paragraphs that have changed are found and then the characters in the word that have changed are found. One very small documents this may result in more computation and complexity than required by using a granularity of char initially but the computational requirements are small for those documents anyway. Large documents are much more efficient and changes are localized to where they have changed which is more similar to how a user would have typically input the changes. The difference annotation result will not necessarily be a LCS solution to the differences between the MFPD and FPD but is both more computationally efficient and relevant to the user.

A textual document could also incorporate tokens for images, graphics, video, audio and other media into the granularity. Depending on the system these may include finer granularity of each of these types or could only include them as a whole. This decision on the token types in each granularity would depend on goals and use of the system.

Referring to FIG. 4D, a software code example is provided of one embodiment of determining difference annotations (2731) utilizing a pseudo-code language that can be translated any programming language, including C++, Pascal, Basic, Fortran, etc. This software would be running on a computational machine with data connections inputting the presentation data and modified presentation data and outputting the difference annotations.

As illustrated in FIG. 4D, the difference annotations are obtained by comparing the presentation data and modified presentation data, first with a granularity set at paragraph, and consisting by starting comparing original tokens to modified tokens at each of the granularity levels, until either no more differences are found or there is no more characters to analyze and no more levels of granularity to reduce to. The result of the difference annotations is to return all differences to provide the output difference annotations (2731).

The pseudo-code is but one example of how this could be coded, but sets forth the logic and structure for creating a computer program to generate the difference annotations.

Referring to FIG. 4E, an alternative embodiment of the event processing system is shown for a movie/audio/multimedia event system. The components of FIG. 4A are analogous to similarly numbered components or labeled components of FIG. 1, FIG. 3, and FIG. 4 herein.

Referring to FIG. 4E, the user provides an input (2820) which provides an output of user data (2821) that is coupled to the edit processor subsystem (2810) for movie/audio editor. The user input (2820) is analogous to the input interface to the input interface (320) of FIG. 3C, for example, as well as other input interfaces (X20) of other figures. The edit processor (2810) of FIG. 4E is analogous to the edit processors (X10) of other figures, such as (310) of FIG. 3C. The output of modified formatted presentation data from the (2811) from the edit processor (2810) is coupled as an input to the compare logic (2830) which also has coupled to its input formatted presentation data output (2861) provided as an output from the format logic (2880). The granularity (2837) is supplied by the movie and audio event system to the compare logic. The compare logic is analogous to the (XX30) compare logic of the other figures, such as compare logic (330) of FIG. 3C. The format logic (2880) of FIG. 4E is analogous to the format logic (X80) of other figures were to have format logic, such as format logic (380) of FIG. 3C. The compare logic (2830) provides an output of difference annotations (2831) generated resulting from the comparison of its inputs, which output of difference annotations is coupled as an input to the event generator (2840), which also has coupled to its input presentation data output (2842) coupled from the presentation processor (2860). The event generator (2840) stores the generated events in the Event Storage (2850) via 2843 and is analogous to the event generators of other figures herein, such as event generator (340) of FIG. 3C. The presentation processor (2860) of FIG. 4E is analogous to the presentation processor (XX60) of other figures herein, such as presentation processor (360) of FIG. 3C. The user input is also provided at input interface (2872) to provide user select input (2873) coupled to as an input to group selector logic (2870) which also has coupled as an input thereto event content output (2851) from event storage (2850) via 2851 and 2871. The group selector logic (2870) is analogous to the group selection logic (XX70) from other figures herein, such as group selector (370) of FIG. 3C. The event storage (2850) of FIG. 4E is analogous to the event storage of other figures herein, such as event storage (350) of FIG. 3C. The group selector is responsive to the user selection input (2873) specifying which events are selected, and/or which users, or other ways designating which event should be selected, and is also responsive to the event content output from the event storage to provide for a selection of selected events (2895) coupled as an input to the presentation processor (2860). The presentation processor (2860) also has event content output (2851) coupled as input (2862) thereto. The presentation processor, additionally, optionally, has additional data that can be coupled via additional data input (2893) provided by the Essence Library (2890) via 2891. The data from the Essence Library (2890) may also be provided directly to the Movie/Audio Editor (2810) via 2892 if the Formatted Presentation Data (2814) does not include all the data from the Essence Library (2890). In one embodiment, this additional data can be in essence library. The essence library as illustrated in FIG. 4E provides database storage of pictures, sounds, and other forms of data that can be perceived by a person, which can be added to the content being processed by the presentation processor in generating of presentation data output. The presentation processor (2860), responsive to the event content and the group selector output (2895), and in an alternative embodiment also to the additional data input (2893), provides an output of presentation data (2864) which is coupled as an input to both the event generator as input (2842) as discussed above herein, and is also coupled as an input to the format logic (2880), also as discussed above. The format logic (2880), responsive to the presentation data output (2864) coupled as an input to the format logic (2880), provides for assembly of in generation of formatted presentation data. The format logic (2880) places the presentation data into a format that is compatible with the edit processor requirements, such as eliminating event references and IDs and placing it in a video, audio, or text document file format, such as a project file, an AAF, an AIFF, or MP3, or AVID format, ADOBE PREMIERE PRO format, FINAL CUT PRO format, ADOBE LOGIC, GARAGEBAND, or other standard application software format. The format logic (2880) outputs the formatted presentation data (also sometimes referred to a project file), which is provided as an input (2814) to the edit processor subsystem (2810) which provides a movie/audio/multi-media editor subsystem, depending on the type of project file being worked with.

In an alternative embodiment, where the additional data library (2890) is utilized, the presentation processor (2860) generates presentation data output (2864) which contains references to the additional data, but not the additional data itself. Thus, the formatted presentation data output (2861) from the format logic (2880) also contains references to, but not the actual data, for the additional data. Thereafter, the edit processor (2810) is responsive to both the formatted presentation data output (2861) from format logic (2820) and to the input of additional data for the movie, audio, video, multi-media clip data for the actual presentation, which is utilized by display generation logic within the edit processor (2810) to generate a display presentation output (2818A) of the video visual portion of the display presented on display apparatus (2815A), and also provides an audio separated output (2818B) coupled to a separate audio speaker system (2815B). While illustrated in FIG. 4E as separate components, both the visual and audio of the presentation can be displayed on a single device, and where there is only audio that can be processed only on an audio sound system. Alternatively, other combinations can be utilized.

Referring to FIG. 4F, a state flow and operational flow chart for the generating of the difference annotations, for movies and audio, analogous to FIG. 4B for text documents, is shown in FIG. 4F. Referring to FIG. 4F, the granularity setting, altering, tokenizing, and re-combining, in generation of a difference annotation output as in FIG. 4B, but instead for movies and audio versus text documents is illustrated. Referring to FIG. 4F, at the top of the drawing, the state flow and flow chart for (2830) for granulized compare for movies is illustrated, which also applies to audio and other sound/visual documents. The initial granularity setting (2837) is coupled as an input to step (3104) which sets granularity to its initial state, one of either slot, segment, or components. This setting is coupled as (3107) to set the tokenized logic (3111) and (3112), which each respectively, modify and tokenize either the original presentation data (2861) or modified presentation (2811) (both is corresponding to (2761) and (2711) of FIG. 4B), respectively, as inputs to tokenized logic (3111) and (3112). Tokenized logic (3111) tokenizes the original presentation data (2861) according to the initial set granularity from (3104) and generates an output of original presentation data tokens (3113) coupled to the comparison logic (3120). Similarly, tokenized logic 3112 responsive to the modified presentation data (2811) and to the initial setting of granularity. As set forth, it provides a tokens of output of the modified presentation data (3114) coupled as an input to the comparison logic (3120). The comparison logic utilizes processing, such as described above (with reference to Hunt-McGilroy), to generate a differences output from comparison of the tokens of the original presentation data to the modified presentation data generating a differences output (3125) which is coupled as inputs to extract logic (3121) via 3127 and (3122) via 3128. The extract logic (3121) responsive to the differences output (3125) provides an output (3123) of extracted common sequences between the two tokens. Similarly, the extract logic (3122) responsive to the differences output (3125) provides an output (3124) of extracted difference sequences in the tokens. The common sequences output (3123) is provided as one input to combining of the common sequences with the difference sequences at step (3160). If there are different sequences at step (3130), then these are passed along at step (3132) to step (3140) which determines whether granularity was set at components and if so, the differences are passed as an input (3142) to be combined with the common sequences at (3160) to provide an output (3162) of combined common with different sequences coupled as an input to step (3170) which completes processing when there are no more different sequences left to process as signaled from 3131 and granularities have all been processed providing an output (2831) of the differences annotations analogous to output (2731) of FIG. 4B. When granularity was not set at components, processing precedes to pass the difference sequences along to step (3150) via 3141 to determine if the granularity was set at segment. If it was set at segment, then the difference sequences are passed and coupled as output (3152) both set to granularity at logic (3186) step to set granularity to segment providing output (3187) which sets the granularity level at tokenized logic (3111) and (3112) to segment granularity. Additionally, the difference sequences output (3152) is coupled as an input (3185) to separation logic (3180) which separates the original presentation data from the modified presentation data to regenerate original token subset (3183) and modified token subset (3184) coupled to untokenized logic for each which generates respective output (3181) for the original token subset (3183) and which generates output (3182) of the re-combined untokenized modified and original presentation data, with the original presentation data output (3181) and the modified presentation data (3182) being coupled to respective tokenized logic (3111) and (3112), which then re-precedes with processing with a new set granularity and follows through the flow charts and process steps until there are no more difference sequences left to process in all levels of granularity have been processed. Finally, if the granularity is not set to segment and was not set to components, then the difference sequences are passed to separate logic (3190) via 3196 and 3151, and are also coupled to set granularity logic (3196) via 3151, which responsive thereto, provides an output (3185) coupled as input (3197) to reset granularity for tokenized logic (3111) and (3112) to be granularity of components. Additionally, the difference sequences (3150) is coupled as input (3195) to the separate logic (3190), which responsive thereto, separated the original token subset (3193) as one output from the modified token subset (3194) as another output which are each coupled to respective untokenized logic which responsive to the inputs generate respective outputs (3191) of re-combined original presentation data which is coupled to tokenized logic (3111) and to provide re-combined modified presentation data output (3192) coupled as input to tokenized logic (3112). The tokenized logic (3111) and (3112) then precede to provide tokenizing according to the then current set granularity level and provide comparison extraction and further processing in accordance with the flow chart and state flow as per FIG. 4F.

A movie and audio stream can have different granularities as well (See FIGS. 4E, 4F, 4G). A preferred embodiment uses objects from a AAF object model supported by the AAF Association which is part of the Advanced Media Workflow Association, Inc. (www.amwa.tv 436 N. Westfield Road, Madison, Wis. 53717 USA). A white paper "Enabling Better Media Workflows: An Overview of the Advanced Authoring Format, EBU TECHNICAL REVIEW 291—July 2002 Brad Gilmer" and also from the European Broadcasting Union. It should be noted that while this embodiment uses the AAF object model for tokenizing a multimedia steam there are similar other models that can be used in a similar manner for the token types in the granularity.

Referring to FIG. 4G, a table illustrating granularity and token types and analysis for the movie/audio event processing system is shown, analogous to the granularity table shown for a document file types on FIG. 4C. The compare logic in 2733 in FIG. 4B is similar to the compare logic 2830 in FIG. 4F except that the presentation data contains video/audio data and the granularity is appropriately different for the type of media. Referring to FIG. 4G, the first row shows that for a slot granularity, the token type that is created is a slot. The coarsest video/audio granularity is "slot". The AAF object model contains everything in a package that describes a complete video/audio stream which is equivalent to a document in other parts of the description of this invention. A package has one or more slots that contain parts of the video/audio stream description. Thus, the highest level of granularity creates a token for each slot. The compare logic only needs to determine whether a slot token in the MTS is identical to a slot in the OTS so the use of checksums or signatures on the slot can be used instead creating a token with all the data. This greatly reduces the comparison time when generating the LCS. Checksums or signatures can be used on other token types both in video/audio granularities and textual granularities.

The segment granularity is finer than slot granularity as shown in FIG. 4G. Each slot is composed of various segments. Segments such as SourceClip and Sequence provide the actual media be it video, audio, flash, animations and other types. The Sequence segment specifies that its set components are arranged in a sequential order while SourceClip references a section of a Slot in another Package. Other segments are like formatting tags in a textual document. Effect and Filter segments modify the SourceClip and Sequence Segments. Locator, TaggedValue, KLVData, Transition, Parameter, ControlPoint provide additional information for the video/audio format and control where and how the media is placed in the media stream.

The components granularity is finer than segment granularity as shown in FIG. 4G. This granularity creates a token for each component in a Sequence segment and breaks out as tokens the parameters in other segments so individual parameters can be compared in those segments.

FIGS. 5A, 5B and 5C illustrates a more detailed preferred embodiment, illustrating the operation of the presentation processor showing the operation and use for event content processing and storage and display presentation output relating thereto, as displayed over time, also illustrating event storage based on group selection. Furthermore, it shows the textual-based document assembly of presentation data.

Referring to FIG. 5A, the storage (2910) of event storage provides storage of event content. As illustrated, the storage is shown as a table with an event-ID in the left column, an edit reference in the second column, and an operation as a third column. This is to be noted that this does not needed to be stored in a table format, and can be done as linked list data, memory arrays, arrays of pointers to memory locations and other known techniques of memory storage structures. The data at (2911) illustrates the assembly time of when the event-ID reference operation of event storage part (2910) is assembled. Thus, at time $t^1$, event 1 for insert "A" after the beginning is assembled and generated into a display presentation. At time $t^2$, the second row, the event-ID 2 references edit 1 to insert "B" after event-ID 1 as specified by event-ID 2's edit reference.

The table 2911 illustrates the time of assembly that the edit content is utilized and assembled into a combined presentation. Thus, at time t1, of table 2911, in the event storage, the operation of insert "A" after beginning occurs. Time t2, the insertion of "B" after event-ID 1 occurs. Time t3 (2922), the insertion of "D" after event-ID 2 occurs. Time t4, the insertion of "c" after event-ID 2 occurs. At time t5, the event-ID 6 operation occurs that deletes the "c" from event-ID 4 from the presentation data. At time t6, the insertion of "C" after event-ID 4 occurs. Note that while "c" was deleted by event-ID 6 it still holds a position in the presentation data for "C" to be inserted. At time t7, the insertion of "E" after event-ID 3 occurs.

The assembly of the presentation is illustrated below the event storage table representation of 2910 and 2911, as FIG. 5E. In FIG. 5E, the assembly of the presentation data for each of the times of assembly table 2911 are illustrated, and shows that time $t^1$ (2920) "A" for event-ID 1 is assembled as presentation data for display. At time t2 (2921), "A" event-ID 1 is the first character, which is shown to which is added thereafter "B" for event-ID 2. At time t3, "A", and "B" are assembled as presentation that is displayed. At time t4 (2923), the "A" is shown first followed by "B", followed by "D, followed by "c" which was just inserted". At time t5 (2924), the "A" is shown first followed by "B", followed by "D". At time t6 (2925), the "A" is shown first followed by "B", followed by "C" which was just inserted, followed by "D". At time t7 (2926), "A" is shown first followed by "B", followed by "C", followed by "D" followed by "E" that was just inserted.

The output of the formatted presentation data resulting therefrom is shown in FIG. 5F, creates the formatted presentation data that can be used for generating a display. The formatted presentation data that corresponds to the assembly of presentation data at time t1 is 2930 corresponding to presentation data 2920. Likewise the formatted presentation data that corresponds to the assembly of presentation data at time t2 (2921), t3 (2922), t4 (2923), t5 (2924), t6 (2925) and t7 (2926) is formatted presentation data (2931), (2932), (2933), (2934), (2935) and (2936). The final formatted presentation data is "ABCDE" (2936).

FIGS. 5D, 5E and 5F are specific embodiments illustrating the operation of the presentation processor showing the operation in use of the event content and the resulting internal storage and display presentation output, displayed over time, and also illustrating event storage based on event storage and group selection. Wherein in FIG. 5A illustrates it for a text document based assembly and FIG. 5B illustrates a media-based (audio/video/etc.) documents or file of presentation data.

Referring to FIG. 5D, the event storage (3000) provides storage of event content. As illustrated, the storage of event content is shown structured as a table (3000) within which each event is stored in an indexed relation shown as a row with multiple linked columns. As illustrated, an event-ID stored in a first left column, an edit reference stored in a second column, and an operation stored in a third column. It should be noted that other storage structures and formats can be utilized consistent with the teachings of the present invention, beyond the use of storage in a table format, such as using linked list data, memory arrays, arrays of pointers to memory locations and other known techniques of memory storage structures. The table (at (3001) illustrates the assembly time of when the event-ID reference operation of event storage part (3000) is assembled. Thus, at time ($t^1$), event 1 for insert clip "A" after the beginning is assembled into presentation data that is used to generate a display presentation. At time ($t^2$), in the second row of table (3001), the "event-ID" 2 has an "edit reference" references edit 1 with an "operation" to insert clip "B" after edit reference 1.

The table 3001 illustrates the time of assembly at which the edit content for each edit event is utilized and assembled into a combined presentation to generate a presentation data output. Thus, at time ($t^1$), of table (3001), the operation of insert clip "A" after beginning occurs at time ($t^2$), event-ID 2 operation for the insertion of clip "B" after event-ID 1 occurs. At time ($t^3$), the event-ID 4 operation is followed, [set in/out] which determines the start and stop points of clip B, which operation is performed relative to event 2. At time ($t^4$), event-ID 5 operation to insert clip "C" after event-ID 2 (clip B) is performed. At time t5, the event-ID 3 operation to insert clip "D" after event-ID 2 (clip B) is performed. At time t6, the event-ID 6 operation to delete event-ID 3 (clip D) is performed. Finally, at time t7, the event-ID 7 operation to insert clip "E" after event-ID 3 (clip D) is performed. Note that while clip D was deleted by event-ID 6 it still holds a position in the presentation data for clip E to be inserted.

The assembly of the presentation is illustrated in FIG. 5E. In FIG. 5E, the assembly of the presentation data for each of the times of assembly table (3001) are illustrated, and shows that time ($t^1$), (3020), clip "A" for event-ID 1 is assembled as presentation data for display. At time ($t^2$), (3021), clip "A" event-ID 1 is the first clip, to which is added thereafter clip "B" for event-ID 2. At time ($t^3$), (3022), clip "A", and edited reduced the length of clip "B" are assembled as a presentation that is displayed. At time ($t^4$), (3023), the clip "A" is shown first followed by clip "B" as edited and cut, followed by the insertion of clip "C" after 2, to provide the display presentation display resulting from presentation data at time. At time t5 (3024), the clip "A" is shown first followed by clip "B" as edited and cut, followed by clip C, and followed by clip D that was just inserted. At time t6 (3025), the clip "A" is shown first followed by clip "B" as edited and cut, followed by clip C (clip D is no longer in the stream since it was deleted). At time t7 (3026), the clip "A" is shown first followed by clip "B" as edited and cut, followed by clip E that was just inserted and followed by clip C.

In FIG. 5F, the output of the formatted presentation data resulting therefrom is shown is FIG. 5F, which creates the final formatted presentation data (3030) that can be used for generating a presentation display. This project file (3030) is comprised of clip "A", clip "B", clip "E", and clip "C", concatenated into a single file/clip.

Figure 6C:
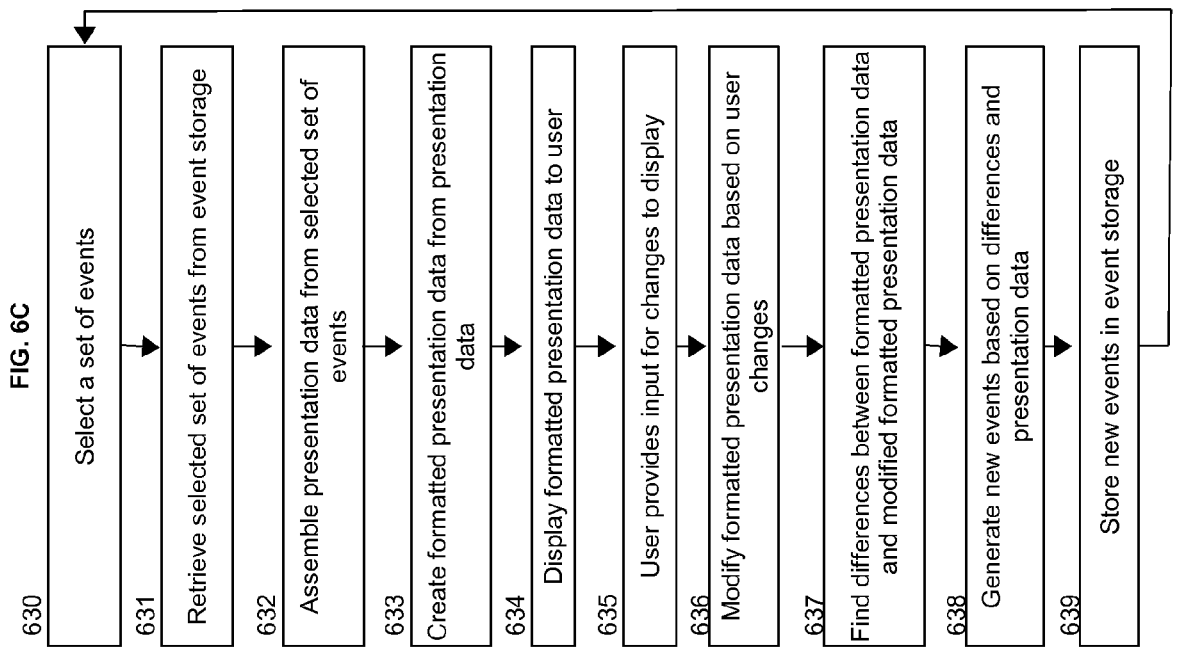
FIG. 6C depicts a state flow on an event processing system using a flow chart where the user changes generate formatted presentation data.
Figure 6B:
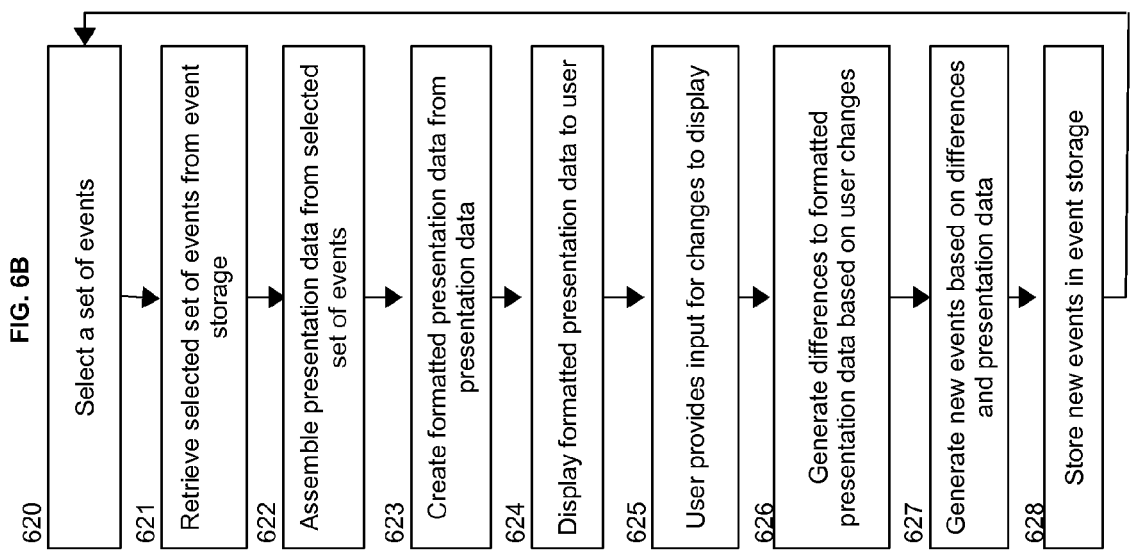
FIG. 6B depicts a state flow on an event processing system using a flow chart where the user changes generate difference annotations.
Figure 6A:
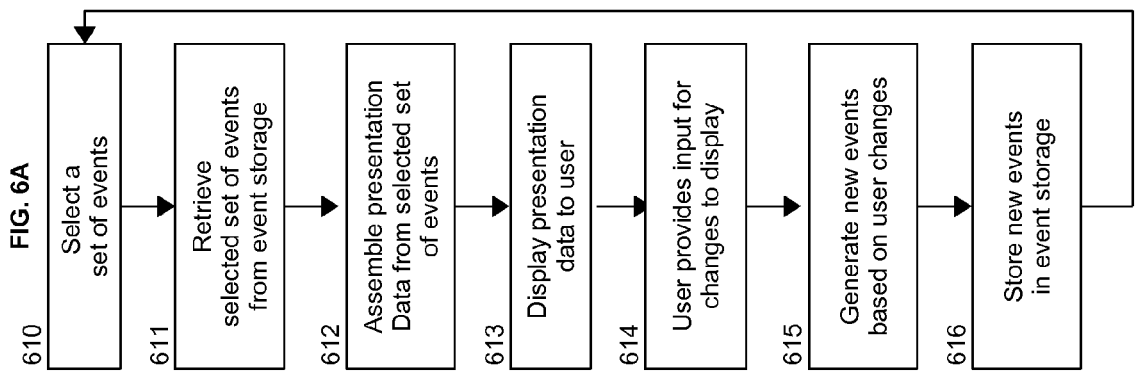
FIG. 6A depicts a state flow on an event processing system using a flow chart where the user changes generate new events.

FIGS. 6A, 6B and 6C provide detailed flow charts and state flow for the operation of the FIGS. 1 and 3 as follows:

FIG. 6A corresponds to FIGS. 1B and 3A. FIG. 6B corresponds to FIGS. 1C and 3B. FIG. 6C corresponds to FIGS. 1E and 3C.

FIG. 6A, FIG. 6B, FIG. 6C, provide flow charts illustrating the methodology associated with the processed flow for selection of a grouping of events for a selected set of events, providing a display presentation responsive to the selected set, including the assembly of the presentation, display of the presentation to the user, providing for a new input of changes by a user and generating new events for storage in the event storage, for corresponding to FIG. 1B, FIG. 1C, and FIG. 1E, respectively.

Referring to FIG. 6A, starting at step 610, there is a selection of a set of events. This can be done by the user of a particular computing system, or by another user of a system such as a teacher or leader who select which events to be in a selected set for display, or by the computer by predefined criteria, such as a last viewed document. At step 611, there is a retrieval of the selected set of events from event storage responsive to the selected set from step 610. The retrieval is of event content for the selected set of events. At step 612, there is an assembly of presentation data from the event content responsive thereto for the events in the selected set of events. At step 613, a display presentation is generated for viewing by the user. At step 614, the user provides input for changes to be made relative to the current display presentation made to the user for the selected set. At step 615, there is a generating of new events representative of the user changes from step 614. At step 616, this new event for the user changes from step 614 are stored as event content in the event storage in a structured format as described elsewhere herein. From step 616, the flow returns to step 610 where there is a selection of set of events for viewing as a selected view of a selected current document. It is to be understood that there many ways to initially provided for selection of the initial selected document. The initial selected document could contain "nothing" or a blank screen. Alternatively, the initial selected document can be imported from a common document format such as MICROSOFT WORD, EXCEL, POWERPOINT, WORDPERFECT, JPEG, TIFF, PHOTOSHOP, WAV, MPG, AVI, . . . .

Referring to FIG. 6B, an analogous operation of the system of FIG. 1C is provided. This methodology begins at step 620 when there is a selecting of a set of events representing a selected group of events for which a view of the current selected document is to be provided. At step 621, there is a retrieving of the event content for the selected set of events from event storage. At step 622, there is an assembling of presentation data from the event content for the selected set of events, assembled responsive to and according to the event content for the selected set of events. At step 623, there is creating of formatted presentation data from the presentation data, which at step 624 is utilized for generating display formatted presentation data to provide a display presentation to the user for the selected set of events. At step 625, the user provides an input for changes relative to the display presentation. At step 626, there is generating of differences or difference annotations to the formatted presentation data-based presentation, that said differences based on the user changes. At step 627, there is a generating of new events based upon a generation of analysis of differences between the difference annotations and the presentation data to generate new events and event content therefore. At step 628, these new events are stored in event storage. After step 628, the processing continues by going to step 620 for a selection of a set of events for a now current display view of the presentation of the document.

Referring to FIG. 6C, another alternative flow chart of the methodology as described relative to FIG. 1E is provided. Referring to FIG. 6C, at step 630, there is a selecting of a set of events to define a selected view. At step 631, there is retrieving of even content for the selected set of events from event storage. At step 632, the event content from the selected set of events is utilized to assemble presentation data. At step 633, there is a creating of formatted presentation data from the assembled presentation data. At step 634, a display presentation is provided to a user of the display formatted presentation data. At step 635, the user provides for input of changes or annotation data relative to the then current display presentation. At step 636, there is a generation of modified formatted presentation data that is provided based on the user changes of step 635. At step 637, there is a comparison in finding of differences between the formatted presentation data and the modified presentation data, which at step 638 is utilized for generating of new events based on the differences in the presentation data. At step 639, the new events are stored in event storage. Thereafter, from step 639, processing resumes at step 630 with selection of a set of events for a new selected view presentation.

Referring to FIG. 7A, a system block diagram is provided showing a centralized event processing system (400). FIG. 7A corresponds to FIG. 3A, FIG. 3B, and FIG. 3C, all of which also show a centralized event processing system. The centralized processing system (400) is comprised of one or more centralized event processor with network interface ((402A), (402B), etc.) [See FIG. 9A, FIG. 9B, or FIG. 9C, for further detailed block diagrams on alternatives], one or more edit processor subsystems ((401A), (401B) and (401C)) for edit processors with group control and group control selection with network interface [See FIG. 8A, FIG. 8B, or FIG. 8C for further detailed block diagrams and alternate embodiments of the edit processor subsystem]. As illustrated in FIG. 7A, there is a centralized event processor with network interface (402A) coupled via communications interface (403D) to communications subsystem (409) (which can be from a simple Internet connection or internal bus connection to a wireless or wired local area or wide area network-based interface. Optionally there may be one or more additional centralized event processor with network interface (402B) coupled via communications interface (403E) to communications subsystem (409). There are also a plurality of the edit processor subsystems, one for each user. As illustrated in FIG. 7A, user 1 couples via input (404A) to edit processor subsystem (401A), which couples via communications interface (403A) to the communications subsystem (409). Similarly, user 2 couples via user input (404B) to edit processor subsystem (401B) which couples via communications interface (403B) to the communications subsystem (409). Finally, as illustrated in FIG. 7A, user 3 couples via user input interface (404C) to edit processor subsystem (401C) which couples via communications interface (403C) to the communications subsystem (409). The communications subsystem (409) provides for interface of data between each of the editor processing subsystems ((401A), (401B), (401C), etc.) and the event processor subsystems ((402A), (402B), etc.). This data communication can alternatively be between all components, between each of the edit processor subsystem components and each of the event processor subsystems, or a combination thereof. The event processor subsystem (402A) will communicate with event processor subsystem (402B) to synchronize the event data stored in each and for retrieving event data stored in the other event processor subsystem that is not stored in their own event processor subsystem. Multiple event processor subsystems (402A, 402B, etc.) may be used to share the load of processing events for the edit processor systems (401A, 401B, 401C, etc.) and share the storage of event data in a distributed manner.

FIG. 7A also corresponds to FIG. 2A and FIG. 2B and FIG. 2C architectures.

Referring to FIG. 7B, a peer-to-peer event processing system (700) is illustrated. This peer-to-peer event processing system (700) is comprised of multiple event and edit subsystems (701A, 701B, and 701C), as illustrated in FIG. 7B, each coupled to a respective user and coupled to each other. User 1 is coupled via user interface (704A) into event and edit event subsystem (701A) [See FIG. 10A, FIG. 10B, and FIG. 10C for further detailed drawings and alternatives for the event and edit subsystem (701)]. The event and edit subsystem (701A) is coupled via communications interface (703A) to communications subsystem (709). Similarly, user 2 couples via user interface (704B) to event and edit event subsystem (701B) which is coupled via communications interface (703B) to network communications subsystem (709). Finally, as illustrated in FIG. 7B, user 3 is coupled via user interface (704C) to event and edit event subsystem (701C) which is coupled via communications interface (703C) to communications subsystem (709) which provides for coupling and communications of data between all of the event and edit event subsystem (701 A, B, and C). Each event and edit subsystem (701A, 701B, 701C, etc.) includes a synchronization capability to allow for event data to be synchronized between the respective event and edit subsystems (701A, 701B, 701C, etc.). These subsystems may also share the load of processing events and share the storage of event data in a distributed manner.

FIG. 8A, FIG. 8B, and FIG. 8C provide illustrations of more detailed block diagrams of the edit subsystems (401A), (401B), and (401C) of FIG. 7A. FIG. 8A also corresponds to showing the utilization of the group selection and control logic (170) and edit processor logic (110) from FIG. 3A. FIG. 8B further corresponds to utilization of the group control logic (270) and edit control processor logic (210) from FIG. 3B. FIG. 8C corresponds to and illustrates the use of the group control logic (370) and edit control processor logic (310) from FIG. 3C.

In a similar manner, FIG. 9A, FIG. 9B, and FIG. 9C correspond to more detailed electrical diagrams of the event subsystems of FIG. 7A. with FIG. 9A corresponding to FIG. 3A and to FIG. 8A, with FIG. 9B corresponding to showing FIG. 3B event processor (200) and corresponding to FIG. 8B, and corresponding to FIG. 3B. Similarly, FIG. 9C corresponds to FIG. 7A and to FIG. 3C, and to FIG. 8C.

Referring to FIG. 8A, FIG. 8B, and FIG. 8C, a user input [(453), (553), and (653), respectively] is coupled to the edit subsystem [(450), (550), (650), respectively] which is coupled therein to both group control logic [(170), (270), (370), respectively], and to edit control processor logic [(110), (210), (310), respectively], from FIG. 3A, FIG. 3B, FIG. 3C, respectively. The group control logic [(170), (270), (370), respectively] is coupled via the network interface [(451), (551), (651), respectively] of the edit subsystem, and is coupled out to the communications interface [(452), (552), (652), respectively]. The network interface [(451), (551), (651), respectively] receives event information from the event processors (402A and 402B) to the group control input [(171), (271), (371), respectively]. The network interface sends the selected group set output [(175), (275), (375), respectively] from the edit subsystem to the event subsystem of the corresponding FIG. 9A, FIG. 9B, and FIG. 9C, respectively, to FIG. 8A, FIG. 8B, and FIG. 8C. The presentation data is received, responsive to the group control logic, from the event subsystem of FIG. 9 to the network interface of FIG. 8 is coupled to the presentation data input (114) of the edit control processor (110) generates a display presentation for viewing locally by the respective user of the edit subsystem of FIG. 8. The modified presentation data is received, responsive to the group control logic, from the event subsystem of FIG. 9 to the network interface of FIG. 8 is coupled to the presentation data input [(214), (314), respectively] of the edit control processor [(210), (310), respectively] generates a display presentation for viewing locally by the respective user of the edit subsystem of FIG. 8. The new events are sent from output (111), responsive to the user input, to the event subsystem of FIG. 9 to the network interface of FIG. 8. The difference annotations are sent from output (211), responsive to the user input, to the event subsystem of FIG. 9 to the network interface of FIG. 8. The modified presentation data is sent from output (311), responsive to the user input, to the event subsystem of FIG. 9 to the network interface of FIG. 8.

Referring to FIG. 9A, FIG. 9B, and FIG. 9C, the communications interface (403D) from the communications subsystem couples data to and from the event subsystem [(460), (560), (660), respectively], of FIG. 9A, FIG. 9B, and FIG. 9C. The available events are provided by [(151), (251), and (351), respectively] to the group control logic FIG. 8A, FIG. 8B, and FIG. 8C, and are coupled via the communications interface [(496), (596), and (696), respectively] [See (403D and 403E) of FIG. 7A] to the network interface of the event subsystem of FIG. 9 [(495), (595), and (696), respectively]. The selected set output from the group control logic FIG. 8A, FIG. 8B, and FIG. 8C, are coupled via the communications interface [(496), (596), and (696), respectively] [See (403D and 403E) of FIG. 7A] to the network interface of the event subsystem of FIG. 9 [(495), (595), and (696), respectively]. The selected set output is coupled to the respective event processor [(100) of FIG. 3A for FIG. 9A, (200) of FIG. 3B for FIG. 9B, and (300) of FIG. 3C for FIG. 9C] coupled via [(195), (295), and (395), respectively]. The event processor of FIG. 9A, FIG. 9B, and FIG. 9C, retrieves event content from event storage responsive to the selected set of events received via the network interface and provides and an output [presentation data (164), formatted presentation data (272), and formatted presentation data (361), respectively] back via the network interface of FIG. 9A, FIG. 9B, and FIG. 9C via the respective communications interface [(496), (596), and (696), respectively] for coupling back to the respective interface FIG. 8A, FIG. 8B, and FIG. 8C, respectively, [(452), (552), and (652), respectively]. The event processor of FIG. 9A, FIG. 9B, and FIG. 9C, receives modifications to the document via [new events (141), difference annotations (231), and modified formatted presentation data (332), respectively].

The event processor provides event storage. However, there may be a plurality of event subsystems each their respective event storage in the event processor. The network interface can provide a communication of event storage data available in one event subsystem and not available in one of the other of plurality of event subsystems. Additionally, each event subsystem may have a local copy of all or some of the events available in other event subsystems. The network interface provides synchronization functions to ensure each event subsystem is up-to-date with all the necessary events in their respective event storage. This task is simplified in this embodiment over other document systems because events don't change or rarely if ever are deleted; the events are typically only added. The events are simply used in different selected sets of events to provide different presentations of the document. In this way, the operations of FIG. 7A are implemented for a centralized event processing subsystem with various of the configurations as shown in FIG. 3A for FIG. 8A, FIG. 9A, for FIG. 3B as shown for FIG. 8B and FIG. 9B, and for FIG. 3C as shown for FIG. 8C and FIG. 9C. FIGS. 2A, 2B and 2C also show a multi-user system in operation utilizing central server.

Referring to FIG. 10A, FIG. 10B, and FIG. 10C, a distributed peer-to-peer event processing system is illustrated for embodiments corresponding to the FIG. 3A, FIG. 3B, and FIG. 3C, respectively. The distributed event processing subsystem as illustrated in FIG. 10A, FIG. 10B and FIG. 10C is comprised of a separate user event processor and user edit/control processor being provided for each user at each user's site, in an operative stand-alone system, with the level of distribution of function from total to minimal to allow peer-to-peer operation, with additional features being provided for some over others, or all being equal peers. The individual separate edit and event subsystems are coupled each other via a communications subsystem/network interface so as to provide communications with each other.

Referring to FIG. 10A, FIG. 10B, and FIG. 10C, an edit and event subsystem [(710), (810), and (910), respectively] is illustrated corresponding to the edit and event subsystem (701A), (701B), and (701C) of FIG. 7B. FIG. 10A corresponds to utilization of the subsystem of FIG. 3A for the event processor [(100), (200), and (300), respectively], the edit processor [(110), (210), and (310), respectively] and the group control [(170), (270), and (370), respectively]. Referring to FIG. 10A, FIG. 10B, and FIG. 10C, the communications interface (703A), (703B) or (703C) from the communications subsystem couples data to and from the edit and event subsystem [(710), (810), (910), respectively], of FIG. 10A, FIG. 10B, and FIG. 10C to the network interface and synchronization logic [(720), (820), and (920), respectively]. User input [(718), (818), (918), respectively] is provided to the group control [(170), (270), and (370), respectively] on input [(173), (273), and (373), respectively] and the edit processor [(110), (210), and (310), respectively] input [(123), (223), and (323), respectively]. Selected events are output [(171), (271), and (371), respectively] from the group control to the network interface [(721), (821), and (921), respectively]. Event information is provided in input [(175), (275), and (375), respectively] to the group control from the network interface via [(722), (822), and (922), respectively, and (729), (829) and (929) respectively]. Modifications to the document are input [new events (141), difference annotations (231), and modified formatted presentation data (332), respectively] to the event processor via the network interface via [(726), (826), and (926), respectively, and (729), (829) and (929) respectively] from any one of the edit and event subsystems. The selected set of events in input [(195), (295), and (395), respectively] via the network interface via [(725), (825), and (925), respectively] from any one of the edit and event subsystems. The presentation information in output [presentation data (164), formatted presentation data (272), and formatted presentation data (361), respectively] to edit processor [(110), (210), and (310), respectively] to input [(114), (214), and (314), respectively]. Events are output [(151), (251), and (351), respectively] to the via the network interface via [(724), (824), and (924), respectively] from any one of the edit and event subsystems. Modifications to the document are output [new events (111), difference annotations (211), and modified formatted presentation data (311), respectively] from the edit processor via the network interface via [(723), (823), and (923), respectively] to any one of the edit and event subsystems. Presentation data is input [(242), and (342), respectively] to the event processor via the network interface via [(828), and (928), respectively, and (829) and (929) respectively] from any one of the edit and event subsystems for use in generating new events. Presentation data is output [(264), and (364), respectively] from the event processor via the network interface via [(827), and (927), respectively] from any one of the edit and event subsystems for use in generating new events on the receiving edit and event subsystem.

Thus, FIG. 10A, FIG. 10B, and FIG. 10C help to clearly illustrate that any of the system architectures and methodologies as described with reference to FIG. 3A, FIG. 3B, and/or FIG. 3C can be utilized for implementation of the peer-to-peer architecture of FIG. 7B, as well as supporting use in the centralized architecture.

The plurality of edit and event subsystems each provides event storage in their respective event processors (100) of FIG. 10A, (200) of FIG. 10B, and (300) of FIG. 10C. The network interface (720) of FIG. 10A, (820) of FIG. 10B, and (920) of FIG. 10C can provide a communication of event storage data available in one edit and event subsystem and not available in one of the other of plurality of edit and event subsystems. Additionally, each edit and event subsystem may have a local copy of all or some of the events available in other edit and event subsystems. The network interface provides synchronization functions to ensure each edit and event subsystem is up-to-date with all the necessary events in their respective event storage. This task is simplified in this embodiment over other document systems because events don't change or rarely if ever are deleted; the events are typically only added. The events are simply used in different selected sets of events to provide different presentations of the document.

Figure 11A:
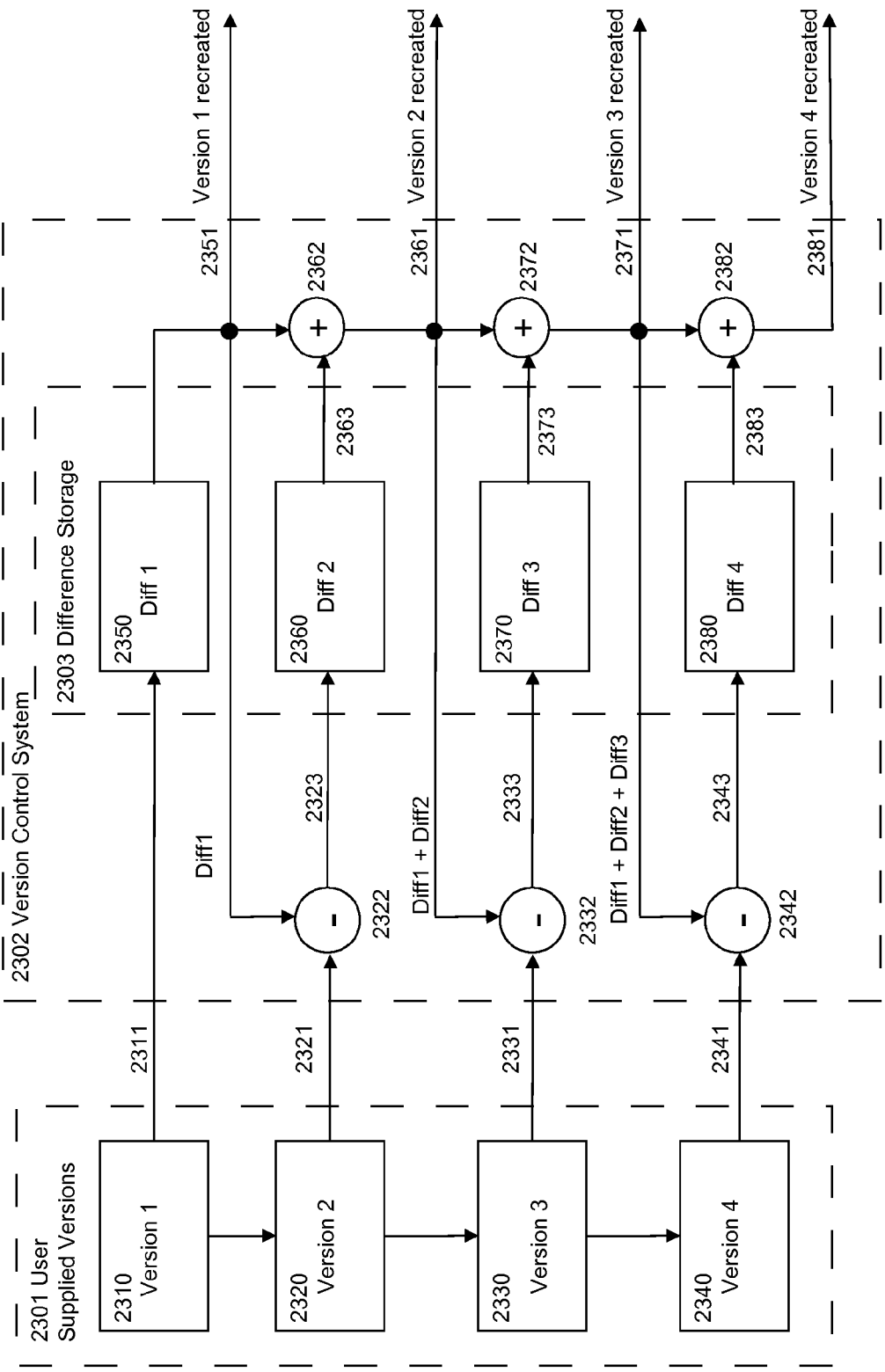
FIG. 11A illustrates prior art version control and document management systems.

Referring to FIG. 11A, one example of a prior art document management version control system is illustrated. User supplied versions of documents are provided at (2301) over time, so that at a first time, a version 1 (2310) is generated and stored, and at a second time, a second version, version 2 (2320) is stored, similarly, version 3 (2330) is stored at a third time with additional modifications to version 2 (2320) and also shown is at a later time version 4 (2340) is generated from version 3 with additional changes thereto. The output of the versions 1, 2, 3, and 4 are coupled via outputs (2311), (2321), (2331), and (2341), respectively, from the user supplied version subsystem (2301). The outputs are coupled to a version control system (2302). The original version 1 is coupled to a first comparator (2350) for generating a difference subset of changes relative to version 1. Since no changes have occurred, a version 1 output recreated (2351) is provided. At time (t2), version 2 output (2321) is coupled to a comparator 2351 which subtracts version 1 from version 2 to generate a difference output (2323) coupled to the different storage (2303) subsystem (2360) which generates a difference output (2363) of the changes from version 2 which are combined by logic (2362) to the version 1 recreated output (2351) to generate a version 2 recreated output (2361). This represents the differences of 1 and the differences of 2 outputs from (2350) and (2360), respectively. At time (t3), version 3 output (2331) is coupled to a comparator (2332) which subtracts version 2 recreated (2361) from version 3 (2331) to generate an output of differences (2333) which is coupled to difference storage (2370) which generates an output of the third differences (2373) which are combined by logic (2372) which adds the version 2 recreated to the differences 3 (2373) to generate an output of a version 3 recreated document (2371) comprising differences 1 plus differences 2 plus differences 3 (outputs (2351), (2361), and (2371)).

Referring to FIG. 11A, at time ($t^4$), version 4 (2340) provides the output (2341) of the version 4 document as saved to the compare logic (2342) which subtracts the version 3 recreated (2371) from the version 4 (2341) to generate differences (2343) which are stored in difference storage (2303) in memory (2380) thereof, which selectively provides an output of the difference 4 data (2383) coupled to combination logic (2382) which combines the difference 4 (2383) with the version recreated data (2371) to generate a version 4 recreated document (2381). As is illustrated herein, all new versions are absolutely dependent upon and require reference to and utilization of all prior versions in order to reconstruct and view the selected version of the document. Reconstruction of a version of a document is based upon the entire document's history for all previous versions and not on the changes themselves. Thus, there is an absolute restriction to buy versions. And, combinations cannot just be provided of any groupings of any annotations by one user or by any users in any order of entry that is desired to be displayed. This is contrast to the systems and methodologies as taught and claimed in the present invention.

Referring to FIG. 11B, a flow chart is illustrated showing the state flow and operation as shown in FIG. 11A. Referring to FIG. 11B, at step 1500, a user opens the editor software on the computing system. At step 1501, the user edits the document with the editing subsystem software. This can include WORD, any text editor, POWERPOINT, any image editor, movie editor, 3D model editor, image editor, PHOTOSHOP, . . . .

At step 1502, a first version of the document is saved by the user, including all edits made to that point, and is saved as a file version 1. At step 1503, version 1 of the file is opened and worked on the computing system. At step 1504, a further edit is made to the document. At step 1505, the user saves a second version of the document to a file as version 2. The processing continues for multiple versions analogous to FIG. 11A.

Referring to FIG. 11C, three alternative display presentations are shown illustrating various levels of display presentation of tracked changes, such as in a word processing software document. Display (2400) shows the document display presentation when all changes are to be tracked and made visible and shown in the display. As illustrated, there were four edits made, which can be from any version, any user, or all users, or any one user. Display (2400) shows the edits appearing with the display presentation of an underlying document. Display (2410) shows an alternate view presentation of that same document but with the changes made and the edits being selected to be hidden rather than shown. In this case, none of the added edits are displayed in the display presentation (2410). Finally, display (2420) provides a view selection where the user selects two of the changes/edits 1 and edit 3, to be accepted and as part of the clean displayed flattened document, and chooses to reject and cancel edits 2 and 4, so they are no longer in this version of the document, and this version of the document with accepted and rejected is in the display presentation. If this version is saved, it creates a flattened document, where all of the tracking information is lost for the past events and past versions.

Figure 11D:
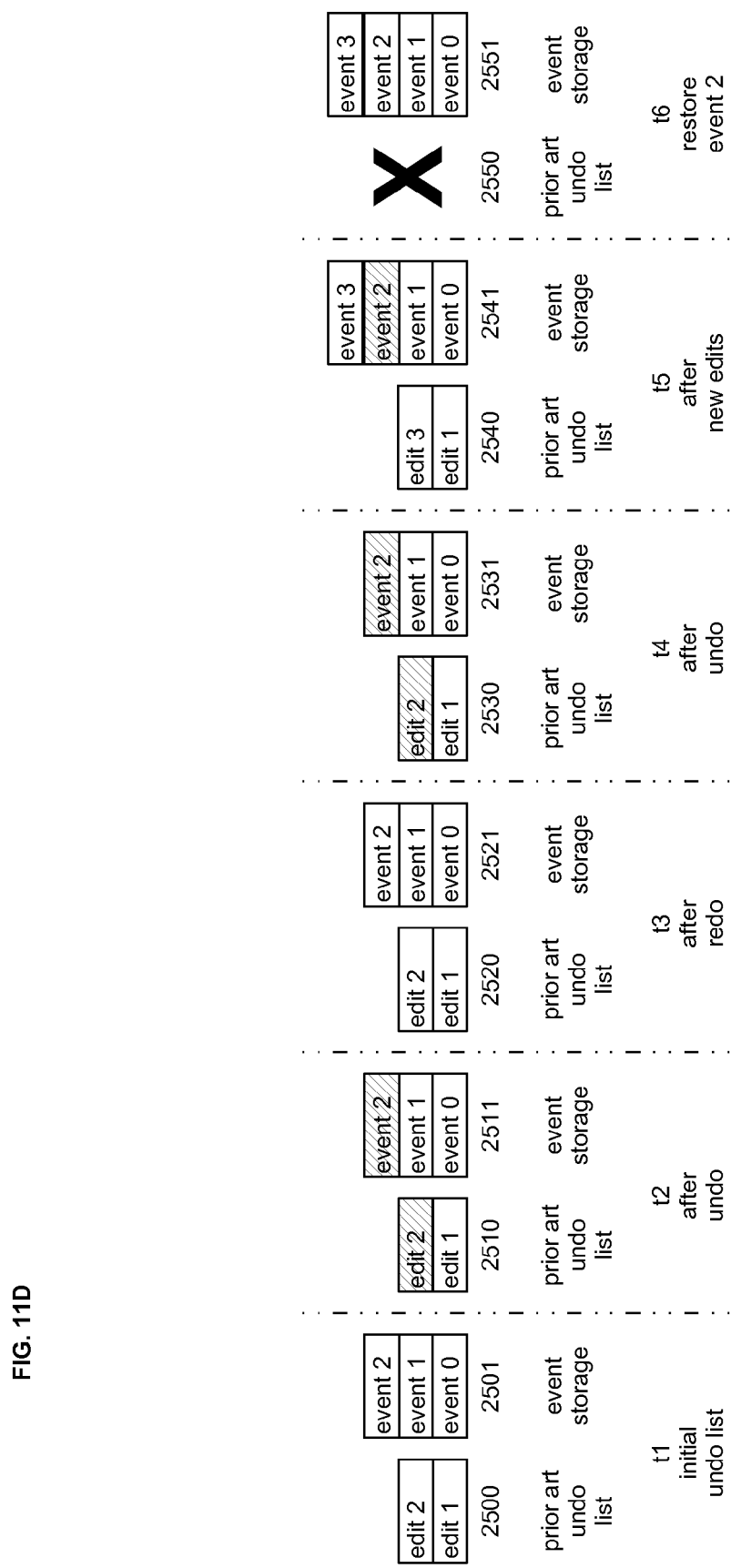

Referring to FIG. 11D, a comparison is provided of memory storage of edits and utilization and prior art undo/redo listing, versus the event content storage and logic and display processing and assembly pursuant as per the present invention, illustrated for each of a plurality of time windows of processing. As illustrated in FIG. 11D, at time (t1), there is an initial processing period. In the prior art, there are shown stored in edit memory edit 1 and edit 2 in storage (2500). This provides the initial undo list for the edit processor. Event storage (2501) provides event content storage for events zero, 1 and 2, which can be selected for selected grouping for generation of a view of a display presentation.

At time (t2), a first undo has been selected. As illustrated, edit table (2510) and event storage (2511) provides for a display presentation where edit 2 is not utilized and has been removed from the undo list. In the event storage, the event content for event zero, 1 and 2 are maintained in event storage, but the event 2 shown as darkened is not selected in the selected set of events for generating the display presentation, which eliminates the viewing and the presentation of event 2, but does not change the event storage. At time (t3), a first redo is selected. In the prior art edit storage (2520), edit 2 is re-entered into the undo list (2520). In the event storage (2521), the content remains unchanged. However, the selected grouping is of all events zero, 1 and 2, and so provides a display presentation of the three events in the selected grouping.

At time (t4), the user has selected another undo of which removes the last entered edit of edit 2 from the undo list, shown as blackened out in the table (2530). However, the event storage (2531) is unchanged again, but the selection of event 2 is not selected as part of the selected set (illustrated as darkened in the event storage (2531), so that the assembly of event content is only for events zero and 1 to generate the view in the presentation.

At time ($t^5$), new edits are added by the user. In the prior art storage of the undo list, there is only edit 1 at time ($t^4$), in table (2530). Edit 2 has been removed as shown darkened at time ($t^4$).

At time ($t^5$), the edit 3 is stored in the second entry storage location of the memory (2540). Thus, the ability to further undo or redo edit 2 is lost in the prior art. In the event storage (2541), after the new event is added, event zero, 1, 2, and 3 all have event content stored in the event storage (2541). However, as shown as blackened in the event storage (2541), event 2 is not selected to be within the selected grouping, which is the set of events zero, 1 and 3, as illustrated for time ($t^5$), and this selected grouping of event content is utilized to generate a presentation view for display to the user.

A key distinction and benefit of the present invention relative to the prior art is illustrated at (t6) depicted by undo list (2550) and event storage (2551), in FIG. 11D. At time (t6), the user of the system wishes to restore the second edit event 2. However, with the prior art, the undo list no longer contains edit 2, and since it was undone, and additional edits done in its place, then there is no way to retrieve or utilize it. However, since in the event storage of the present event processing with the present invention, all event content is retained at all times in this process, so that the selected set of events is what determines which event content will be displayed and processed assembled for display and viewed. In this case, it is a simple matter of selecting event 2 as part of the selected grouping of set of events to be assembled to provide the display. Thus, at time ($t^6$), with the present invention, event 2 can be restored, while in the prior art, it cannot.

The use of an undo list is present in numerous programs of all genres, from word processing and document processing of text documents to image processing and audio processing. Non-linear editing systems as well as linear systems utilize undo lists. These problems of loss of ability to restore events is a liability and problem with many systems. Additionally, although in some application software, there is an ability in some programs such as ADOBE LIGHT ROOM, ADOBE PHOTOSHOP, and others, to view the entire undo list as a history of undos. They provide an opportunity to jump to a particular spot in the undo list. While this exposes the undo list to the user, and most programs only allow to take one off the top, or add one, or move back up the list in steps of one, these allow to jump up and down, however, it is equivalent in functionality to do multiple undos or multiple redos, so their functionality is described this figure.

What is claimed is:

1. A method for document generation and display, the method comprising:
   providing a first display presentation;
   generating edit events representative of and responsive to user input made relative to the first display presentation;
   wherein each said edit event is comprised of event content comprising an associated document change and an associated edit reference;
   wherein the event content is generated in a defined entry order of input;

wherein each said associated edit reference identifies a position in the defined entry order of input for utilization of the associated said document change;

storing the event content for each said edit event in non-transitory memory;

generating a selected edit list for a set comprising at least two of said edit events that each have its said associated edit reference referring to another said event to which the associated document change is utilized;

utilizing the edit events in the selected edit list to generate second display presentation data generated responsive to said document change and said edit reference associated with each said edit event in the selected edit list;

generating a second display presentation responsive to said second display presentation data;

wherein a missing event is one of the events not within the set of selected events, wherein the associated edit reference for the missing event identifies a relationship to one of:
one other of the events within the set of selected events, another said missing event;

wherein a dangling event is one of the events within the set of selected events and the respective said edit reference identifies a relationship to one of:
the missing events,
another said dangling event; and
wherein the system provides for the second display presentation to provided a display of one of:
not showing the dangling event,
showing the dangling event within the revised display presentation, and
showing the dangling event within the revised display presentation in an identifiable manner.

2. The method as in claim 1, wherein the display presentation data has a beginning and an end: wherein the beginning of the display presentation data is associated with a beginning position of the defined entry order of input: wherein the end of the display presentation data is associated with an ending position of the defined entry order of input.

3. The method as in claim 1, wherein the display presentation data has a beginning and an end;
wherein the beginning of the display presentation data is associated with a beginning position of the defined entry order of input;
wherein the end of the display presentation data is associated with an ending position of the defined entry order of input;
wherein the edit reference identifies at least one of:
the beginning position of the defined entry order of input,
the ending position of the defined entry order of input, and
one of the positions in the defined entry order of input; and
wherein elements in the second presentation data are associated with of at least one of:
the beginning position of the defined entry order of input,
the ending position of the defined entry order of input,
one of the positions in the defined entry order of input associated with one of the edit events; and
wherein at least one of the edit references associated with one of the events in the selected edit list identifies one of the elements in the second presentation data that is associated with the same position as said edit reference.

4. The method as in claim 1, further comprising:
generating a second selected edit list for a second set of selected events;
generating third display presentation data representative of third combination of edit events responsive to said second selected edit list and to the non-transitory memory; and
generating third display presentation responsive to said third display presentation data.

5. The method as in claim 1, wherein there are a plurality of users; and wherein the edit events are generated separately and independently responsive to input from at least two of the plurality users.

6. The method as in claim 1, wherein the each said associated document change defines operations to be performed by modifying the display presentation data at the position as defined by the associated edit reference associated with said associated document change.

7. The method as in claim 1, wherein the second display presentation is generated responsive to said associated document change defining operations associated with the edit reference associated with said document change for each of the edit events in the selected edit list.

8. The method as in claim 1, wherein the display presentation is provided via display apparatus connected to a computing device.

9. A method for document creation and editing, the method comprising:
providing a first display presentation responsive to display presentation data;
storing event data representative of a plurality of events in non-transitory memory, said event data comprised of an associated document change and an associated edit reference for a respective said event, at least one of said events representative of an edit made relative to the display presentation;
wherein for at least two of the events, the associated edit reference for said event identifies another one of the events;
the method further comprising:
selecting a plurality of the events as a selected set of events;
wherein the associated document change for each of at least two of the events in the selected set, defines an operation to generate at least a portion of second display presentation data responsive to the associated edit reference for said associated document change;
generating the second display presentation data utilizing the event data retrieved from non-transitory memory for the selected set of events;
providing a second display presentation responsive to the second display presentation data;
wherein a missing event is one of the events not within the set of selected events, wherein the associated edit reference for the missing event identifies a relationship to one of:
one other of the events within the set of selected events, another said missing event;
wherein a dangling event is one of the events within the set of selected events and the respective said edit reference identifies a relationship to one of:
the missing events,
another said dangling event; and
wherein the system provides for the second display presentation to provided a display of one of:
not showing the dangling event,
showing the dangling event within the revised display presentation, and
showing the dangling event within the revised display presentation in an identifiable manner.

10. The method as in claim 9, wherein each said edit reference identifies one of: one of the events in the non-transitory memory; portion of the second display presentation modified by said one of the events in the non-transitory memory; a beginning of the second display presentation data when the edit reference identifies the first event; and an end of the second display presentation data when the edit reference relationship identifies after the last event.

11. The method as in claim 9, wherein an orphan event is one of the events within the set of selected events; wherein the associated edit reference for the orphan event identifies a relationship to one of: one other of the events not within the set of selected events and which is not a dangling event, and is not another said orphan even; and wherein the system provides for the second display presentation to provide one of not showing the orphan event, showing the orphan event within the revised display presentation, and showing the orphan event within the revised display presentation in an identifier manner.

12. The method as in claim 9, further comprising: generating edited display presentation data responsive to said document edits in the selected set of events; generating difference edits responsive to comparing said edited display presentation data and said display presentation data; generating corresponding aid event data responsive to said difference edits and, storing the generated said event data in the non-transitory memory.

13. The method as in claim 9, further comprising: selecting a second plurality of the events as a second selected set of events; and providing a third display presentation responsive to the second selected set of events and the non-transitory memory.

14. The method as in claim 9, wherein the operation defined by at least one said associated document change modifies the display presentation by at least one of: modifying a portion of the second presentation data responsive to associated edit reference and inserting document change data into the display presentation data responsive to associated edit reference.

15. The method as in claim 9, further comprising: wherein at least one of the events further comprises metadata defining conditions associated with creation of event; wherein the metadata comprises at least one of: user identification, time of entry of said event, duration of said event, properties of a respective said document change, location of a user, identification of an associated said set of events, audio, video, image, comments, and graphics data and wherein the revised display presentation is, at least in part, generated responsive to said metadata.

16. A system for display generation, the system comprising:
a plurality of document generation and display subsystems, each said subsystem comprising:
non-transitory memory storing data for events representative of edits made by a user relative to a display of a base image;
wherein each said edit is comprised of an associated change and an associated edit reference;
wherein each said associated change can be utilized to generate a display for a portion of the base image and each said associated change is associated with one of the edits responsive to the associated edit reference, wherein said portion of the base image is identified by the associated edit;
selection logic responsive to user selection of a plurality of the edits that are stored in the non-transitory memory as a selected set of edits;
display generation logic generating presentation data responsive to the data for the events representative of said selected set of edits,
wherein the associated change for each said edit in the selected set, provides for generation of at least a part of the presentation data, responsive to the associated edit reference for said associated edit;
display apparatus providing a first display presentation responsive to the presentation data: a network coupling at least two of said plurality of subsystems for document generation and display;
wherein modified display presentation data is generated responsive to an input by a user made at one of the plurality of subsystems for document generation and display, comprising a sending system, said input by said user representative of a corresponding said edit;
wherein the input by the user at the sending system is provided concurrent to providing the display presentation responsive to respective said presentation data for a corresponding said selected set of edits associated with said sending system;
wherein the modified display presentation data and the selected set of edits are communicated through said network from the sending system to at least one other one of said plurality of subsystems for document generation and display comprising a receiving system;
wherein each said receiving system is further comprised of compare logic responsive to the modified display presentation data and the selected set of edits to generate a new set comprised of at least one new event; and
wherein said new set is stored in said non-transitory memory associated with the receiving system.

17. The system as in claim 16, wherein, for each of the document edits, the associated document change provides information for display of an associated document edit at location as defined by the associated edit reference, said location comprising of one of: the location referenced by said edit reference, before the location referenced by said edit reference, and after the location referenced by said edit reference.

18. The system as in claim 16, wherein the associated document change of each said document edit in the selected set, controls generation of at least a part of the presentation data, responsive to the associated edit reference for said associated document edit; wherein the edit reference provides one of: information to locate another document edit contained in the non-transitory memory, information to locate the beginning of the document, and information to locate the end of the document.

19. The system as in claim 16, wherein there are a plurality of users, providing input of a plurality of document edits and each said user having a display apparatus for; the system further comprising: a plurality of said selection logic, one each for use by each said user, to select respective said selected set of document edits, for each said user, and a plurality of said display generation logic, each providing generation of a separate said display presentation on the display apparatus for each said user.

20. The system as in claim 16, further comprising: a plurality of systems for document generation and display; a network coupling said plurality of systems for document generation and display; wherein said selected set of document edits, is communicated, from one of the of systems for document generation and display to at least one of other of the systems for document generation and display, as a communicated selected edit list via said network; and wherein said display generation logic at each one of the systems for document generation and display, generates said display presentation data responsive to said communicated selected edit list.

21. The system as in claim 16, wherein each said document edit is further comprised of metadata defining conditions associated with said document edit; wherein the display generation logic is responsive to said metadata for generating the selected edit list; and wherein the metadata comprises at least one of: user identification, time of entry of a respective said event, duration of a respective said event, properties of a respective said document change, location of the user, user contact information, system identifier identifying where said event is created, company, user rights, identification of a respective said selected set of document edits, audio, video, image, comments, and graphics data.

22. The system as in claim 16, further comprising: difference logic generating difference edits responsive to comparing input by a respective said user and to the presentation data event generator logic generating new events representative of respective new document edits, responsive to said difference edits and wherein said new events are stored in non-transitory memory.

23. Teaches The system as in claim 22, further comprising: a plurality of the systems for document generation and display; and, a network coupling said plurality of systems for document generation and display; wherein the difference edits are generated responsive to a user input at one of the plurality of systems for document generation and display; wherein said difference edits are communicated through said network to each of other said plurality of systems for document generation and display and thereafter to the event generator logic of each of said other of the plurality of systems document generation and display; and wherein said event generator logic of each of said other of the plurality of systems for document generation and display; generates said new events responsive to said communicated difference edits.

24. The system as in claim 16, further comprising: a plurality of the systems for document generation and display; a network coupling said plurality of the systems for document generation and display; wherein said document edits are communicated through said network between said plurality of the systems for document generation and display; and wherein the communicated said document edits are stored in respective non-transitory memory.

25. The system as in claim 16, wherein said document change comprises associated document data and associated document operation; wherein the associated document data is comprised of at least one of: text, formatting, audio, video, graphics, and image data; wherein the associated document operation is comprised of at least one of: inserting the associated document data to be located after said associated document edit as defined by the associated edit reference; inserting the associated document data to be located before said associated document edit as defined by the respective said associated edit reference; not displaying the associated said document data for said associated document edit at a position as defined by the associated edit reference; and replacing said associated document edit with the associated document data at a location defined by the respective said associated edit reference.

26. The system as in claim 16, wherein the selection logic provides for selecting a second set of the events as a second selected set of document edits; and wherein the display generation logic for generates a second revised display presentation responsive to the second selected set of document edits and the non-transitory memory.

27. The system as in claim 16, wherein the document edits in the selected set can comprise less than all the document edits between a first document edit and a last document edit within an ordering of the events within the entry order of input.

28. The system as in claim 16, wherein each said document edit is associated with a respective location within a plurality of locations within a defined entry order of input wherein each said document change is generated associated with one said location
within the plurality of locations within the defined entry order of input; wherein the edit reference associated with each said document change identifies another one of the locations in the defined entry order of input; wherein one of the portions of the document generated by one of the document changes is associated with the location in the defined entry order of input associated with said one of the document changes; wherein said one of the portions of the document is identified by the edit reference associated with at least one other of the document changes.

29. A method for document processing and interacting with at least one user, the method comprising:
storing, in non-transitory memory, event data for events representative of document edits made relative to a display presentation representative of presentation data;
wherein the document edits are generated in a defined entry order of input;
wherein each said document edit is associated with a location in the defined entry order of input;
wherein each said document edit is comprised of an associated document change and an associated edit reference identifying another one of the document edits associated with another one of the locations in the defined entry order of input;
generating modified presentation data responsive to user input and to the presentation data;
comparing the modified presentation data with the presentation data to generate difference edits;
wherein said presentation data is comprised of edit references defining respective locations where respective said change data from the respective associated document edit is to be utilized;
generating new edits responsive to the difference edits and to said presentation data.

30. The method as in claim 29, wherein the associated document change provides information used to modify the presentation data at the location in the defined entry order of input as defined by the one of: defined responsive to said associated edit reference; before the location responsive to said associated edit reference, and after the location defined responsive to said associated edit reference.

31. The method as in claim 29, wherein the associated edit reference defines the location as at least one of: a location of one of document edit, a location at the beginning of the presentation data, and a location at the end of the presentation data.

32. The method as in claim 29, further comprising: coupling said selected set of document edits, for communications from a first said non-transitory memory associated with one said user to at least one other said non-transitory memory associated with at least one other one of the plurality of users, as a communicated selected edit list via a network; and the method further comprising: generating a local display presentation for viewing by at least one of the users, responsive to said communicated selected edit list.

33. The method as in claim 29, further comprising: generating modified display presentation data responsive to input by a respective one said user; communicating the modified display presentation data through said network from said respective one said user to at least one other one of said user; and generating new event responsive to the communicated said modified display presentation data; and storing the respective new event in the non-transitory memory of the at least one other said user.

34. The method as in claim 29, wherein said document change comprises associated document data and an associated document operation; wherein the document data is comprised of at least one of: text, formatting, audio, video, graphics, and image data; wherein the document operation is comprised of at least one of: inserting the associated said document data after the location in the presentation data, responsive to said associated edit reference; inserting the associated document data before the location in the presentation data, responsive to said associated edit reference; not displaying the presentation data at the location, responsive to respective to said associated edit reference; and replacing the presentation data at the location, with the associated document data, responsive to said associated edit reference.

35. The method as in claim 29, wherein the document edits in the selected set can comprise less than all the document edits between a first document edit and a last document edit within the defined entry order of input.

36. A system for document processing and interacting with at least one user, the system comprising:
- non-transitory memory storing event data for events representative of document edits made relative to a display presentation representative of presentation data;
- wherein the document edits are generated in a defined entry order of input;
- wherein each said document edit is associated with a location in the defined entry order of input;
- wherein each said document edit is comprised of an associated document change and an associated edit reference identifying another one of the document edits associated with another one of the locations in the defined entry order of input;
- wherein the modified presentation data is generated responsive to user input and to the presentation data;
- wherein the modified presentation data is compared with the presentation data to generate difference edits;
- wherein said presentation data k comprised of edit references defining respective locations where respective said change data from the respective associated document edit is to be utilized; and,
- wherein new edits are generated responsive to the difference edits and to said presentation data.

\* \* \* \* \*